(12) United States Patent
Zheng et al.

(10) Patent No.: US 11,715,294 B2
(45) Date of Patent: Aug. 1, 2023

(54) SYSTEMS AND METHODS FOR IMPROVING VISUAL SEARCH USING SUMMARIZATION FEATURE

(71) Applicant: Markable, Inc., Madison, WI (US)

(72) Inventors: Rui Zheng, Shenzhen (CN); Suren Kumar, Seattle, WA (US)

(73) Assignee: Markable, Inc., Madison, WI (US)

( * ) Notice: Subject to any disclaimer, the term of this patent is extended or adjusted under 35 U.S.C. 154(b) by 0 days.

(21) Appl. No.: 17/888,073

(22) Filed: Aug. 15, 2022

(65) Prior Publication Data

US 2022/0406030 A1  Dec. 22, 2022

Related U.S. Application Data

(63) Continuation of application No. 16/623,323, filed as application No. PCT/US2018/037955 on Jun. 15, 2018, now Pat. No. 11,417,082.

(Continued)

(51) Int. Cl.
  *G06K 9/46* (2006.01)
  *G06V 20/10* (2022.01)
  (Continued)

(52) U.S. Cl.
  CPC .............. *G06V 20/10* (2022.01); *G06N 3/08* (2013.01); *G06Q 30/0643* (2013.01);
  (Continued)

(58) Field of Classification Search
  CPC ................ G06T 7/0012; G06T 7/0083; G06T 2207/30004; G06T 7/0081; G06T 2207/10116; G06T 5/40; G06T 2207/30068; G06T 7/0085; G06T 7/60; G06T 7/12; G06T 7/11; G06T 7/174;
  (Continued)

(56) References Cited

U.S. PATENT DOCUMENTS

| 8,068,676 | B2 | 11/2011 | Zhang et al. |
| 9,171,195 | B1 | 10/2015 | Rybakov et al. |

(Continued)

FOREIGN PATENT DOCUMENTS

| CN | 107123033 A | 9/2017 |
| CN | 108509466 A | 9/2018 |
| CN | 107291945 B | 3/2020 |

*Primary Examiner* — Duy M Dang
(74) *Attorney, Agent, or Firm* — American Patent Agency PC; Daniar Hussain; Stephen M. Hou

(57) ABSTRACT

Systems that search databases of videos or images to identify similar products in a given video or image of a product are disclosed. The content of the given video is represented by a feature vector used to measure the given video's similarity to either a video or an image. When the system is deployed to recognize particular fashion items in videos, some such videos are taken in uncontrolled settings, and as a result, may have low resolution, poor contrast, minimal focus, motion blur, or low lighting. By recognizing and removing poor quality video frames from the image recognition pipeline, associating products across video frames to form tracklets of each product, and enriching the feature representation of each item for best retrieval result by fusing information from multiple video frames depicting the item, the system addresses the aforementioned shortcomings.

20 Claims, 41 Drawing Sheets

Related U.S. Application Data

(60) Provisional application No. 62/645,727, filed on Mar. 20, 2018, provisional application No. 62/639,944, filed on Mar. 7, 2018, provisional application No. 62/639,938, filed on Mar. 7, 2018, provisional application No. 62/561,637, filed on Sep. 21, 2017, provisional application No. 62/521,284, filed on Jun. 16, 2017.

(51) Int. Cl.
*G06N 3/08* (2023.01)
*G06Q 30/0601* (2023.01)
*G06V 10/25* (2022.01)
*G06V 10/74* (2022.01)
*G06V 10/764* (2022.01)
*G06V 10/44* (2022.01)
*G06V 10/20* (2022.01)

(52) U.S. Cl.
CPC ............ *G06V 10/25* (2022.01); *G06V 10/255* (2022.01); *G06V 10/454* (2022.01); *G06V 10/761* (2022.01); *G06V 10/764* (2022.01)

(58) Field of Classification Search
CPC ........... G06T 1/00; G06T 7/00; G06T 7/0016; G06T 7/13; G06T 7/70; G06F 19/321; G06F 16/5866; A61B 5/02007; A61B 5/7264; A61B 5/742; G06K 9/4604; G06K 9/52; G06K 9/6267; G06K 9/66; G06K 9/6262; G06K 9/00624; G06K 9/623; G06K 9/6253; G06K 9/4609; G06K 9/4652; G06K 9/3233; G01N 33/4833; G01N 33/48; G01N 33/5091; G06N 20/00; G06N 3/08; G06Q 30/02; G06Q 30/0269; G06Q 30/0277; G06Q 30/0643

See application file for complete search history.

(56) References Cited

U.S. PATENT DOCUMENTS

| | | |
|---|---|---|
| 9,767,381 B2 | 9/2017 | Rodriguez-Serrano et al. |
| 11,017,261 B1 | 5/2021 | Zheng et al. |
| 2008/0177640 A1 | 7/2008 | Gokturk et al. |
| 2009/0116698 A1 | 5/2009 | Zhang et al. |
| 2014/0100997 A1 | 4/2014 | Mayerle et al. |
| 2016/0203525 A1 | 7/2016 | Hara et al. |
| 2017/0206416 A1* | 7/2017 | Chen .................. G06T 7/00 |
| 2018/0137406 A1 | 5/2018 | Howard et al. |

* cited by examiner

The How to Wear It SDK is designed to apply to:

1. e-Retailer websites, e.g. shopakira.com
2. Social media websites, e.g. instagram.com
3. Browser extensions, e.g. Chrome, Firefox (desktop only)

The SDK layer will works seamlessly on all websites on mobile and desktop.

Installation

By adding a few lines of code to install SDK, see the box below as an example. Supporting all websites, including 3rd-party ecommerce web platforms, e.g. Magento, Shopify, Squarespace, etc.

Example

```
/* Paste this into website source code to enable Markable Lens (Visual Search) in this site... */

<!-- MARKABLE STARTS --><script id="markable-sdk" src="//sdk.markable.ai/index.js" data-api-key="example-123" async defer>
</script>
<!-- MARKABLE ENDS -->
```

Customization

The website owner can customize the design completely using CSS within their own website code - or in Lens Dashboard

```
};
//]]>
</script><script type="text/javascript">
if (document.cookie.length && (document.cookie.indexOf('PAGECACHE_FORMKEY'),
'PAGECACHE_FORMKEY',
's3gx4skc8qiNfsDQ',
new Date(new Date().getTime() + 86400000)
};

script          Tag
source          Tag
<scr
<!--MARKABLE:END -->

</div>
</div>
</body>
```

FIG. 13

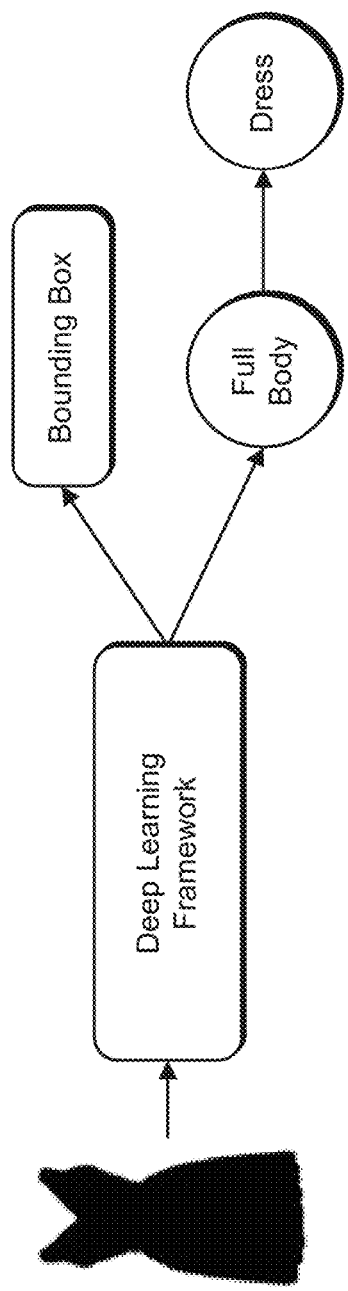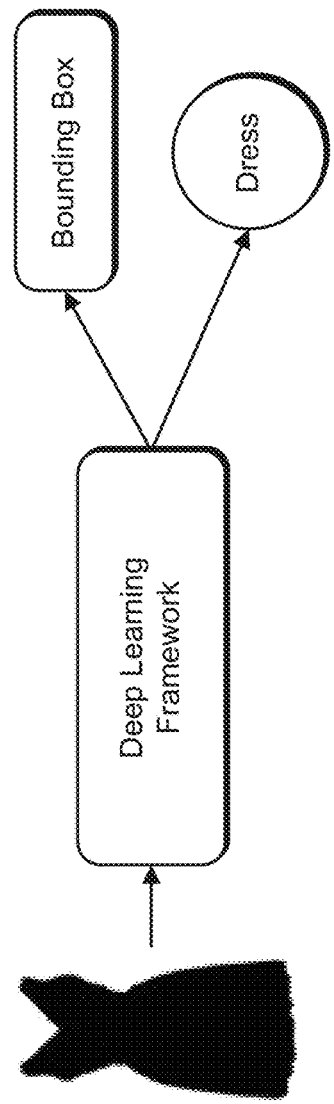
FIG. 22

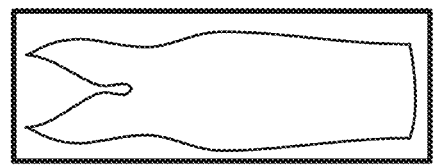
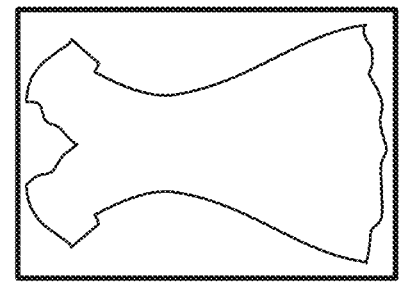
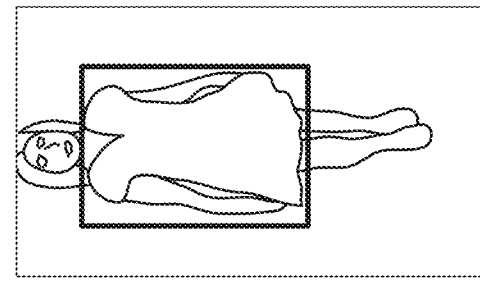
FIG. 29

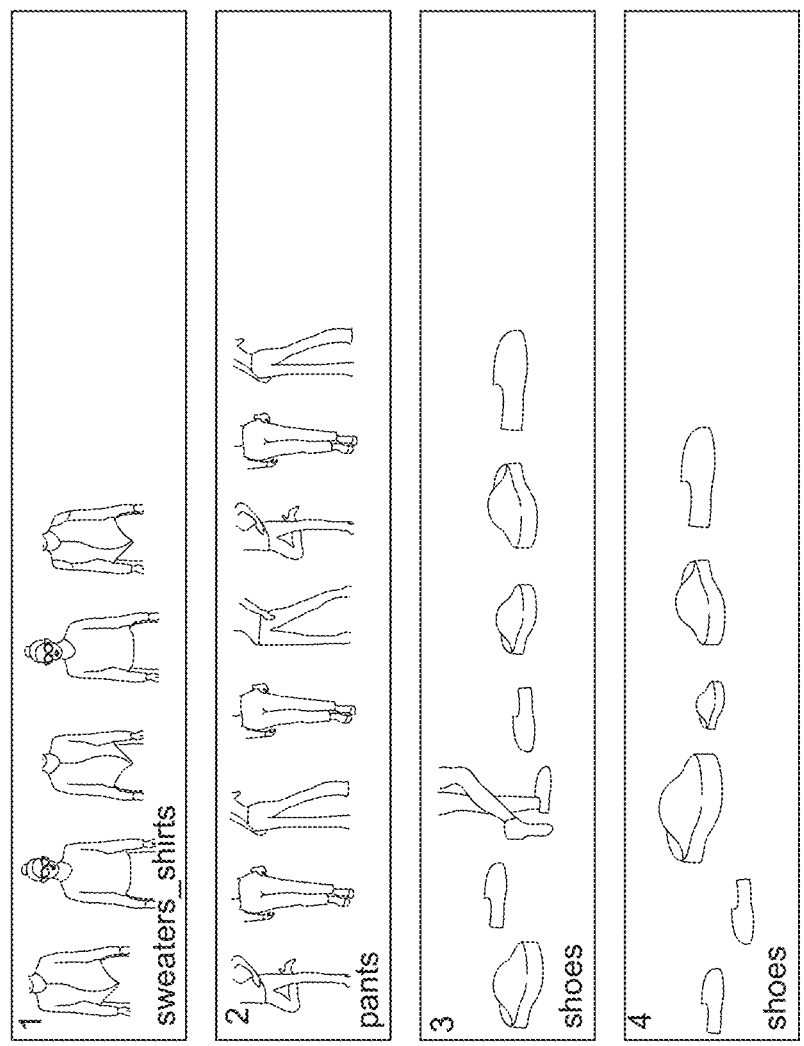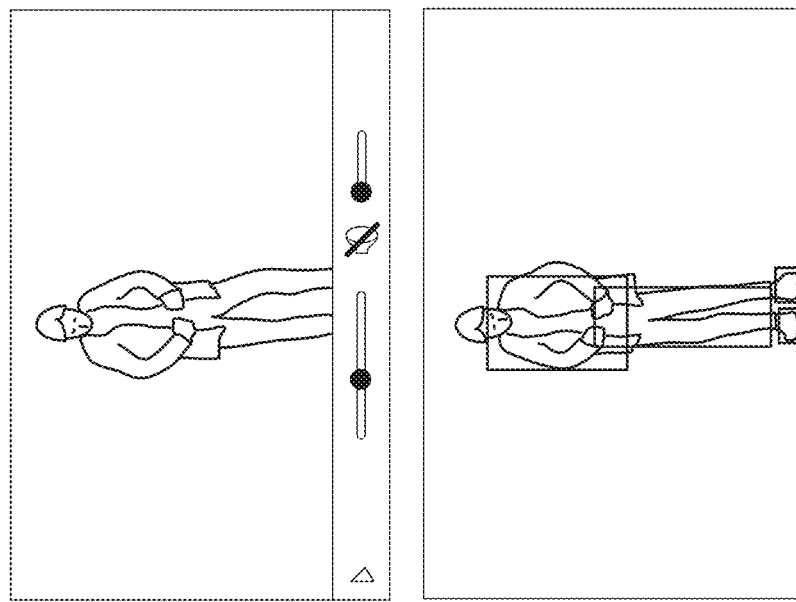
FIG. 34

FIG. 37

SYSTEMS AND METHODS FOR IMPROVING VISUAL SEARCH USING SUMMARIZATION FEATURE

BACKGROUND

Object detection from images and videos is an important computer vision research problem. Object detection from images and videos paves the way for a multitude of computer vision tasks including similar object search, object tracking, and collision avoidance for self-driving cars. Object detection performance may be affected by multiple challenges including imaging noises (motion blur, lighting variations), scale, object occlusion, self-occlusion and appearance similarity with the background or other objects. Therefore, it is desirable to develop robust image processing systems that improve the identification of objects belonging to a particular category from other objects in the image, and that are capable of accurately determining the location of the object within the image (localization).

BRIEF DESCRIPTION OF THE DRAWINGS

Various techniques will be described with reference to the drawings, in which:

FIG. 13 shows an illustrative example of executable instructions that install a product search user interface on a website, in an embodiment;

FIG. 22 shows an illustrative example of a generic object detector and a hierarchical detector, in an embodiment;

FIG. 29 shows an illustrative example of a triplet with overlaid bounding boxes, in an embodiment;

FIG. 34 shows an illustrative example of image and video product retrieval, in an embodiment;

FIG. 37 shows an illustrative example of a product web page that includes product attributes, in an embodiment;

DETAILED DESCRIPTION

Figure 1:
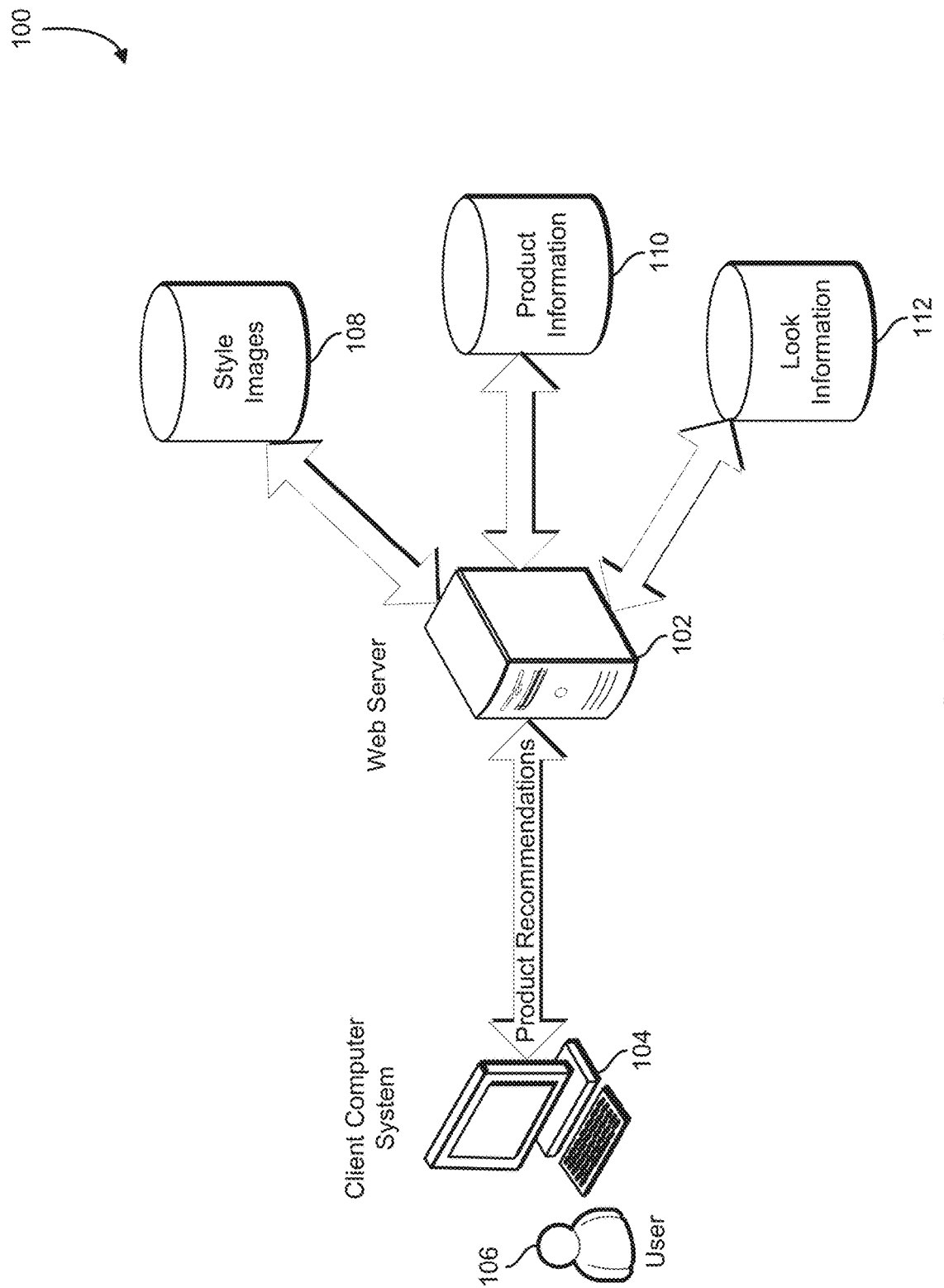
FIG. 1 shows an illustrative example of a system that presents product recommendations to a user, in an embodiment.

The current document describes an image processing system that is capable of identifying objects within images or video segments. In an embodiment, the system operates by identifying regions of an image that contain an object. In an embodiment, for each region, attributes of the object are determined, and based on the attributes, the system may identify the object, or identify similar objects. In some embodiments, the system uses a tracklet to track an object though a plurality of image frames within a video segment, allowing more than one image frame to be used in object detection, and thereby increasing the accuracy of the object detection.

In an embodiment, the system determines a category for each object detected. In one example, a hierarchical detector predicts a tree of categories as output. The approach learns the visual similarities between various object categories and predicts a tree for categories. The resulting framework significantly improves the generalization capabilities of the detector to the novel objects. In some examples, the system can detect the addition of novel categories without the need of obtaining new labeled data or retraining the network.

Various embodiments described herein utilize a deep learning based object detection framework and similar object search framework that explicitly models the correlations present between various object categories. In an embodiment, an object detection framework predicts a hierarchical tree as output instead of a single category. For example, for a 't-shirt' object, a detector predicts ['top innerwear'→'t-shirt']. The upper level category 'top innerwear' includes [blouses_shirts, 'tees', 'tank_camis', 'tunics', 'sweater']. The hierarchical tree is estimated by analyzing the errors of an object detector which does not use any correlation between the object categories. Accordingly, techniques described herein comprise;
1. A hierarchical detection framework for the object domain.
2. A method to estimate the hierarchical/semantic tree based at least in part on directly analyzing the detection errors.
3. Using the estimated hierarchy tree to demonstrate addition of novel category object and performing search.

In an embodiment, the system determines regions of interest within an image by computing bounding boxes and the corresponding categories for the relevant objects using visual data. In some examples, the category prediction assumes that only one of the K total object categories is associated with each bounding boxes. The 1-of-K classification may be achieved by a 'Softmax' layer which encourages each object category to be far away as possible from the other object categories. However, in some examples, this process may fail to exploit the correlation information present in the object categories. For example, a 'jeans' is closer to 'pants' compared to 'coat'. In an embodiment, exploitation of this correlation is accomplished by first predicting 'lower body' and choosing one element from the 'lower body' category which is a set of 'jeans', 'pants', and 'leggings' via hierarchical tree prediction. In some embodiments, the system improves the separation of objects belonging to a particular category from other objects, and improves the identification of the location of the object in the image.

In an embodiment, a hierarchical prediction framework is integrated with an object detector. In some embodiments, the generic detector can be any differentiable (e.g., any deep learning based detector) mapping f(I)→bb, c that takes an input image I and produces a list of bounding boxes bb and a corresponding category c for each of the bounding box. The hierarchical detector learns a new differentiable mapping fh(I)→bb F(c) that produces a path/flow from root category to the leaf category F(C) for each bounding box. A differentiable mapping, in an embodiment, is a mathematical function that can be differentiated with respect to its parameters to estimate the value of those parameters from ground truth data via gradient-based optimization. In an example implementation, there are two steps involved in going from a generic detector to the hierarchical detector. The first step, in an embodiment, is to train a generic detector and estimate the category hierarchy tree as discussed below. Based on the category hierarchy, the deep learning framework is retrained with a loss function designed to predict the hierarchical category.

To estimate the category tree, in an embodiment, one estimates the visual similarity between various categories. Techniques disclosed and suggested herein improve on conventional techniques by organizing the visually similar categories for an object detector. Much prior work has focused on using attribute-level annotations to generate annotation tag hierarchy instead of category-level information. However, such an effort requires large amounts of additional human effort to annotate each category with information such as, viewpoint, object part location, rotation, object specific attributes. Some examples generate an attribute-based (viewpoint, rotation, part location etc.) hierarchical clustering for each object category to improve detection. In contrast, some embodiments disclosed herein, use category level information and only generate a single hierarchical tree for the object categories.

Example implementations of the present disclosure estimate a category hierarchy by first evaluating the errors of a generic detector trained without any consideration of distance between categories and subsequently analyzing the cross-errors generated due to visual-similarity between various categories. In an embodiment, a Faster-RCNN based detector is trained and detector errors are evaluated. For instance, a false positive generated by generic detector (Faster-RCNN detector in the current case) can be detected and some or all the errors that result from visually similar categories are computed. These errors, for example, may be computed by measuring the false positives with bounding boxes having an intersection-over-union ("IOU") ratio between 0.1 to 0.5 with another object category. In this manner, visually similar classes such as 'shoes' and 'boots' will be frequently misclassified with each other resulting in higher cross-category false positive errors.

Many conventional techniques have focused on using attribute-level information apart from the category specific information to perform detection for novel object categories. Some examples use attribute-level information to detect objects from novel categories. For instance, a new object category 'horse' is recognized as a combination of 'legs', 'mammal' and 'animal' categories. Attribute-based recognition requires one to learn attribute specific classifiers and attribute-level annotation for each of object categories. In comparison, some embodiments of the present disclosure neither require attribute annotations nor any attribute specific classifiers. For each new category, an expected root-level category may be assigned and subsequently a bounding box with highest confidence score for that category may be estimated.

Systems operating according to various embodiments disclosed herein perform category specific non-maximal suppression to select bounding boxes for each leaf node categories, where the bounding boxes may be unique. For all the lower level categories, such systems may also suppress the output by considering bounding boxes from all the children nodes. In some embodiments, this helps reduce spurious lower level category boxes whenever bounding boxes from more specific categories can be detected.

In various embodiments, a user interface on a client computer system presents product information to a user. In some examples, the client computer system is a desktop computer system, a notebook computer system, a tablet device, a cellular phone, a thin client terminal, a kiosk, or a point-of-sale device. In one example, the client computer system is a personal computer device running a web browser, and the user interface is served from a web server operated by the merchant to the web browser. The web browser renders the user interface on a display of the personal computer device, and the user interacts with the display via a virtual keyboard or touch screen. In another example, the personal computer device is a personal computer system running a web browser, and the user interacts with the user interface using a keyboard and a mouse. Information exchanged between the client computer system and the Web server operated by the merchant may be exchanged over a computer network. In some embodiments, information is encrypted and transmitted over a secure sockets layer ("SSL") or transport layer security ("TLS") connection.

In various examples, an important consideration is whether the user is able to determine how to combine the offered product with other products to produce a desired appearance or "look." For example, the user may wish to determine whether the offered product "goes with" other products or articles of clothing already owned by the user. In other examples, the user may wish to identify other products that may be purchased to wear with the offered product. In some situations, how the product will be used or worn to produce a desired look may be more definitive than the attractiveness of the individual product. Therefore, it is desirable to produce a system and a user interface that allows the user to easily identify related items that can be used with the offered product to produce various looks.

In an embodiment, the system provides a software development kit ("SDK") that can be added to the web code of a retailer's website. The SDK adds functionality to the retailer's website allowing users to identify items related to products offered for sale that will produce a desired look. The added functionality allow users to feel at ease by providing information on how to wear the offered product by providing style recommendations related to the offered product.

In an embodiment, the SDK visually matches a brand's social media content and lookbook photos to corresponding product pages on the merchant's Web site. The SDK presents a user interface that allows the users to see how celebrities and ordinary people wear the products offered for sale. The system also identifies similar products to the items that the people are wearing with in the recommended look, so that users can compare the entire look.

In an embodiment, the visual search functionality is added to the merchant's website by adding a link to a JavaScript to merchant's website code. The SDK serves as a layer on top of the original website, and in general, the SDK does not interfere with the how the merchant's website operates.

In an embodiment, a user accesses the merchant's website using a web browser running on the client computer system. The web browser loads the code from the merchant's website which includes a reference to the SDK. The web browser loads executable code identified by the reference and executes it within the web browser. In some examples, the executable code is a JavaScript plug-in which is hosted on a computer system.

In an embodiment, the executable code downloaded by the SDK into the users web browser is executed, causing the web browser to display the user interface described herein to the user. In an embodiment, the executable code also causes the web browser to contact an online service. The online service maintains a database of looks, where each look includes a list of products that, when worn together form the associated look. In an embodiment, each look is stored in association with a set of products. In another embodiment, each product in the set of products is characterized as a set of characteristics. For example, a particular look may include a shirt, a pair of pants, and a hat. The shirt, pants, and hat may be identified as particular products that can be purchased. Alternatively, each product may be described as a set of characteristics. For example, the hat may be described as short, Brown, and Tweed, and the shirt may be described as white, longsleeved, V-neck, and cotton knit.

In an embodiment, the online service is provided with a particular article of clothing in the form of a SKU, a product identifier, a set of characteristics, or an image, and the online service identifies one or more looks that include the particular article of clothing. In some embodiments, the online service identifies one or more looks that include similar articles of clothing. The online service returns the look in the form of an image, and information regarding the individual products that are associated with the look. The online service may also include bounding box information indicating where each product is worn on the image.

FIG. 1 shows an illustrative example of a system 100 that presents product recommendations to a user, in an embodiment. In an embodiment, the system 100 includes a Web server 102 that hosts an website. In various examples, the Web server 102 may be a computer server, server cluster, virtual computer system, computer runtime, or web hosting service. The website is a set of hypertext markup language ("HTML") files, script files, multimedia files, extensible markup language ("XML") files, and other files stored on computer readable media that is accessible to the Web server 102. Executable instructions are stored on a memory of the Web server 102. The executable instructions, as a result of being executed by a processor of the Web server 102, cause the Web server 102 to serve the contents of the website over a network interface in accordance with the hypertext transport protocol ("HHTP") or secure hypertext transport protocol ("HTTPS"). In an embodiment, the Web server 102 includes a network interface connected to the Internet.

A client computer system 104 communicates with the Web server 102 using a web browser via a computer network. In an embodiment, the client computer system 104 may be a personal computer system, a laptop computer system, a tablet computer system, a cell phone, or handheld device that includes a processor, memory, and an interface for communicating with the Web server 102. In an embodiment, the interface may be an Ethernet interface, a Wi-Fi interface, cellular interface, a Bluetooth interface, a fiber-optic interface, or satellite interface that allows communication, either directly or indirectly, with the Web server 102. Using the client computer system 104, a user 106 is able to explore products for sale as well as looks that are presented by the Web server 102. In various examples, the Web server 102 recommends various products to the user 106 based on product linkages established through information maintained by the Web server 102.

In an embodiment, the Web server 102 maintains a database of style images 108, a database of product information 110, and the database of look information 112. In various examples, style images may include images or videos of celebrities, models, or persons demonstrating a particular look. The database of product information 110 may include information on where product may be purchased, an associated designer or source, and various attributes of a product such as fabric type, color, texture, cost, and size. The database of look information 112 includes information that describes a set of articles that, when worn together, create a desired appearance. In some examples, the database of look information 112 may be used by the Web server 102 to identify articles of clothing that may be worn together to achieve a particular look, or to suggest additional products for purchase that may be combined with an already purchased product. In an embodiment, recommendations may be made by sending information describing the set of additional products from the Web server 102 to the client computer system 104 via a network.

Figure 2:
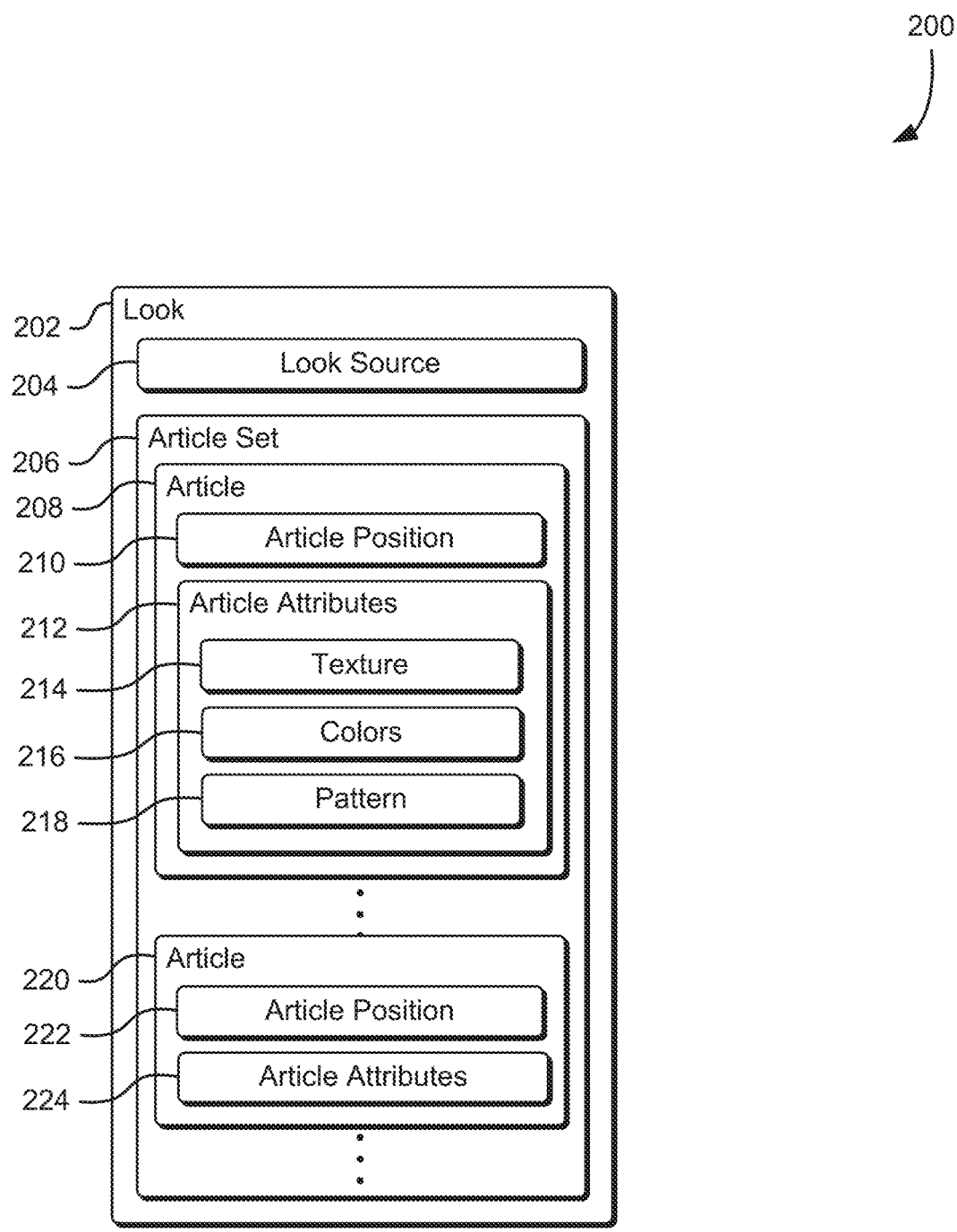
FIG. 2 shows an illustrative example of a data record for storing information associated with a look, in an embodiment.

FIG. 2 shows an illustrative example of a data record 200 for storing information associated with a look, in an embodiment. A data structure is an organization of data that specifies formatting, arrangement, and linkage between individual data fields such that a computer program is able to navigate and retrieve particular data structures and in various fields of individual data structures. A data record is a unit of data stored in accordance with a particular data structure. The data record 200 may be stored in semiconductor memory or on disk that is accessible to the computer system. In an embodiment, a look record 202 includes a look source data field 204, and an article set 206. The look source data field 204 may include a uniform resource locator ("URL"), image identifier, video segment identifier, website address, filename, or memory pointer that identifies an image, video segment, or look book used to generate the look record 202. For example, a look record may be generated based on an image of the celebrity, and the source of the image may be identified in the look source data field 204. In another example, a look record may be generated from entries in a look book provided by a clothing manufacturer, and the look source data field 204 may identify the look book.

The article set 206 is a linked list, array, hash table, or other container structure that holds the set of article records. Each article record in the article set 206 describes an article included in the look. An article can be an article of clothing such as a skirt, shirt, shoes, blouse, hat, jewelry, handbag, watch, or wearable item. In the example illustrated in FIG. 2, the article set 206 includes a first article 208 and a second article 220. In various examples, other numbers of articles may be present in the article set 206. The first article 208 includes an article position field 210 and a set of article attributes 212. The article position field 210 describes a position in which the article is worn. For example, an article may be worn as a top, as a bottom, as a hat, as gloves, as shoes, or carried as a handbag. The set of article attributes 212 describes characteristics of the article and in an example includes a texture field 214, a color field 216, and a pattern field 218. The texture field 214 may specify a fabric type, a texture, a level of translucence, or thickness. The color field 216 may indicate a named color, a color hue, a color intensity, a color saturation, a level of transparency, a reflectivity, or optical characteristic of the article. The pattern field 218 may describe a fabric pattern, a weave, a print design, or image present on the article. The second article 220 includes data fields similar to those in the first article 208 including an article position field 222 and an article attribute set 224.

Figure 3:
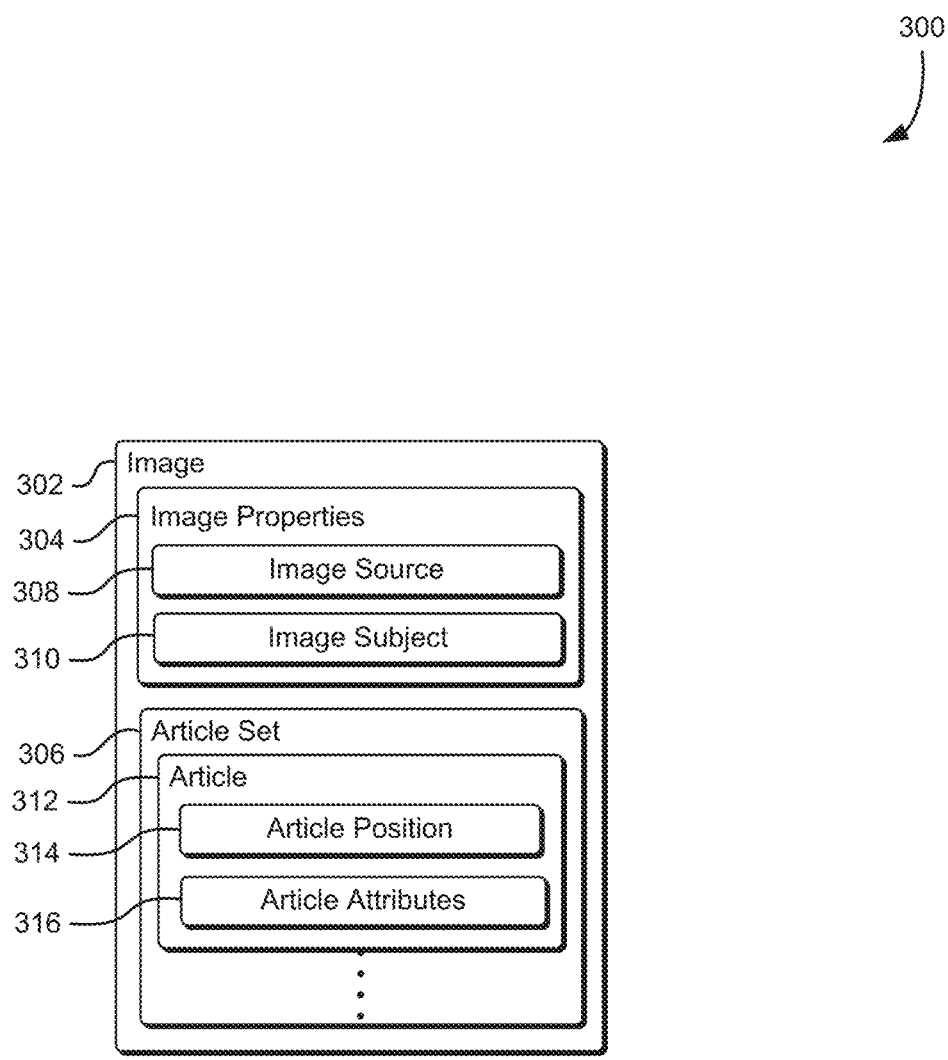
FIG. 3 shows an illustrative example of a data record for storing information associated with an image, in an embodiment.

FIG. 3 shows an illustrative example of a data record 300 for storing information associated with an image, in an embodiment. An image record 302 includes a set of image properties 304 and information that describes an article set 306. The image record 302 may be generated to describe the contents of a digital image or a video segment. For example, if the image record 302 describes a digital image, the set of image properties 304 includes an image source 308 that identifies the image file. If the image record 302 describes a video segment, the image source 308 identifies a segment of a video file. An image subject field 310 includes information describing the subject of the image. For example, the subject may be a model, an actor, or a celebrity.

In an embodiment, the article set 306 includes one or more article records that correspond to a set of articles found within the image. The article records may be stored as an array, linked lists, hash table, relational database, or other data structure. An article record 312 includes an article position 314 and a set of article attributes 316. The article position 314 describes the location of the article relative to the subject of the image. For example, the article position may indicate that the article is a hat, pants, shoes, blouse, dress, watch, or handbag. The set of article attributes 316 may include a texture, color, pattern, or other information associated with an article as described elsewhere in the present application (for example, in FIG. 2).

Figure 4:
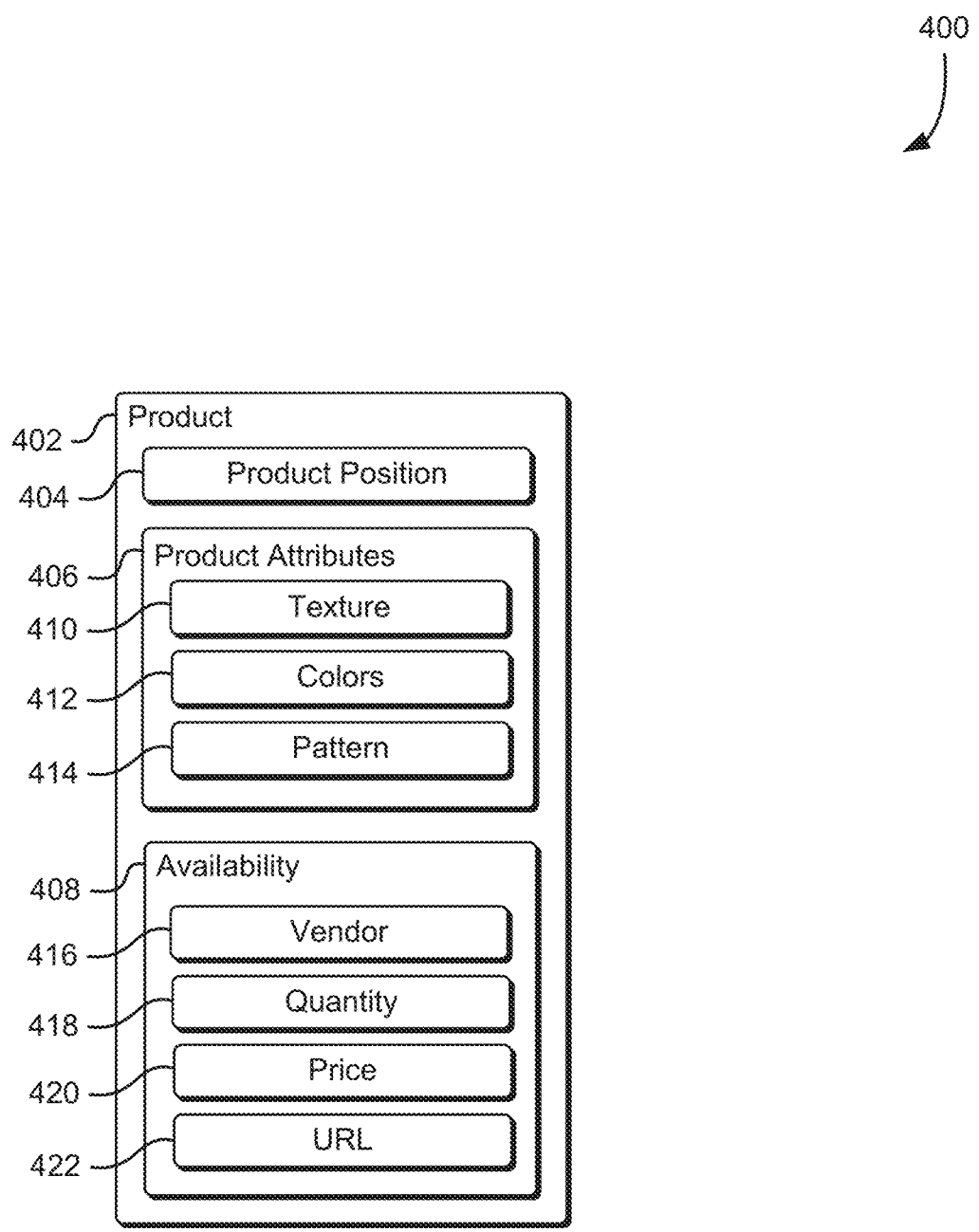
FIG. 4 shows an illustrative example of a data record for storing information associated with a product, in an embodiment.

FIG. 4 shows an illustrative example of a data record 400 for storing information associated with a product, in an embodiment. A product is an article captured in an image or available-for-sale. For example, an article may be described as a large white T-shirt, and a particular product matching that article may be an ABC Corporation cotton large T sold by retailer XYZ. In an embodiment, a product record 402 includes a product position field 404, a set of product attributes 406, and a set of availability information 408. The set of product attributes 406 indicates how the product (such as a hat, pants, shirt, dress, shoes, or handbag) is worn (on the head, legs, torso, whole body, feet, or hand). The set of product attributes 406 contains a variety of subfields that describe attributes of the product. In an example, the set of product attributes 406 includes a texture field 410, a color field 412, and a pattern field 414. In an embodiment, the product attributes may include some or all of the attributes of an article. In some examples, product attributes may include a superset or a subset of the attributes of an article. For example, product attributes may include characteristics that are not directly observable from an image such as a fabric blend, a fabric treatment, washing instructions, or country of origin.

In an embodiment, the set of availability information 408 includes information that describes how the product may be obtained by user. In an embodiment, the set of availability information 408 includes a vendor field 416, a quantity field 418, a price field 420, and a URL field 422. The vendor field 416 identifies a vendor or vendors offering the product for sale. The vendor field 416 may include a vendor name, a vendor identifier, or a vendor website address. The quantity field 418 may include information describing the availability of the product including the quantity of the product available for sale, the quantity of the product available broken down by size (for example how many small, medium, and large), and whether the product is available for backorder. The price field 420 indicates the price of the product and may include quantity discount information, retail, and wholesale pricing. The URL field 422 may include a URL of an Web site at which the product may be purchased.

Figure 5:
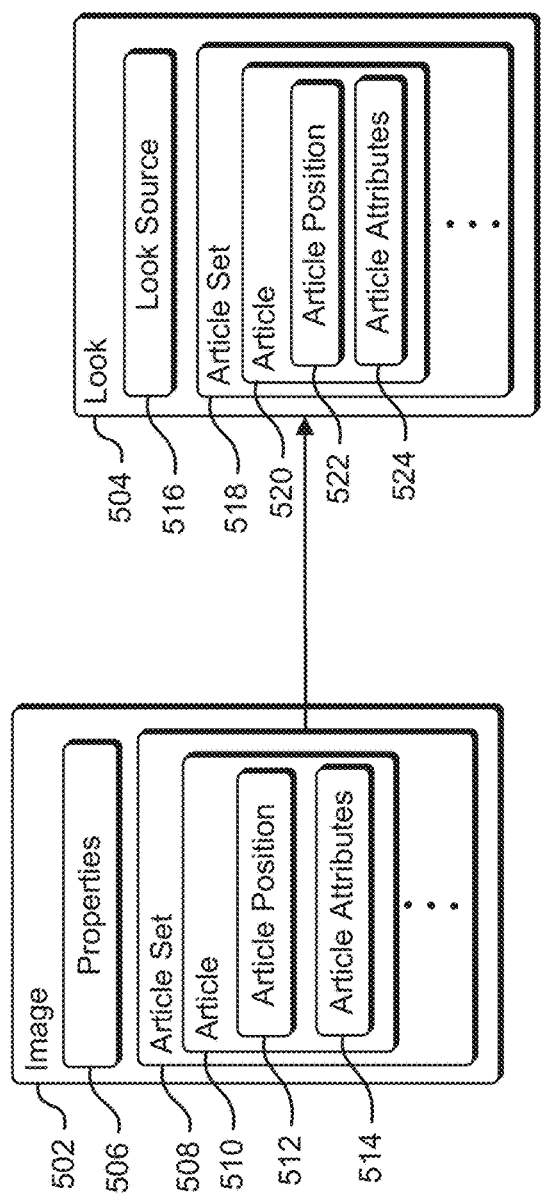
FIG. 5 shows an illustrative example of an association between an image record and a look record, in an embodiment.

FIG. 5 shows an illustrative example of an association 500 between an image record and a look record, in an embodiment. An association between records may be established using a pointer, a linking record that references each of the linked records, or by establishing matching data values between the associated records. FIG. 5 illustrates an association between a set of articles detected in an image, and a set of articles that make up a look. In an embodiment, the system is provided with an image in the form of an URL, filename, image file, or video segment. The system processes the image to identify a set of articles worn by a subject. For example, a picture of a celebrity may be submitted to the system to identify a set of articles worn by the celebrity. Once the articles worn by the subject of the image are identified, an associated look record can be created.

In an embodiment, an image record 502 includes a set of image properties 506 and information that describes an article set 508. The image record 502 may be generated to describe the contents of a digital image or a video segment. For example, if the image record 502 describes a digital image, the set of image properties 506 includes an image source field that identifies the image file. If the image record 502 describes a video segment, the image properties 506 identify a segment of a video file. An image subject field may include information describing the subject of the image. For example, the subject may be a model, an actor, or a celebrity.

In an embodiment, the article set 508 includes one or more article records that correspond to a set of articles found within the image. The article records may be stored as an array, linked lists, hash table, relational database, or other data structure. An article record 510 includes an article position 512 and a set of article attributes 514. The article position 512 describes the location of the article relative to the subject of the image. For example, the article position (head, feet, torso etc.) may suggest that the article is a hat, pants, shoes, blouse, dress, watch, or handbag. The set of article attributes 514 may include a texture, color, pattern, or other information associated with an article as described elsewhere in the present application (for example, in FIG. 2).

In an embodiment, a look record 504 includes a look source data field 516, and an article set 518. The look source data field 516 may include a uniform resource locator ("URL"), image identifier, video segment identifier, website address, filename, or memory pointer that identifies an image, video segment, or look book used to generate the look record 504. For example, a look record may be generated based on an image of the celebrity, and the source of the image may be identified in the look source data field 516. In another example, a look record may be generated from entries in a look book provided by a clothing manufacturer, and the look source data field 516 may identify the look book.

The article set 518 is a linked list, array, hash table, or other container structure that holds the set of article records. Each article record in the article set 518 describes an article included in the look. An article can be an article of clothing such as a skirt, shirt, shoes, blouse, hat, jewelry, handbag, watch, or wearable item. In the example illustrated in FIG. 5, the article set 518 includes an article 520. In various examples, other numbers of articles may be present in the article set 518. The article record 510 includes an article position field 522 and a set of article attributes 524. The article position field 522 describes a position in which the article is worn. For example, an article may be worn as a top, as a bottom, as a hat, as gloves, as shoes, or carried as a handbag. The set of article attributes 524 describes characteristics of the article and, for example, may include a texture field, a color field, and a pattern field.

In various embodiments, the look record 504 may be used by the system to make recommendations to a user by identifying particular products that match articles in the article set 518. By identifying particular products that match the articles in the article set 518, the system helps the user identify those products that, when worn together, achieve a look similar to that captured in the image.

Figure 6:
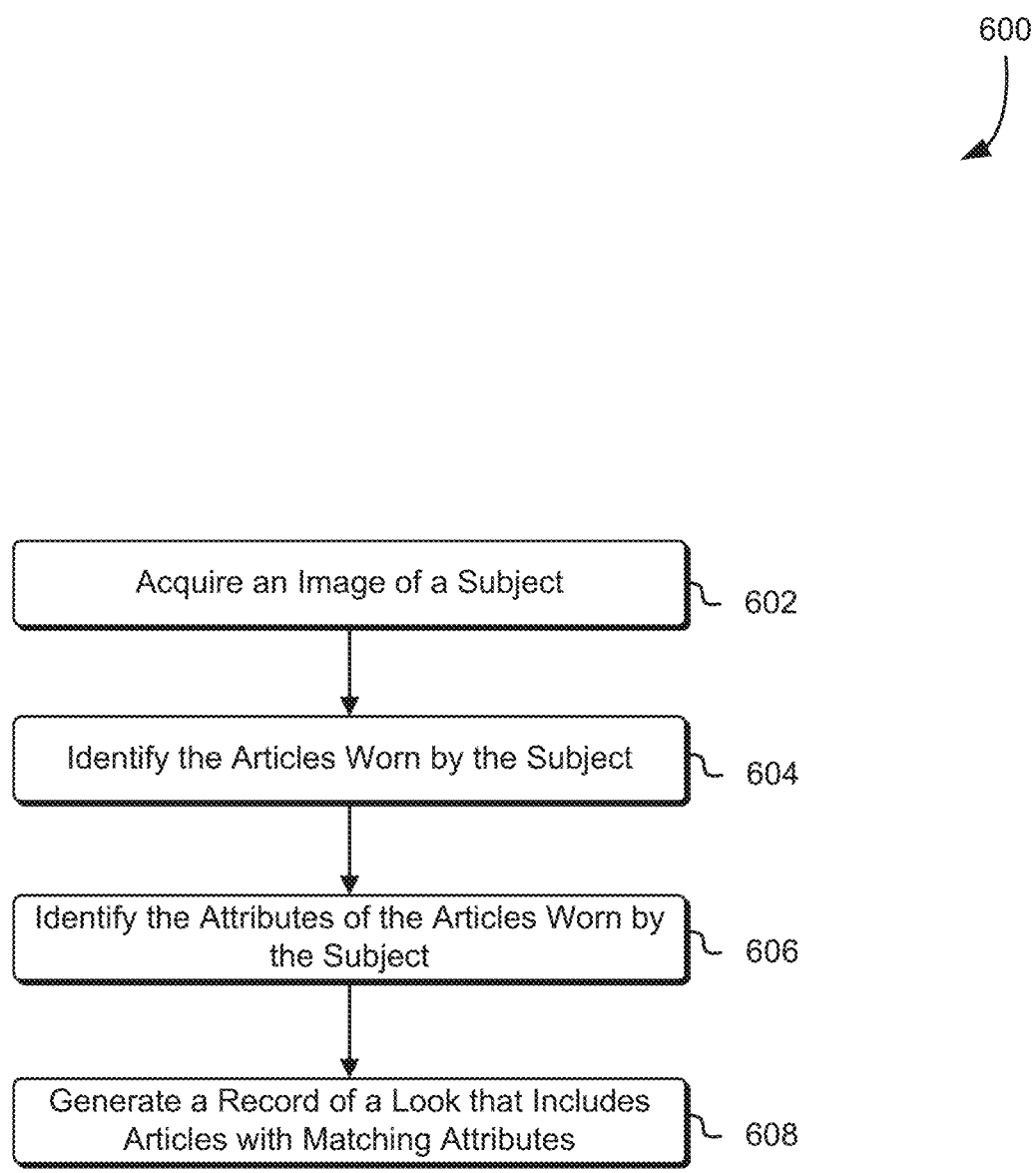
FIG. 6 shows an illustrative example of a process that, as a result of being performed by a computer system, generates a look record based on an image, in an embodiment.

FIG. 6 shows an illustrative example of a process 600 that, as a result of being performed by a computer system, generates a look record based on an image, in an embodiment. The process begins at block 602 with a computer system acquiring an image of the subject. In various examples, the image may be acquired by acquiring a file name, file identifier, a stream identifier, or a block of image data. In additional examples, the image may be acquired as a portion of a video stream or as a composite of a number of frames within a video stream. For example, the image may be specified as information that identifies a video file, and a position within the video file.

In an embodiment, at block 604, the computer system identifies a set of articles worn by a subject within the image. In some embodiments, the computer system identifies the particular subject as a particular celebrity or model. In some embodiments, the computer system identifies characteristics of the subject such as male, female, youth, or infant. In some examples, the computer system identifies a plurality of subjects present in the image. In an embodiment, for at least one of the subjects, the computer system identifies a set of articles worn by the subject. As described elsewhere in the current application, articles may be articles of clothing, accessories, jewelry, handbags, or items worn by the subject. The computer system identifies a position or way in which each article is worn by the subject. In an embodiment, the computer system identifies the article as a hat, pants, dress, top, watch, handbag, necklace, bracelet, earing, pin, broach, sash, or belt.

In an embodiment, at block 606, the computer system identifies one or more attributes for each article worn by a subject. Attributes may be identified such as those identified elsewhere in the current document. In various embodiments, the computer system identifies a texture, color, material, or finish on the article. In additional embodiments, the computer system identifies a size of the article. The size of the article may be determined based at least in part on the identity of the subject.

At block 608, the computer system generates a record of a look in accordance with the items worn by a particular subject in the image. In some embodiments, the computer system generates a look record based on the articles worn by each subject identified in the image. The look record includes source information that identifies the image, and article information identified above. The look record may be constructed in accordance with the record structure shown in FIG. 2.

Figure 7:
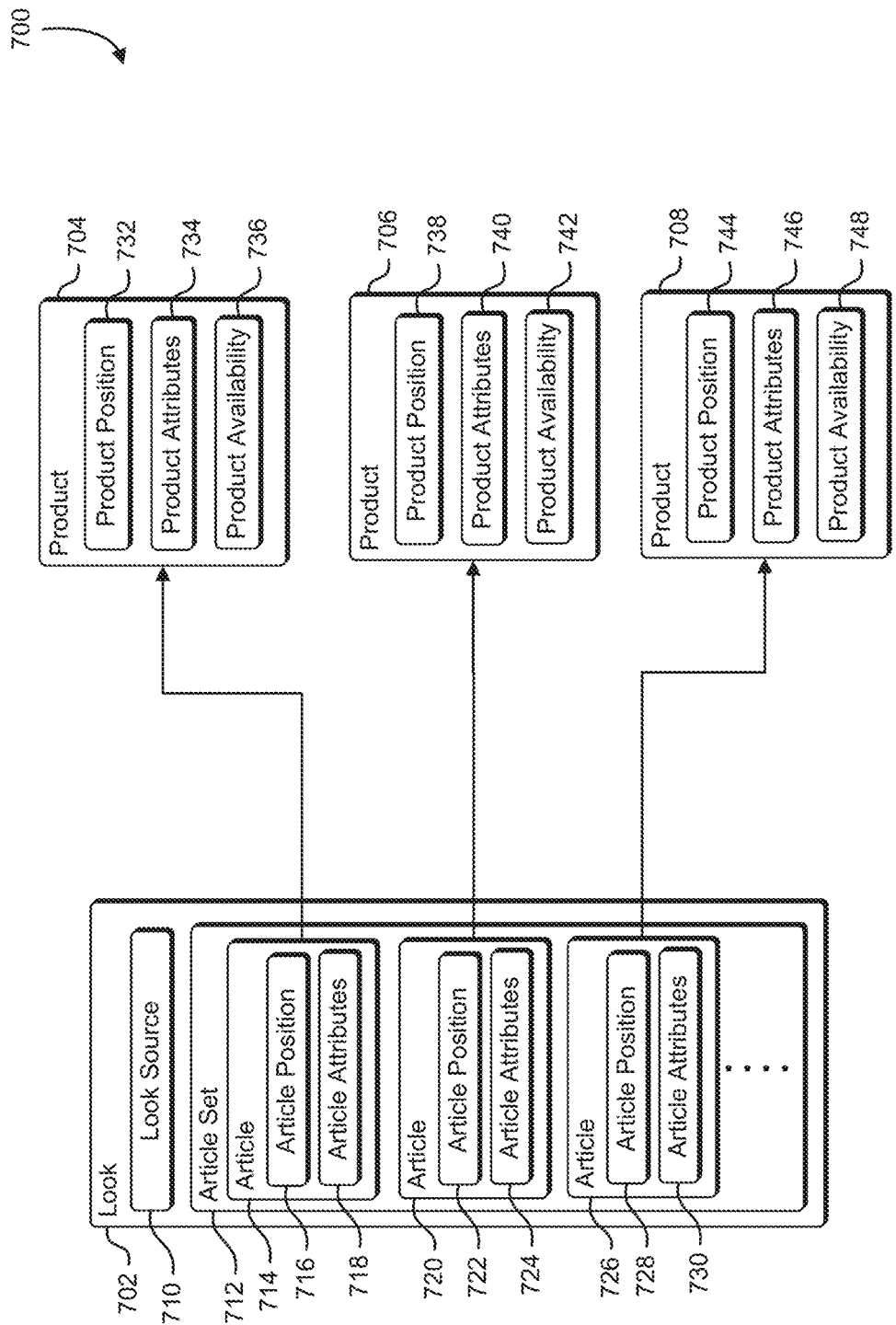
FIG. 7 shows an illustrative example of an association between a look record and a set of product record, in an embodiment.

FIG. 7 shows an illustrative example of an association 700 between a look record and a set of product records, in an embodiment. In an embodiment, a look record can be used by the system to identify products that, when worn together, can reproduce an overall appearance or "look" associated with the look record. In an embodiment, a look record 702 includes a look source data field 710, and an article set 712. The look source data field 710 may include a uniform resource locator ("URL"), image identifier, video segment identifier, website address, filename, or memory pointer that identifies an image, video segment, or look book used to generate the look record 702. For example, a look record may be generated from entries in a look book provided by a clothing manufacturer, and the look source data field 710 may identify the source of the look book.

The article set 712 is a linked list, array, hash table, or other container structure that holds the set of article records. Each article record in the article set 712 describes an article included in the look. An article can be an article of clothing such as a skirt, shirt, shoes, blouse, hat, jewelry, handbag, watch, or wearable item. In the example illustrated in FIG. 7, the article set 712 includes a first article 714, a second article 720, and a third article 726. In various examples, other numbers of articles may be present in the article set 712. Each article includes information that describes an article position and article attributes. In the example shown, the first article 714 includes an article position field 716 and a set of article attributes 718. The second article 720 includes an article position field 722 and a set of article attributes 724. The third article 726 includes an article position field 728 and a set of article attributes 730. The article position fields describe a position in which the associated article is worn. The article attributes describe various aspects of each article as described elsewhere in the present document.

In an embodiment, the computer system identifies products matching various articles in the look record 702. In the example shown in FIG. 7, the computer system identifies a first product record 704 that matches the first article 714, a second product record 706 that matches the second article 720, and a third product record 708 that matches the third article 726. In some examples, the computer system may identify a plurality of products that match a particular article in the look record 702. Each product record includes an associated product position 732, 738, 744, product attributes 734, 740, 746, and product availability 736, 742, 748, as described elsewhere in the present document. In an embodiment, a product matches an article if the article position matches the product position and a threshold proportion of the product attributes match the attributes of the associated article. In some examples, all product attributes match all article attributes. In another example, selected attributes such as color and style match to match the product and an article. In yet another example, a measure of similarity is determined between a product and an article, and a match is determined when the measure of similarity exceeds a threshold value. By identifying a set of products that match a set of articles in a look, the system is able to recommend products to users that, when worn together, produce a similar look. In some examples, the system uses information in the product records to direct the user to websites or merchants from which the particular products can be purchased.

Figure 8:
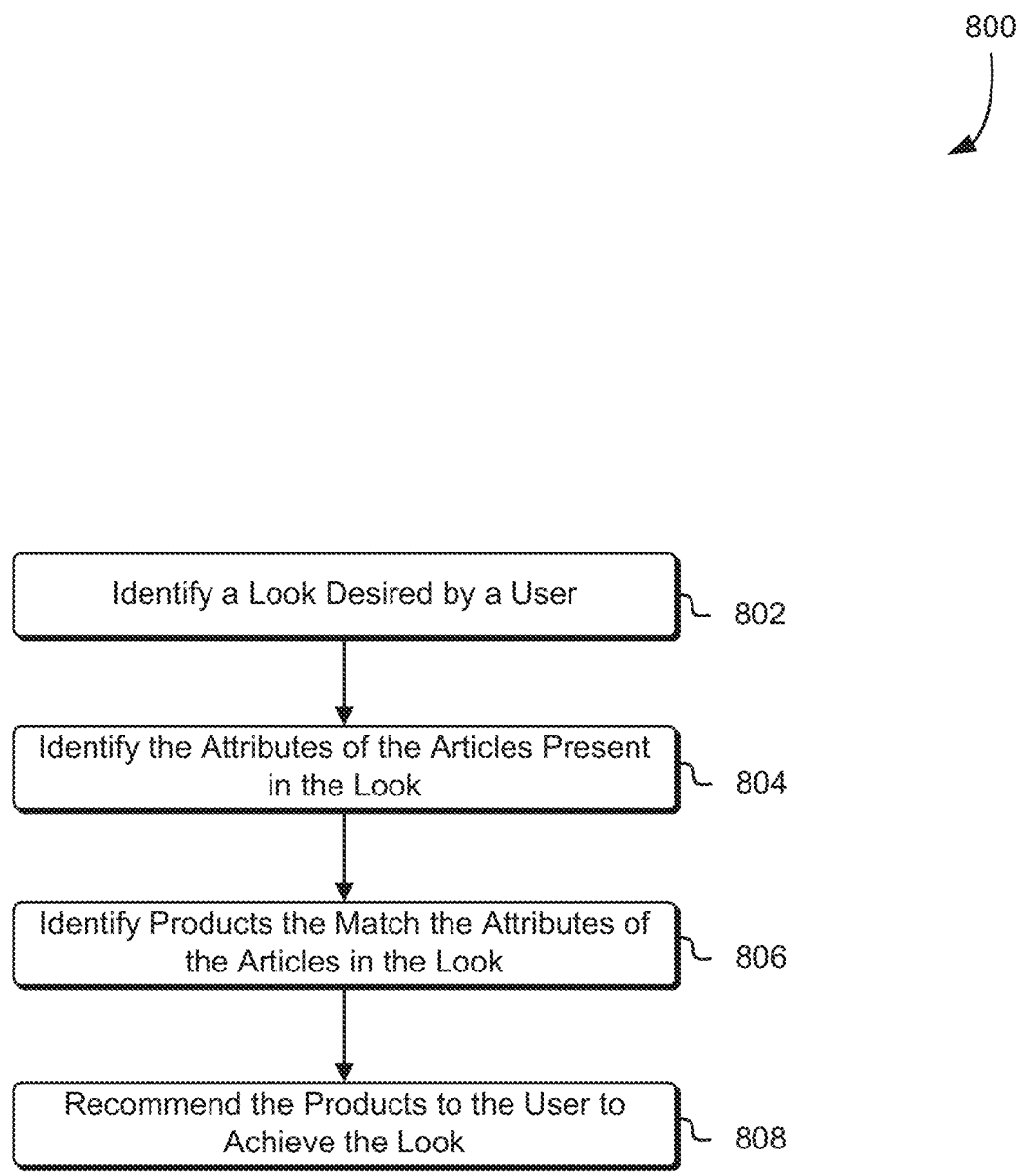
FIG. 8 shows an illustrative example of a process that, as a result of being performed by a computer system, identifies a set of products to achieve a desired look, in an embodiment.

FIG. 8 shows an illustrative example of a process 800 that, as a result of being performed by a computer system, identifies a set of products to achieve a desired look, in an embodiment. In an embodiment, the process begins at block 802 with the computer system identifying a look desired by a user. The look may be identified by selecting an image from which a look is generated, by selecting a look record from which a look is already been generated or otherwise acquired, or by supplying an image or video segment from which look record can be generated.

At block 804, the computer system identifies the attributes of the articles present in the selected look. In various examples, the look may include a plurality of articles where each article has a set of attributes as described above. At block 806, the system searches a product database to identify products having attributes that match the articles in the selected look. In some embodiments, a product database is specified to limit the search to products from a given manufacturer or available from a particular merchant website. In some implementations, matching products have all of the attributes of an article in the look. In another implementation, matching products have a threshold percentage of the attributes of an article in the look.

At block 808, the computer system presents the identified products to the user. The products may be presented in the form of a webpage having graphical user interface elements as shown and described in the present document. In some examples, the user may be directed to similar looks to identify additional products.

Figure 9:
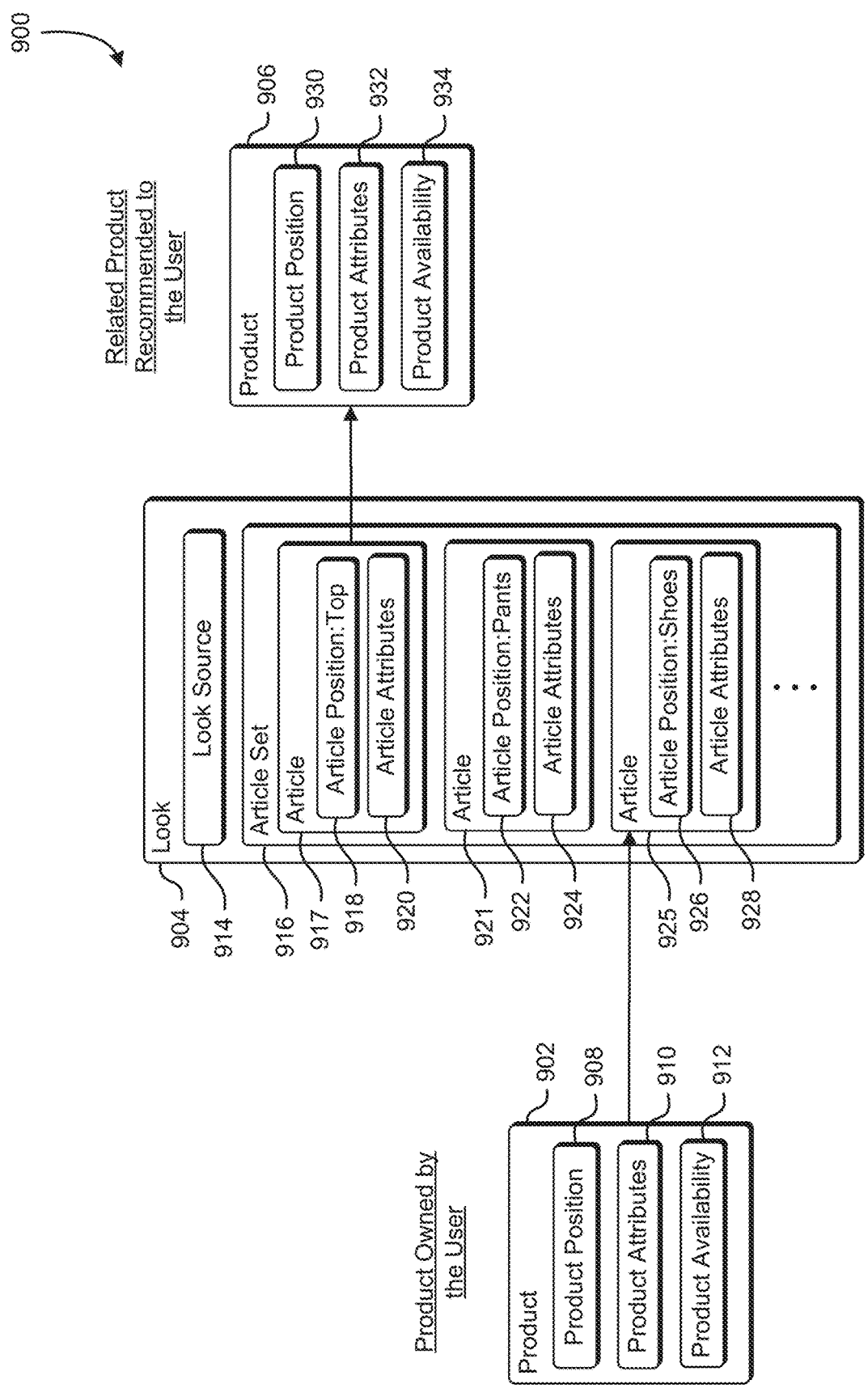
FIG. 9 shows an illustrative example of an association between a product owned by a user, and related product that may be worn with the user's product to achieve a look, in an embodiment.

FIG. 9 shows an illustrative example of an association 900 between a product owned by a user, and a related product that may be worn with the user's product to achieve a look, in an embodiment. In an embodiment, a first product record 902 is used to identify a look record 904 which in turn is used to identify a second product record 906. The first product record 902 holds information that represents a product selected by the user. In some examples, the product is a product in a cart of an Web site. In another example, the product is a product previously purchased by the user. In yet another example, the product is a product currently owned by the user. The first product record includes a product position field 908, a set of product attributes 910, and product availability information 912. The product position field 908 and a set of product attributes 910 used to identify the look record 904 based on the presence of an article that matches the attributes in position of the first product record 902. In some implementations a plurality of look records may be identified based on the presence of matching articles.

In an embodiment, the look record 904 includes a look source field 914, and a set of articles 916. In the example shown in FIG. 9, the set of articles 916 includes a first article 917, a second article 921, and a third article 925. The first article 917 includes an article position field 918 and a set of article attributes 920. The second article 921 includes an article position field 922 and a set of article attributes 924. The third article 925 includes an article position field 926 and a set of article attributes 928.

In the example illustrated in FIG. 9, the computer system identifies that the attributes in the first product record 902 match the article attributes 928 of the third article 925. As a result of the presence of the matching article, the computer system examines the other articles in the set of articles 916 and searches for products matching the attributes of each article in the set of articles 916. In the example shown in FIG. 9, the computer system identifies the second product record 906 which has a product position field 930, a set of product attributes 932, and a set of product availability information 934, and determines that the product attributes 932 and product position field 930 match the corresponding article position field 918 and article attributes 920 of the first article 917. In an embodiment, the computer system recommends the product represented by the second product record 906 as one that can be worn with the product associated with the first product record 902 to achieve the look represented by the look record 904.

Figure 10:
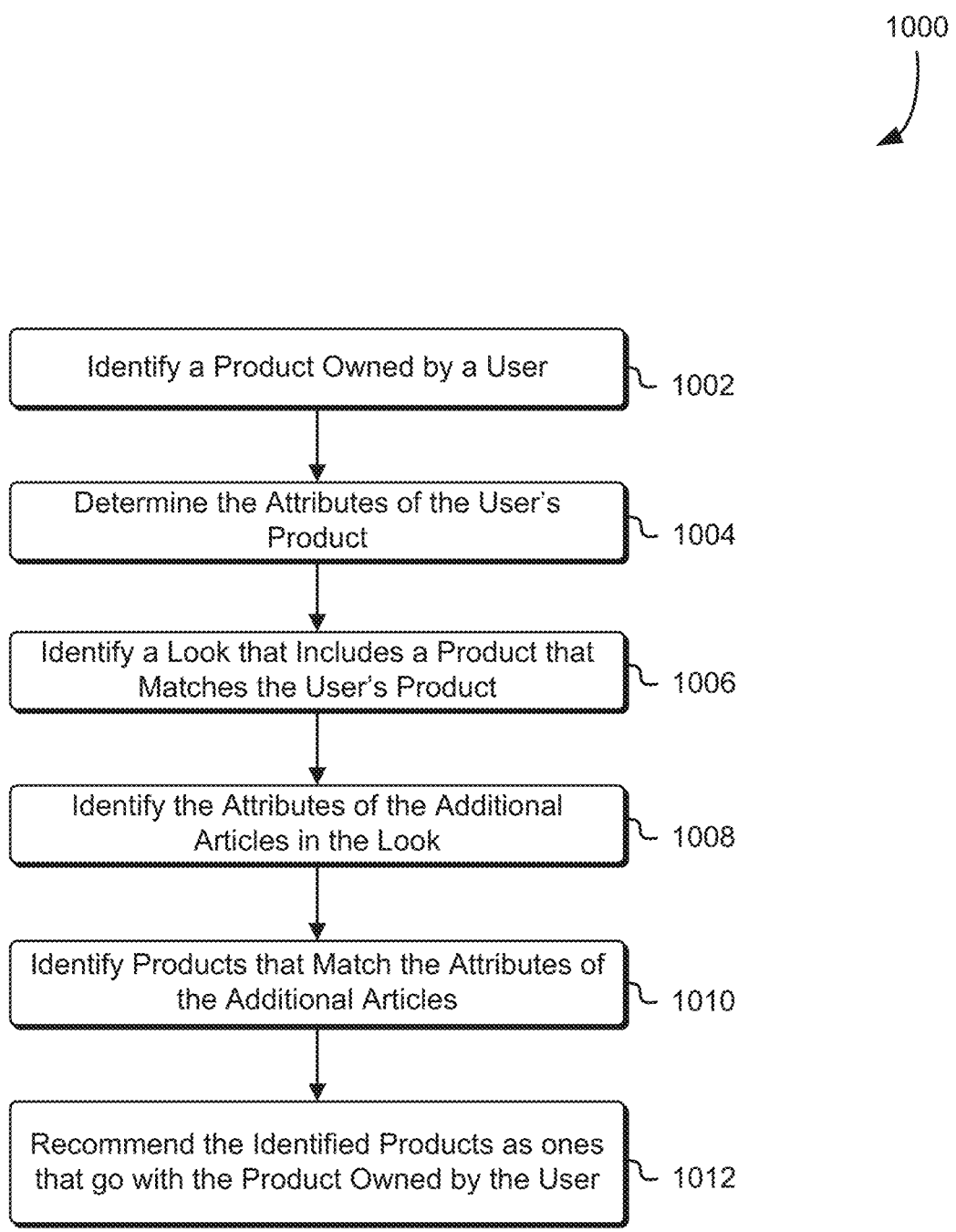
FIG. 10 shows an illustrative example of a process that, as a result of being performed by a computer system, identifies a product that may be worn with an indicated product to achieve a particular look, in an embodiment.

FIG. 10 shows an illustrative example of a process 1000 that, as a result of being performed by a computer system, identifies a product that may be worn with an indicated product to achieve a particular look. In an embodiment, the process begins at block 1002 with the computer system identifying a product owned by a user. In some examples, the computer system searches a purchase history of the user and identifies the product as one that has previously been purchased by the user. In another implementation, the product may be a product in an electronic shopping cart of a website. At block 1004, the computer system determines the attributes of the identified product such as the color, texture, pattern, and position of the product when worn by the user. In some implementations, the attributes are determined based on an image of the product. In other implementations, the products are retrieved from a product database provided by the manufacturer or retailer.

In an embodiment, at block 1006, the computer system identifies a look that includes a product that matches the identified product. In some implementations, the computer system identifies look records from a database of look records that have a sufficient number of matching attributes with the identified product. In another implementation, the computer system identifies look records that contain a matching product. At block 1008, the computer system searches the identified look records and identifies additional articles in those look records. For each additional article in the identified look records, the computer system identifies the attributes of those articles, and at block 1010, identifies products from a product database containing a sufficient set of matching attributes of those articles. In this way, in some examples, the system identifies products that when worn with the identified product, "go together" or produce the "look" associated with the linking look record.

At block 1012, the system presents the identified products as recommendations to the user. In some implementations, the recommendations may be presented along with the look so that the user can visualize how the articles may be worn together to produce the linking look.

Figure 11:
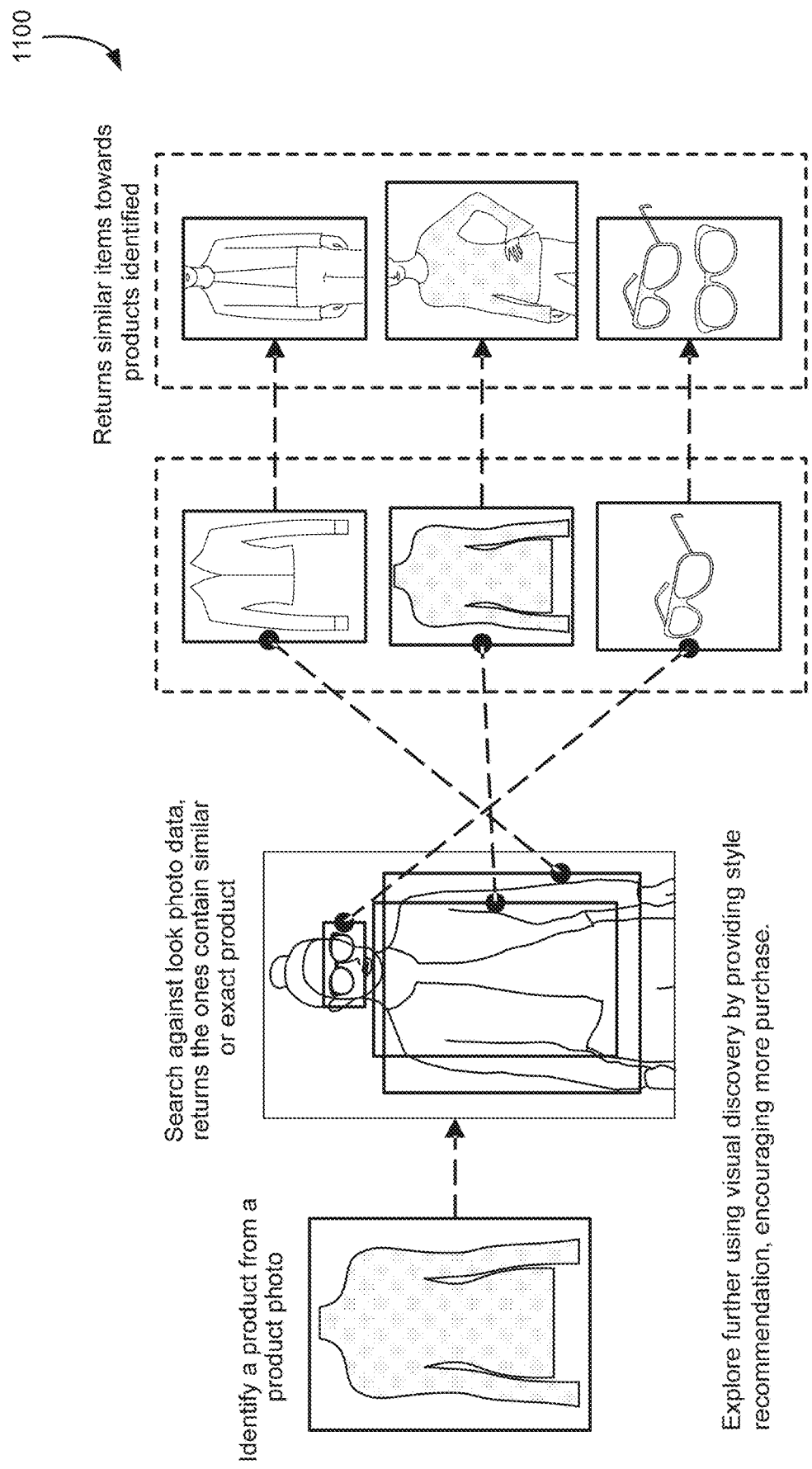
FIG. 11 shows an illustrative example of a process that identifies, based at least in part on a specified article of clothing, a set of additional articles that, when worn in combination with the selected article of clothing, achieve a particular look, in an embodiment.

FIG. 11 shows an illustrative example of a process that identifies, based at least in part on a specified article of clothing, a set of additional articles that, when worn in combination with the selected article of clothing, achieve a particular look, in an embodiment. While viewing a website, a user identifies a particular product such as a shirt as indicated in FIG. 11. In order to view looks that are relevant to the particular product, the user is able to click on an icon, button, or other UI element that signals the SDK to find related looks. Information identifying a product is sent from the user's web browser to an online service. In some embodiments, information is an image of the product. In other embodiments, information is a SKU, product identifier, or list of product characteristics.

The online service receives the identifying information, and uses the identifying information to identify one or more associated looks. In some embodiments, associated looks are identified as looks that include the identified product. In another embodiment, associated looks identified as looks that include a product similar to the identified product. The online service returns look information to the web browser. The look information includes an image of the look, a list of products associated with a look, and a bounding box identifying each associated product in the image of the look.

Upon receiving the information identifying the look, the executable code running on the browser displays the look, and highlights the products that are associated with the look. In some examples, each product associated with a look is surrounded by a bounding box. By selecting a bounding box, the user is presented with an image of the associated product. In some examples, the user is presented with additional information about the associated product and may also be presented with an option to purchase the associated product. In some embodiments, the user interface allows the user to explore products similar to a selected product. In this way, users may be provided with the matching products that are associated with a look, as well as similar products that may be used to achieve a similar look.

In various embodiments, the system attempts to identify, from a specified set of catalogs, products that are present within a particular look, based at least in part on a set of identified characteristics of each product in the look. If the system is unable to find a product matching a particular set of product characteristics, the system will attempt to identify the most similar product from the set of catalogs. The system presents product images for the identified products to the user. If the user selects a product image, the system identifies one or more similar products from the available catalogs, and the similar products are presented to the user in order of their similarity to the selected product. In some embodiments, the available sources of product information may be limited to a particular set of catalogs selected by the user hosting the SDK. In some examples, results may be sorted so that similar products from a preferred catalog are presented higher in the search results.

In an embodiment, the system may be adapted to identify articles of clothing that may be worn in combination with other articles of clothing to produce a desired look or overall appearance. In an embodiment, a user selects an article of clothing such as a shirt, dress, pants, shoes, watch, handbag, jewelry, or accessory. In various embodiments, the article may be selected from an web page, a digital image, or even a video stream. In an embodiment, the system identifies one or more looks that contain the selected article, or one or more looks that contain an article similar to the selected article. A look is a collection of articles that, when worn together, create a particular overall appearance. Looks may be ranked in accordance with a preference of the user, a score assigned by an influencer, a popularity measure, a style tag, a celebrity identity, or other measure. In some examples, the user interface allows the user to navigate a plurality of looks to identify a desired overall appearance. In some examples, the system allows the user to select a look, and in response, the user interface presents associated articles of clothing that, when worn together, produce the selected look. In some embodiments, the user interface identifies similar articles of clothing that may be combined to produce the selected look.

Figure 12:
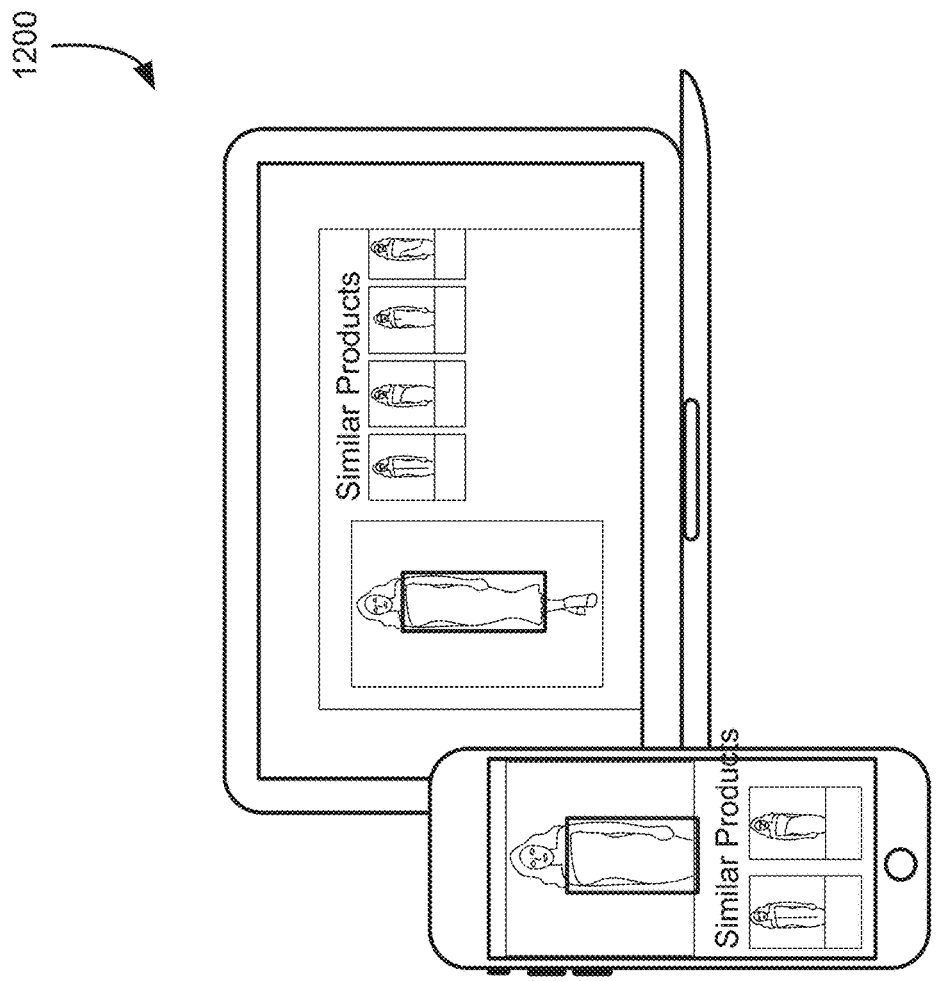
FIG. 12 shows an illustrative example of a user interface product search system displayed on a laptop computer and mobile device, in an embodiment.

FIG. 12 shows an illustrative example of a user interface product search system displayed on a laptop computer and mobile device, in an embodiment. In various embodiments, the SDK may be applied to retailer websites, social media websites, and browser extensions. Platforms that implement the SDK may be accessed from mobile devices or desktop devices.

FIG. 13 shows an illustrative example of executable instructions that install a product search user interface on a website, in an embodiment. In one example, the SDK is installed by adding the lines of code shown to a webpage on a merchant website. The SDK may be served from a variety of locations including the merchant's website itself or from a third-party. The SDK may be served from various websites including third party Web platforms.

The website owner can customize the design completely using cascading style sheets ("CSS") within their own website code.

Figure 14:
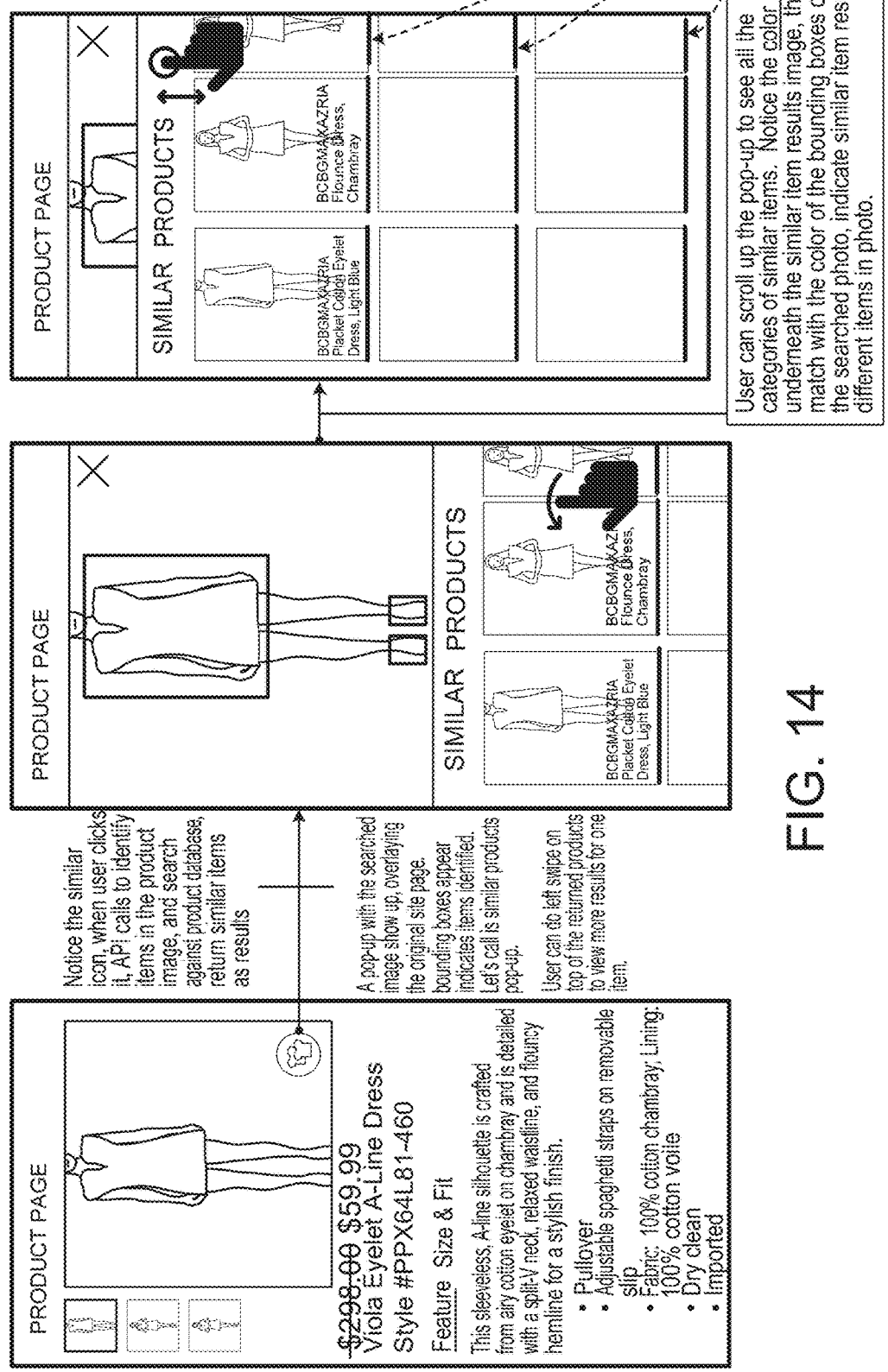
FIG. 14 shows an illustrative example of a user interface for identifying similar products using a pop-up dialog, in an embodiment.

FIG. 14 shows an illustrative example of a user interface for identifying similar products using a pop-up dialog, in an embodiment. In an example shown in FIG. 14, an icon in the left-hand panel is clicked to bring up the pop-up dialog showing the product and similar products. Clicking on the icon generates a call to the application programming interface, and the identity of the product is communicated to an online service. In some embodiments, the identity of the product is communicated in the form of an image. In other embodiments, the identity of the product is communicated in the form of a product identifier, or list of product characteristics. The online service identifies similar products, and information describing the similar products including images of the similar products is returned to the SDK running on the browser. The SDK displays the center dialog showing the product and the similar products. In some embodiments, bounding boxes appear indicating an identified product. By swiping left on the returned products, the SDK presents a sequence of similar products. By scrolling up and down the user can see different categories of similar items. For example, by scrolling up and down the user can see similar tops, or similar shoes. In the example shown in FIG. 14, the bounding boxes have a color that matches the color bar underneath each similar product.

Figure 15:
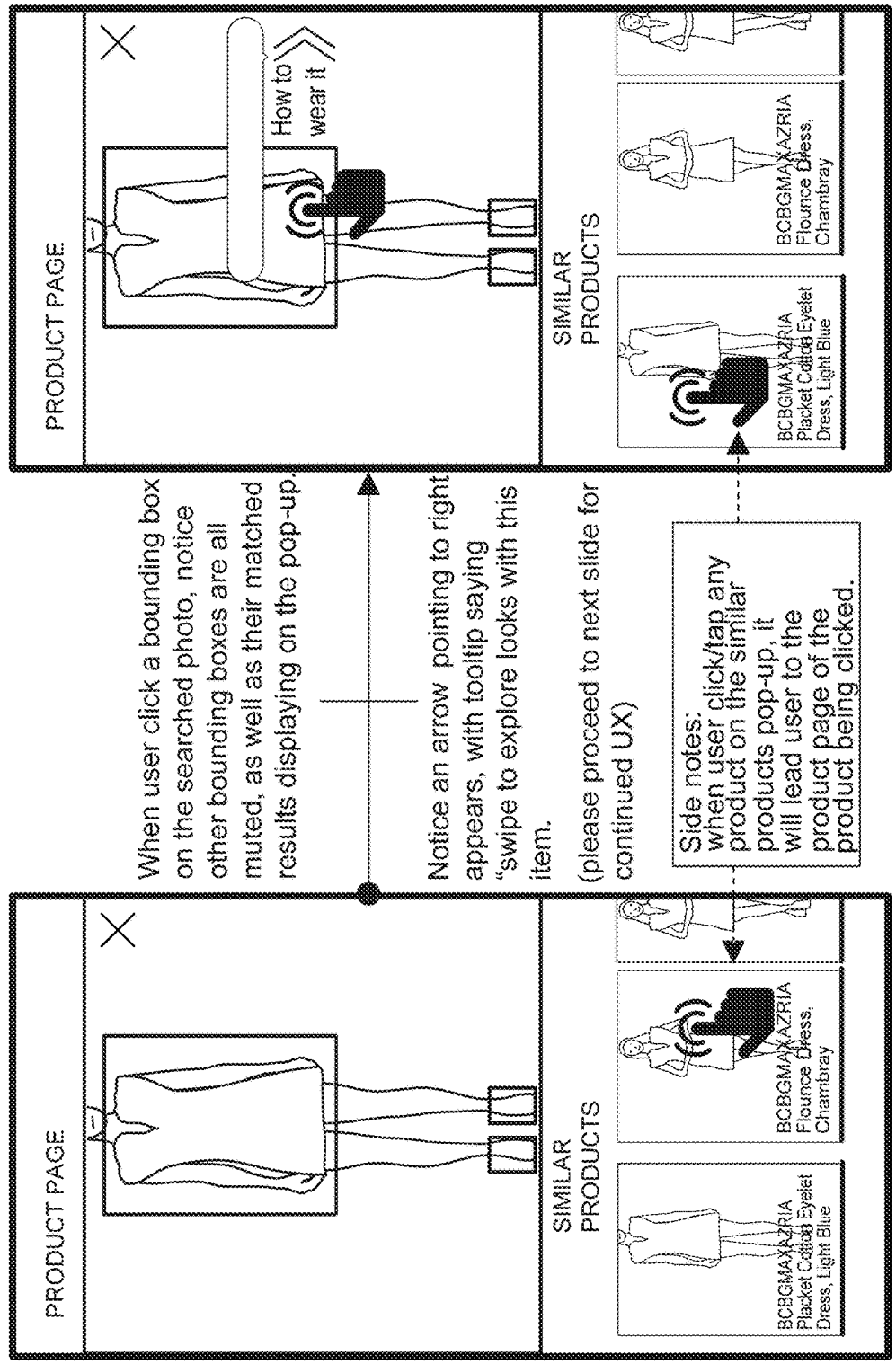
FIG. 15 shows an illustrative example of a user interface for identifying similar products, in an embodiment.

FIG. 15 shows an illustrative example of a user interface for identifying similar products, in an embodiment. In an embodiment, when the user selects a product, information identifying the product is sent to an online service. The online service processes the image and identifies one or more products, each of which is surrounded by a colored bounding box. The image and information identifying the bounding box is returned to the client.

When the user clicks on a bounding box, other bounding boxes are muted to indicate selection of the bounding box. Products matching the selected product (that is associated with the selected bounding box) are highlighted in the bottom portion of the pop-up dialog.

In some examples, an arrow pointing to the right appears as indicated in the dialogue on the right half of FIG. 15. By swiping across the product image, the SDK receives information that identifies the product, and the online service identifies looks that are associated with the product. When a user selects a product on the similar products pop-up, the user is led to the product page of the product being clicked.

Figure 16:
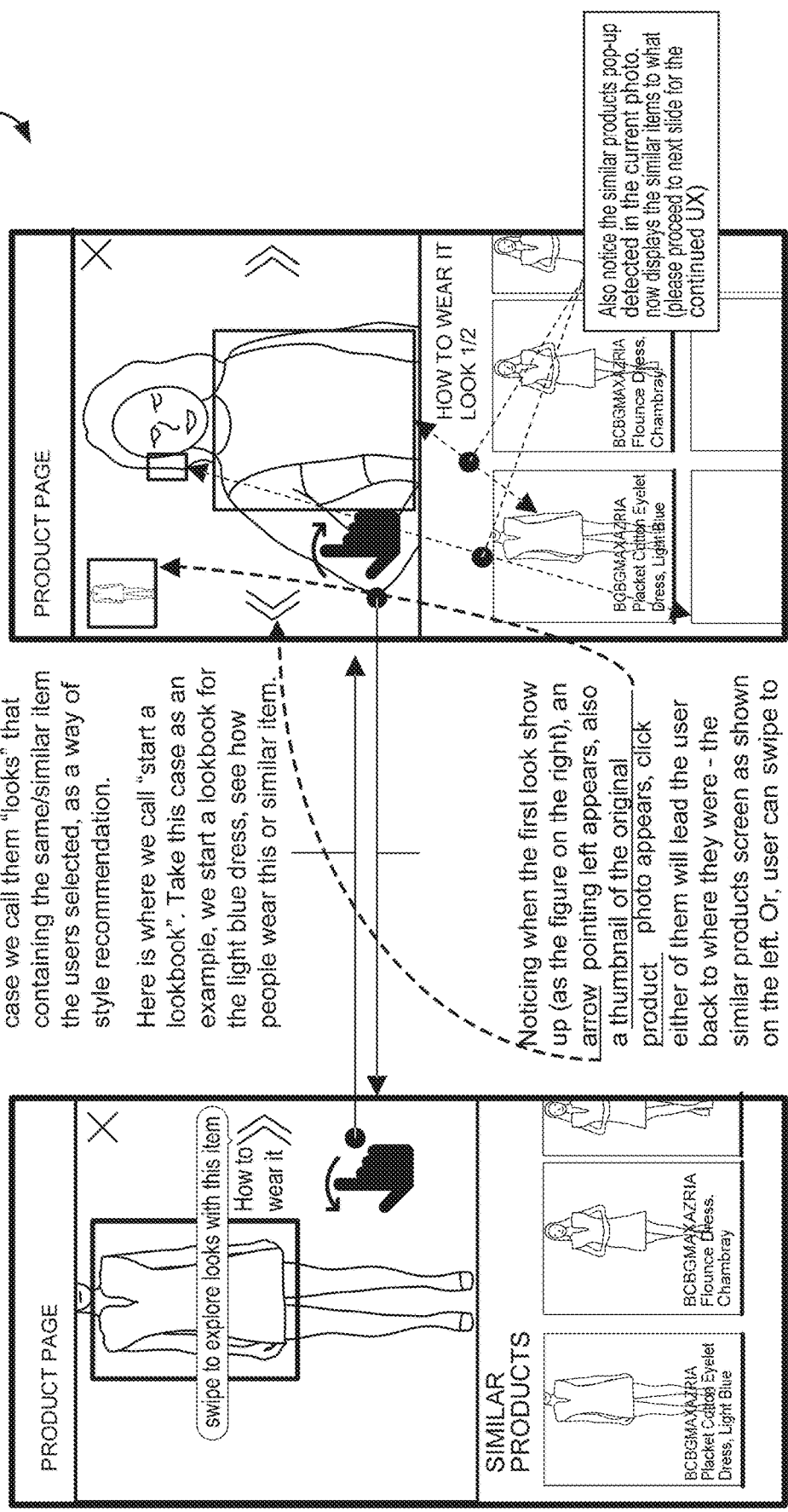
FIG. 16 shows an illustrative example of a user interface for identifying a look based on a selected article of clothing, in an embodiment.

FIG. 16 shows an illustrative example of a user interface for identifying a look based on a selected article of clothing, in an embodiment. In one example, the user swipes over a search image or clicks on an arrow at the edge of the image to generate a signal that causes the SDK to provide looks that are associated with the item shown. In some embodiments, the SDK produces looks that are based on celebrity photos. In other embodiments, the SDK produces looks that are based on Instagram pages. In another embodiment, the SDK identifies looks from a stylebook or Instagram feed of a retailer or brand. In some implementations, the system produces a lookbook which is a collection of looks for a particular product.

When viewing a particular look, arrows at the edges of the look image allow the user to navigate back to the product page (by clicking left or swiping right) or forward to view additional looks (by clicking right or swiping left). In some examples, a thumbnail of the original product photo appears below the look, and clicking on the photo of the product will navigate back to the product page. In some examples, a similar product pop-up displays similar items to those detected in the current photo.

Figure 17:
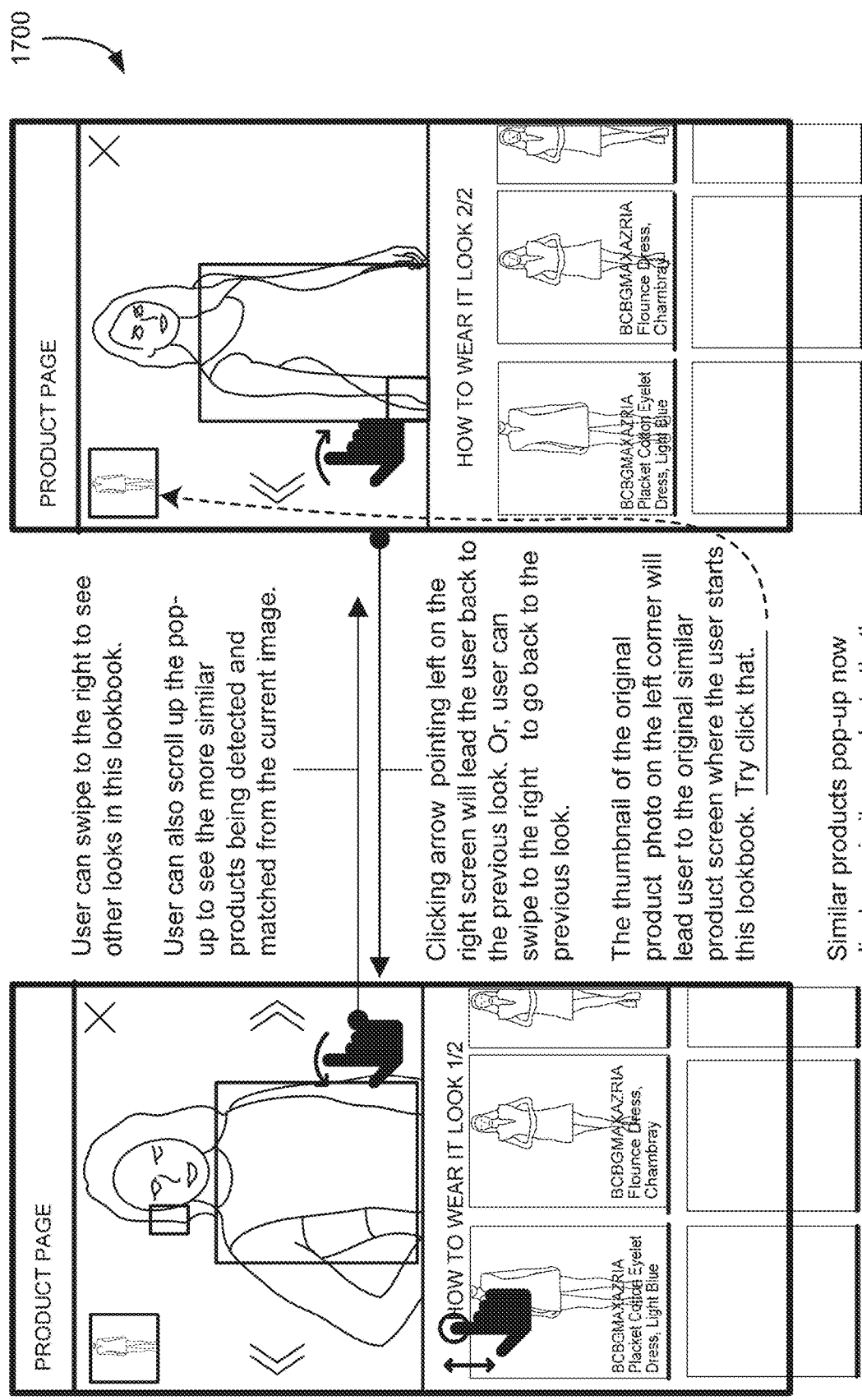
FIG. 17 shows an illustrative example of a user interface that allows the user to select a look from a plurality of looks, in an embodiment.

FIG. 17 shows an illustrative example of a user interface that allows the user to select a look from a plurality of looks, in an embodiment. For example, using the user interface illustrated in FIG. 17, the user is able to swipe right on the picture to select between various looks. Clicking the right arrow or swiping left advances to the next look, and clicking the left arrow or swiping right advances to the previous look. In some implementations, the sequence of looks is transmitted to the browser from the online service, and the selection occurs between stored looks within the client software. In other implementations, swiping left or right requests a next look or previous look from the server, and the server provides information on the next or previous block as requested.

In various implementations, the user interface provides a way for the user to view products associated with the current look. In the example shown in FIG. 17, the user scrolls up to see similar products that are detected and matched from the current look image.

In an embodiment, a thumbnail of the product used to identify the look is shown in the upper left corner of the look image. By selecting the thumbnail, the user is returned to the product screen for the product.

Figure 18:
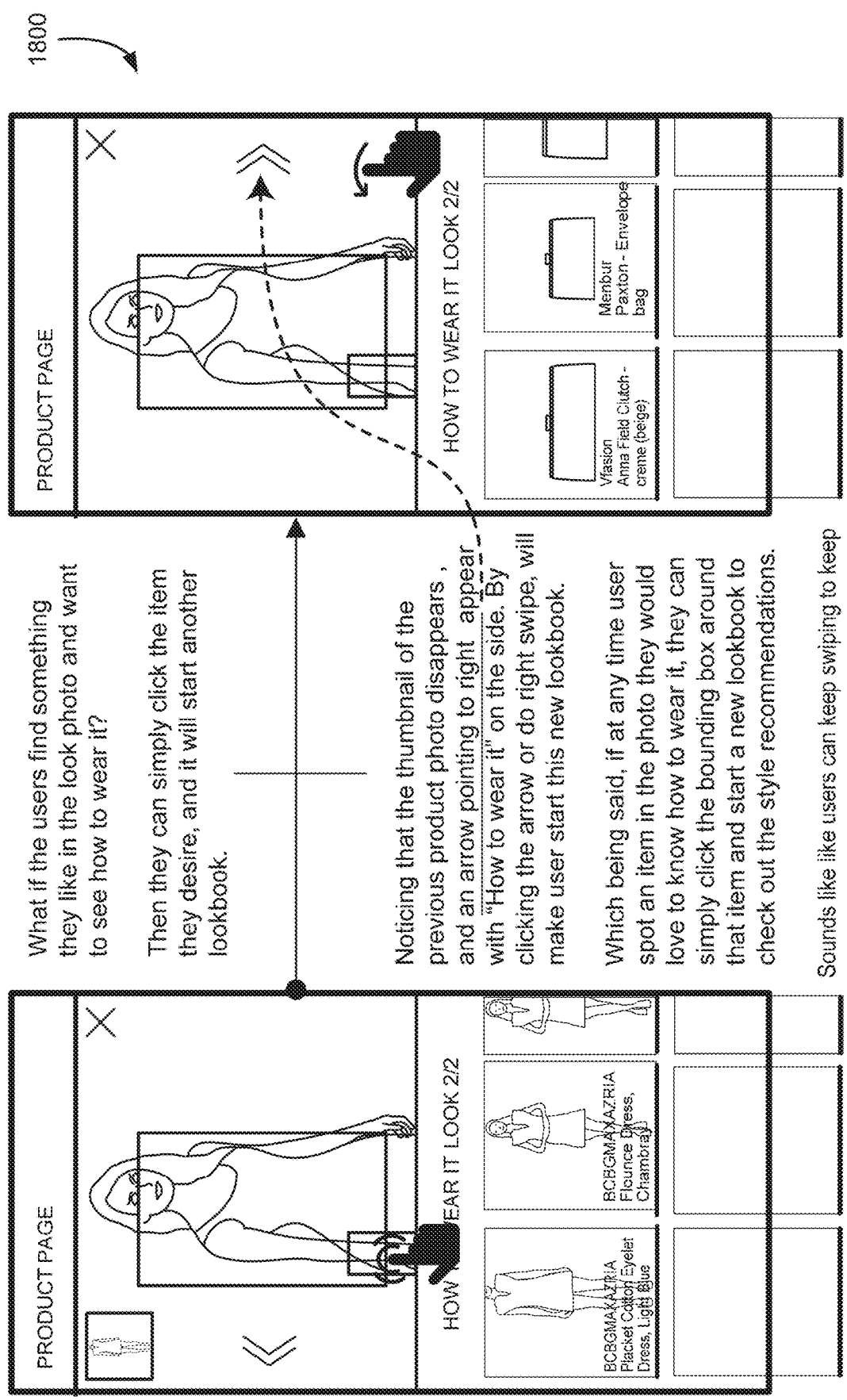
FIG. 18 shows an illustrative example of a user interface that allows the user to select a particular article of clothing from within a look, in an embodiment.

FIG. 18 shows an illustrative example of a user interface that allows the user to select a particular article of clothing from within a look, in an embodiment. In one example, the user is able to select individual products from the look photo. Individual products of the look photo are highlighted by a bounding box. By selecting a bounding box, information identifying a product is sent to the online service and the online service identifies a set of looks associated with the product.

Upon selecting the product's bounding box, the thumbnail associated with the previous product is removed, and an arrow pointing to the right appears. By clicking the arrow or swiping, information identifying the product is sent to the online service, and the online service returns a set of looks for the selected product (a lookbook). In this way, style recommendations can be acquired for any particular product present in a look.

Figure 19:
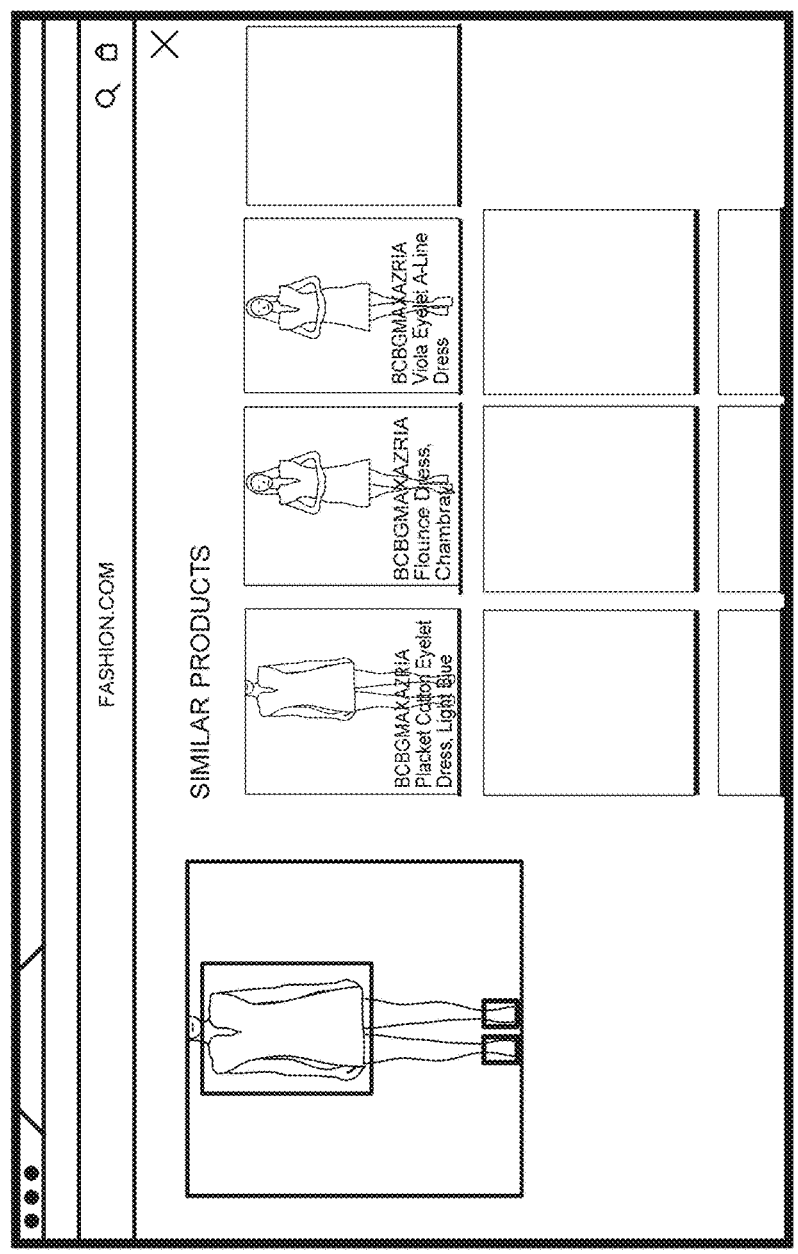
FIG. 19 shows an illustrative example of a desktop user interface for navigating looks and related articles of clothing, in an embodiment.

FIG. 19 shows an illustrative example of a desktop user interface for navigating looks and related articles of clothing, in an embodiment. In the example shown in FIG. 19, a browser window displays a user interface for a particular look. An image of the look is shown on the left part of the page, and bounding boxes are placed around each product identified in the image. By selecting a particular bounding box, the user can be shown a set of similar products on the left side of the page.

In various examples, application dialogs and the pop-up windows size responsively to the browser window. The searched image will be displayed on the left and results on the right. User can use mouse to scroll up and down to explore the results.

User can click the bounding box to start looking at a lookbook of that item.

Figure 20:
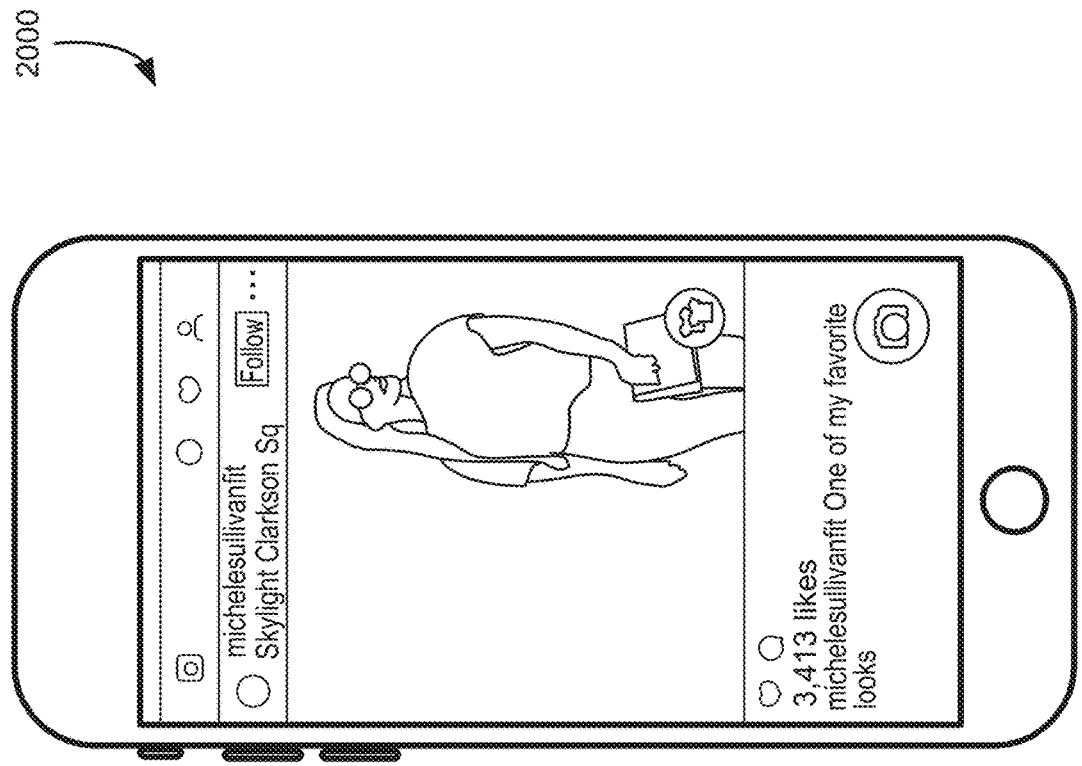
FIG. 20 shows an illustrative example of a user interface for navigating looks implemented on mobile device, in an embodiment.

FIG. 20 shows an illustrative example of a user interface for navigating looks implemented on a mobile device, in an embodiment. FIG. 20 illustrates a mobile device implementing the system. The mobile device may be a cellular phone, tablet computer, handheld device, or other mobile device. In one embodiment, the mobile device includes a camera. The user is able to take a picture with the camera, and the resulting image is displayed on the screen of the mobile device. An icon appears in the lower right corner of the image indicating that the image may be used to identify a product or look. By clicking on the icon, the images uploaded to an online service identifies one or more products in the image. The service identifies the particular products and characteristics of the products in the image. In an embodiment, the online service returns information to the mobile device that allows the application to create bounding boxes around each product in the image.

Once bounding boxes are added to the image, the user may select a bounding box to request additional information. In one embodiment, the selection information is returned to the online service, and the online service provides information that identifies the product and optionally similar products. Images of the product and similar products are transferred from the online service to the mobile device, where there displayed to the user on the display screen. The user can either view a plurality of similar products, or select a particular product and explore additional looks that use that particular product.

In some examples, the user may start from an image on a retailer's website, from a social media site, or a photo sharing site or service.

Figure 21:
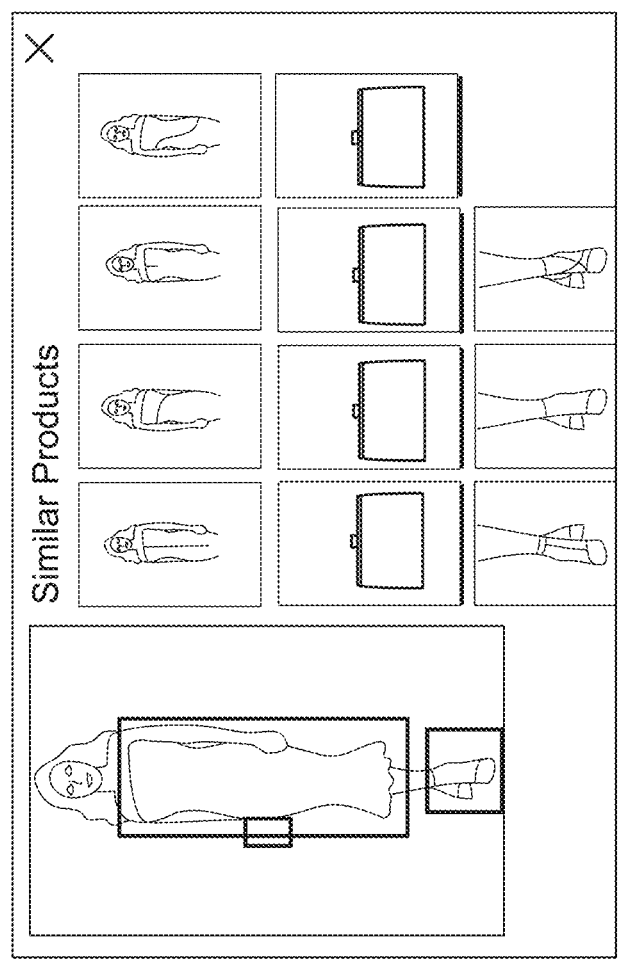
FIG. 21 shows an illustrative example of a user interface for navigating looks implemented on a web browser, in an embodiment.

FIG. 21 shows an illustrative example of a user interface for navigating looks implemented on a web browser, in an embodiment. In an embodiment, the SDK runs on a personal computer system running a browser. The embodiment shown in FIG. 21 may be implemented using a personal computer, a laptop computer, or tablet computer running a browser.

FIG. 22 shows an illustrative example of a generic object detector and a hierarchical detector, in an embodiment. The hierarchical detector predicts a tree of categories as output compared to the generic detector that outputs a single category for each bounding box. In an embodiment, clothing product detection from images and videos paves the way for visual fashion understanding. Clothing detection allows for retrieving similar clothing items, organizing fashion photos, artificial intelligence powered shopping assistants and automatic labeling of large catalogues. Training a deep learning based clothing detector requires predefined categories (dress, pants, etc.) and a high volume of annotated image data for each category. However, fashion evolves and new categories are constantly introduced in the marketplace. For example, consider the case of jeggings which is a combination of jeans and leggings. To retrain a network to handle jegging category may involve adding annotated data specific to jegging class and subsequently relearning the weights for the deep network. In this paper, we propose a novel method that can handle novel category detection without the need of obtaining new labeled data or retraining the network. Our approach learns the visual similarities between various clothing categories and predicts a tree for categories. The resulting framework significantly improves the generalization capabilities of the detector to the novel clothing products.

In an embodiment, object detection from images and videos is an important computer vision research problem. Object detections from images and videos enables selection of the relevant region of interest for a specific category paving the way for a multitude of computer vision tasks including similar object search, object tracking, collision avoidance for self-driving cars. Object detection performance may be affected by multiple challenges including imaging noises (motion blur, lighting variations), scale, object occlusion, self-occlusion and appearance similarity with the background or other objects. In some embodiments, the focus of object detection is to improve separation of objects belonging to a particular category from other objects, and localization of the object in the image. In some examples, going straight from images to object locations and their corresponding category loses the correlation between multiple categories. In some examples, the resulting methods may have a larger number of false positives because of classification error between similar classes. Furthermore, in some examples, addition of a novel object category may require re-training of the object detector.

Techniques described herein relate to a deep learning based object detection and similar object search framework that explicitly models the correlations present between various object categories. In an embodiment, an object detection framework predicts a hierarchical tree as output instead of a single category. For example, for a 't-shirt' object, a detector predicts ['top innerwear'→'t-shirt']. The upper level category 'top innerwear' includes [blouses_shirts, 'tees', 'tank_camis', 'tunics', 'sweater']. The hierarchical tree is estimated by analyzing the errors of an object detector which does not use any correlation between the object categories. Accordingly, techniques described herein comprise;

4. A hierarchical detection framework for the clothing domain.
5. A method to estimate the hierarchical/semantic tree based at least in part on directly analyzing the detection errors.
6. Using the estimated hierarchy tree to demonstrate addition of novel category object and performing search.

In an embodiment, object detection computes bounding boxes and the corresponding categories for all the relevant objects using visual data. The category prediction often assumes that only one of the K total object categories is associated with each bounding boxes. The 1-of-K classification is often achieved by a 'Softmax' layer which encourages each object category to be far away as possible from all the other object categories. However, this process fails to exploit the correlation information present in the object categories. For example, a 'jeans' is closer to 'pants' compared to 'coat'. In an embodiment, exploitation of this correlation is accomplished by first predicting 'lower body' and choosing one element from the 'lower body' category which is a set of 'jeans', 'pants', 'leggings' via hierarchical tree prediction.

In an embodiment, a hierarchical prediction framework is integrated with an object detector. FIG. 22 shows the changes between the generic object detector and an object detector in accordance with an embodiment. In some embodiments, the generic detector can be any differentiable (e.g., any deep learning based detector) mapping $f(I) \rightarrow bb, c$ that takes an input image I and produces a list of bounding boxes bb and a corresponding category c for each of the bounding box. The hierarchical detector learns a new differentiable mapping $fh(I) \rightarrow bb\ F(c)$ that produces a path/flow from root category to the leaf category F(C) for each bounding box. A differentiable mapping, in an embodiment, is a mathematical function that can be differentiated with respect to its parameters to estimate the value of those parameters from ground truth data via gradient-based optimization.

Figure 23:
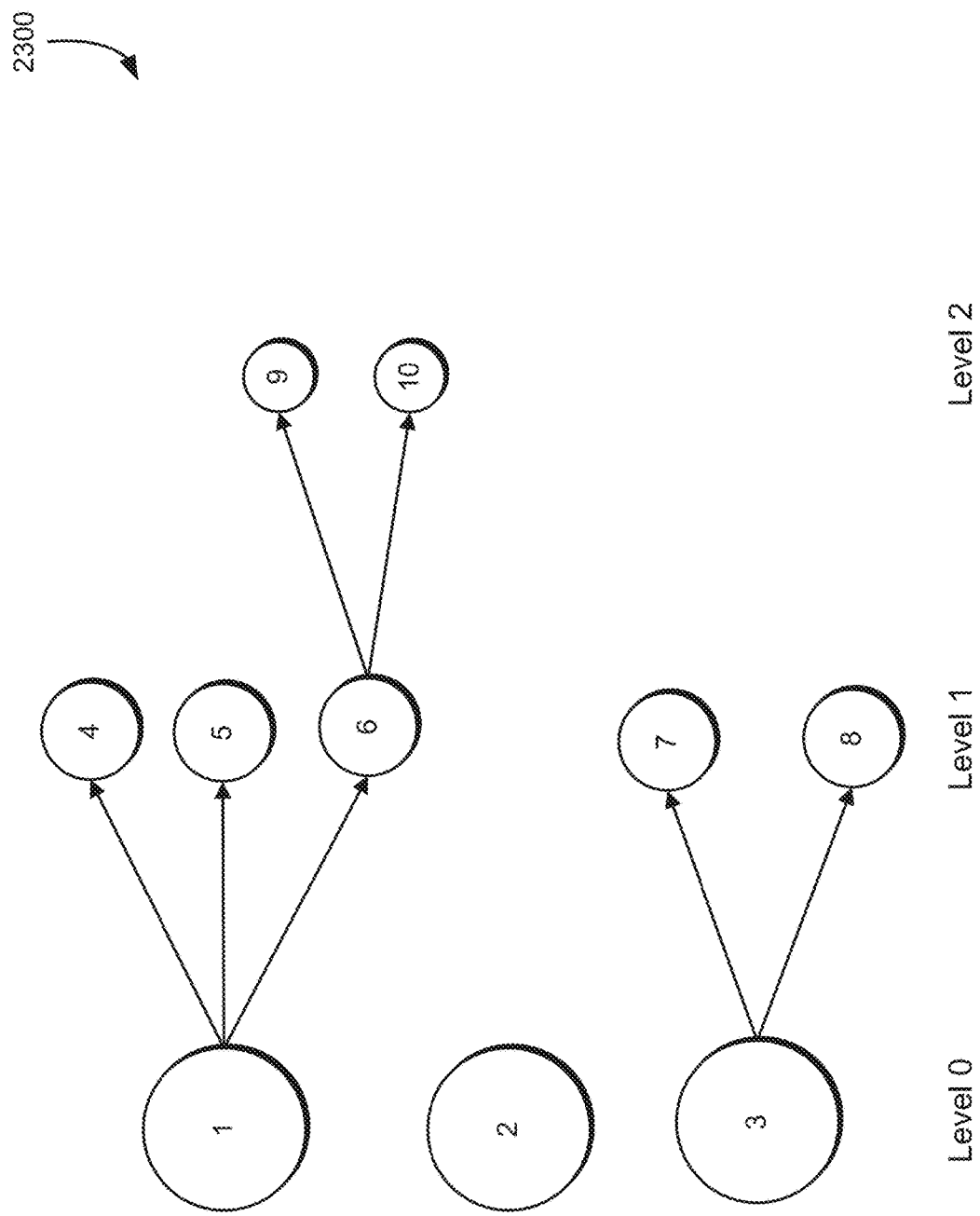
FIG. 23 shows an illustrative example of a category tree representing nodes at various levels, in an embodiment.

FIG. 23 shows an illustrative example of a category tree representing nodes at various levels, in an embodiment. In an example implementation, there are two steps involved in going from a generic detector to the hierarchical detector. The first step, in an embodiment, is to train a generic detector and estimate the category hierarchy tree as discussed below. Based on the category hierarchy, the deep learning framework is retrained with a loss function designed to predict the hierarchical category as detailed below.

As an illustrative example, for the remainder of this disclosure, the 'Softmax' function will be used to predict the category c by choosing the category with the highest probability. It may be noted, however, that one with ordinary skill in the art would recognize other functions that can be used instead of or in addition to the 'Softmax' function. Other functions that can be used include, but are not limited to, any function whose range is positive. Other examples are a modulus function (|x|) and a squared function (x^2). To go from these values to probability value, one may divide the function value for each category by the sum across all the categories. If a generic detector does not predict a probability score for each category, in an embodiment, the 'Softmax' function (or other function) is used to convert raw scores to a relative probability measure.

In an embodiment, a directed graph is generated from the tree. The directed graph underlying the tree is used for predicting a tree/path from root node to leaf node for categories. Let T represent the entire tree consisting of all the categories as nodes and the hierarchical relationship as directed edges from parent node to children nodes. The terms/phrases n, s(n), p(n), F(n) denote the node, sibling set of a node, parent of a node, and path from the root node to a leaf node, respectively. Consider a dummy directed graph as shown in FIG. 23. In this example, all the nodes belonging to 'Level 0' are denoted as root nodes since they do not have any parents. Sibling s(n) denotes all the nodes that are on the same level and have a common parent. For example, s(1)=1, 2, 3 and s(6)=4, 5, 6. Path from the root to leaf node includes all the nodes that lie in the way from a 'Level 0' node to a leaf node. For example, F(9)=1, 6, 9 and F(2)=2.

The estimated probability of any node (or the category probability for a bounding box) is represented by P(I). Using the underlying graph, this probability can also be expressed by a series of conditional probability over the path from root node to the leaf node.

$$P(n|I)=(10|I)P(l1|10) \ldots P(n|lq-1) \quad (1)$$

where q is the total number of nodes along the path and all the nodes in the conditional probability computation belong to the path from root to the leaf node, $F(n)=(10, 11, \ldots, lq-1, n)$. In an embodiment, the 'Softmax' layer is used to estimate the probability of each node. The nodes are represented in a single vector and have the last fully-connected (FC) layer predict scores for all of the nodes. The underlying structure of the category tree is used to obtain probability for nodes at each level. For example, for a zeroth-level node, one can calculate the probability as $$P(l0|I)=\exp c0ci \in s(l0)\exp ci \quad (2)$$

where the 'Softmax' is only computed with respect to the sibling nodes. This encourages competition (l-of-K classification) only amongst the sibling. In an embodiment, the category estimator will first try to separate between major categories such as 'upper body', 'lower body', 'footwear', subsequently estimate finer category for each of those categories, and so-on.

To adapt a generic detector to hierarchical detector, cross-entropy between the predicted distribution in Equation 1 and the ground-truth annotation is used:

$$L(I)=-xq(x|I)\log P(x|I) \quad (3)$$

where x are the individual elements of the vector representing all the categories, P(I) and q(I) denote the category probability and annotation vector for image I, respectively. Both of these vectors are of dimension T which, in this example, is also the total number of categories. The generic detector has just a single active element (a single category) in the annotation vector but, in some implementations, may have multiple activations to account all the labels from root node to the leaf-node.

In an embodiment, the backward propagation step is modified to learn parameters of the deep neural network that can predict hierarchical categories. The usage of sibling level 'Soft-max' and the underlying graph structures induces a multiplier factor for each category. Consider the graph in FIG. 23, and assume that an input image has category 9. The presence of category 9 also indicates the presence of categories along the path from leaf to root (6, 1). The loss represented in Equation 3, in an embodiment, has at least three different active labels (1, 6, 9). The loss for this image can be written as $$L(I) = -(\log P(1 | I) + \log P(6 | I) + \log P(9 | I)) = \quad (4)$$
$$-(\log P(1 | I) + \log P(6 | 1)P(1 | I) + \log P(9 | 6)P(6 | 1)P(1 | I)) =$$
$$-(3\log P(1 | I) + 2\log P(6 | 1) + \log P(9 | 6))(4)$$

Equation 4 demonstrates that, to perform back-propagation to learn the weights of the network, a multiplier factor for all of the nodes may be used. The above example can be generalized and an algorithm to estimate the multiplier factor for each node in Algorithm 1 is presented. Intuitively, in some implementations, the loss function requires the deep neural network to ensure representation of various paths to a leaf node leading to representation of hierarchical information. In one example, given the category tree T and ground truth annotation q(x|I) for an image I, the leaf node is estimated and subsequently assigned the level-distance from the leaf node as multiplier factor for all the nodes. The multiplier factor is zero for all the nodes with level higher than the leaf node in annotation.

---

Example Algorithm 1: Multiplier factor estimation for each node

---

Data: q(I),T
Result: Multiplier factor m(n) for all nodes
Initialize m(n)= 0 ∀ n ∈ T;
Find leaf node lq from q(x|I);
// Traverse over all nodes in path from leaf to root for
li= lq to l0 do
| m(n) = (q −l+1) ∀ n ∈ s(li);
End

---

To estimate the category tree T, in an embodiment, one estimates the visual similarity between various categories. Techniques disclosed and suggested herein improve on conventional techniques by organizing the visually similar categories for an object detector. Much prior work has focused on using attribute-level annotations to generate annotation tag hierarchy instead of category-level information. However, such an effort requires large amounts of additional human effort to annotate each category with information such as, viewpoint, object part location, rotation, object specific attributes. Some examples generate an attribute-based (viewpoint, rotation, part location etc.) hierarchical clustering for each object category to improve detection. In contrast, some embodiments disclosed herein, use category level information and only generate a single hierarchical tree for all the object categories.

Example implementations of the present disclosure estimate a category hierarchy by first evaluating the errors of a generic detector trained without any consideration of distance between categories and subsequently analyzing the cross-errors generated due to visual-similarity between various categories. In an embodiment, a Faster-RCNN based detector is trained and detector errors are evaluated. For instance, a false positive generated by generic detector (Faster-RCNN detector in the current case) can be detected and some or all the errors that result from visually similar categories are computed. These errors, for example, may be computed by measuring all the false positives with bounding boxes having an intersection-over-union ("IOU") ratio between 0.1 to 0.5 with another object category. In this manner, visually similar classes such as 'shoes' and 'boots' will be frequently misclassified with each other resulting in higher cross-category false positive errors.

In an embodiment, a cross-category false positive matrix D (Size(D)=J×(J+1)) is computed, where J denotes the total number of categories in the dataset. In this example, the second dimension is higher than the first dimension to account for false positives that only intersect with background. The diagonal entries of the matrix D, in this example, reflect the false positives resulting from poor localization and are ignored for the current analysis, although may be used in some implementations. Example Algorithm 2 describes the process used to obtain the category tree. Using the matrix D and a predefined threshold T, we estimate the sets of categories that are similar to each other. This results in disparate group of categories. All the sets in T with greater than 1 element are given new category names and all the elements for that set are assigned as children to the newly defined category. The above process readily generates a 2-level tree for categories.

---

Example Algorithm 2: Generating visually similar groups from cross-category false positive error matrix

```
Data: C,τ
Result: T
Initialize T = ∅;
for i = 1 to J do
    for j = 1 to J do
        if C[i][j] ≥ τ then
            if i || j ∈ n; n ∈ T then
                // Add to the existing group;
                n = n ∪ {i, j}
            else
                // Start a new group;
                n = {i, j};
                T = T ∪ n
            end
        end
    end
end
```

---

Some techniques focus on using attribute-level information apart from the category specific information to perform detection for novel object categories. Some examples use attribute-level information to detect objects from novel categories. For instance, a new object category 'horse' is recognized as a combination of 'legs', 'mammal' and 'animal' categories. Attribute-based recognition requires one to learn attribute specific classifiers and attribute-level annotation for each of object categories. In comparison, some embodiments of the present disclosure neither require attribute annotations nor any attribute specific classifiers. For each new category, an expected root-level category may be assigned and subsequently a bounding box with highest confidence score for that category may be estimated.

Systems operating according to various embodiments disclosed herein perform category specific non-maximal suppression to select bounding boxes for each leaf node categories, where the bounding boxes may be unique. For all the lower level categories, such systems may also suppress the output by considering bounding boxes from all the children nodes. In some embodiments, this helps reduce spurious lower level category boxes whenever bounding boxes from more specific categories can be detected.

In various implementations, the detector serves two purposes for similar object matching; region of interest detection and category identification. Region of interest detection, in an embodiment, is used to help crop the image to only contain the relevant object. Category identification on the other hand, in an embodiment, is used to narrow down the number of clothing images to be searched. For example, if the detector detects a 'dress' object, then the search can be limited to be within the 'dress' clothing database. In case of a novel category, since there is only a root-level node category, search for similar clothing item among the images of children of the root-level node can be performed.

To test our formulation, a large dataset of 97,321 images from various fashion relevant websites, such as 'www.modcloth.com', and 'www.rentterunway.com' were collected. For all the images, human-annotation for all the fashion relevant items resulting in a total of 404,891 bounding boxes across 43 different categories were obtained. All the categories that have less than 400 bounding boxes for training the object detector resulting in 26 valid categories were ignored, although different parameters may be used. The statistics of the dataset are provided in Table 1. The dataset was split into training and testing set 80-20. All the detectors were only trained using the training data and their performance is evaluated using the same test set.

In these examples, the open-source deep learning framework CAFFE may be used. For learning, we use stochastic gradient descent with 0.001 as base learning rate which is reduced to half every 50,000 iterations, momentum of 0.9 and 0.0005 as weight decay. For both the detectors, we use all the same hyperparameters and train the detectors for 200,000 iterations.

In an embodiment, an average precision for the different categories is determined and the results are summarized across categories using the mean average precision. Average precision measure the area under the precision-recall curve for each object category. In an example, 0.5 pascal ratio is used as the threshold for true positive. The baseline generic detector on our dataset is trained to compute the cross-error matrix C.

TABLE 1

Total Number of bounding box annotations for each category

| Category | Num. Annotations |
| --- | --- |
| Shoes | 78835 |
| Jeans | 12562 |

TABLE 1-continued

Total Number of bounding box annotations for each category

| Category | Num. Annotations |
|---|---|
| Boots | 17503 |
| Tanks/Camis | 3532 |
| Rompers/Overalls | 827 |
| Tunics | 1863 |
| Scarves/Wraps | 2429 |
| Coats/Jackets | 9169 |
| Handbags | 16706 |
| Sweater | 8006 |
| Dresses | 40489 |
| Pants | 6239 |
| Clutches | 4289 |
| Shorts | 3392 |
| Leggings | 1272 |
| Sandals | 8293 |
| Tees | 3528 |
| Beanie/Knit Cap | 513 |
| Tote | 434 |
| Belts | 9910 |
| Cowboy Hats | 2315 |
| Blouse/Shirt | 17606 |
| Glasses | 15859 |
| Suitings/Blazer | 564 |
| Skirts | 8239 |
| Jumpsuits | 1211 |

Figure 24:
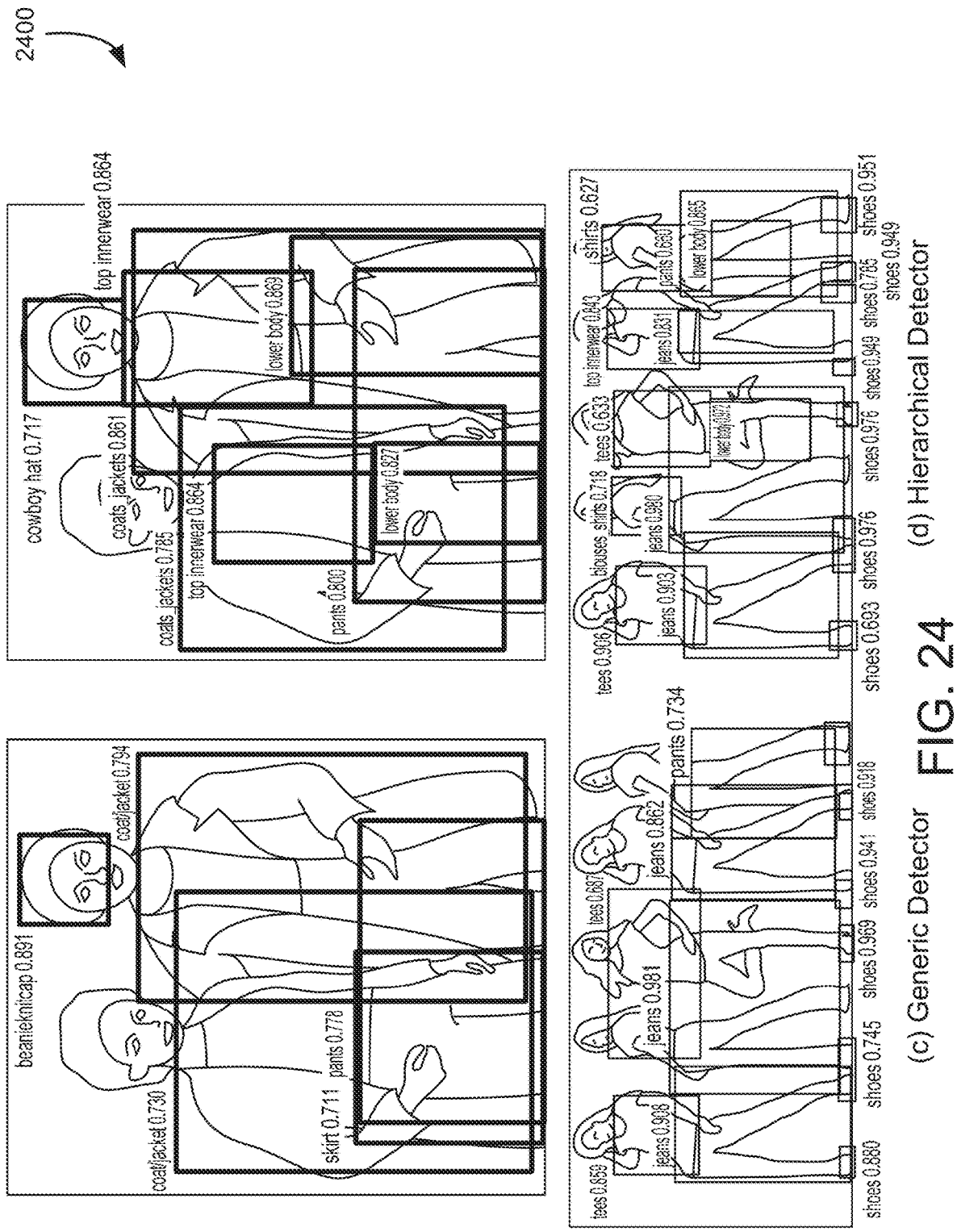
FIG. 24 shows an illustrative example of a normalized error matrix, in an embodiment.

FIG. 24 shows an illustrative example of a normalized error matrix, in an embodiment. FIG. 24 illustrates a cross classification matrix with false positive errors between various categories. From FIG. 24, it is clear that the visually similar categories like 'shoes' and 'boots' are frequently misclassified with each other. We used Example Algorithm 2 to estimate the tree T based on detector error matrix C. Our algorithm finds 7 groups containing more than one element. Details of all the groups thus generated and their names are given in Table 2.

Table 3 shows the mAP comparison between the generic and the proposed hierarchical detector. Since the generic detector, in this example, did not generate any of the newly generated groups, we generate AP results for the new categories by averaging the performance across their children. This is reasonable since the detection of 'Dress' or 'Jumpsuits' also indicates the presence of 'Full Body' clothing category. Our results show that the hierarchical detector improves the mAP by approximately 4% over the generic detector, at least in this context with the data that was used.

TABLE 2

New root-level categories and their children

| Composite | Original Category |
|---|---|
| Footwear | Shoes, Boots, Sandals |
| Full Body | Dresses, Jumpsuits, Rompers/Overalls |
| Top Innerwear | Blouses/Shirts, Tees, Tanks/Camis, Tunics, Sweater |
| Top Outerwear | Coats/Jackets, Suitings/Blazers |
| Bags | Handbags, Clutches, Tote |
| Lower Body | Jeans, Pants, Leggings |
| Headgear | Cowboy Hat, Beanie/Knit Cap |

On the original classes, the mAP of both the generic and hierarchical detector is the same, indicating no degradation of the underlying network despite the increased number of categories. Notably, the improvement in the performance of the hierarchical detector is because of the ability to capture visual information at a higher level.

TABLE 3

Total Number of bounding box annotations for each category

| Category | Generic | Hierarchical |
|---|---|---|
| Shoes | 0.8857 | 0.8814 |
| Jeans | 0.8974 | 0.892 |
| Boots | 0.7736 | 0.7679 |
| Tanks/Camis | 0.4763 | 0.4721 |
| Rompers/Overalls | 0.3733 | 0.4125 |
| Tunics | 0.2095 | 0.1987 |
| Scarves/Wraps | 0.3815 | 0.3309 |
| Coats/Jackets | 0.7918 | 0.8068 |
| Handbags | 0.7906 | 0.7995 |
| Sweater | 0.672 | 0.6613 |
| Dresses | 0.9702 | 0.9698 |
| Pants | 0.598 | 0.5876 |
| Clutches | 0.6407 | 0.6384 |
| Shorts | 0.8287 | 0.8293 |
| Leggings | 0.1705 | 0.1636 |
| Sandals | 0.6223 | 0.6167 |
| Tees | 0.4856 | 0.4797 |
| Beanie/Knit cap | 0.7104 | 0.67 |
| Tote | 0.1708 | 0.2009 |
| Belts | 0.2265 | 0.2054 |
| Cowboy hat | 0.9151 | 0.9197 |
| Blouses/Shirts | 0.6776 | 0.6693 |
| Glasses | 0.7498 | 0.7414 |
| Suitings/Blazers | 0.1369 | 0.1536 |
| Skirts | 0.6797 | 0.6663 |
| Jumpsuits | 0.6734 | 0.6998 |
| Footwear | 0.7605 | 0.8870 |
| Headgear | 0.8127 | 0.8705 |
| Top Innerwear | 0.5042 | 0.7525 |
| Top Outerwear | 0.4643 | 0.7215 |
| Full Body | 0.6723 | 0.9294 |
| Lower Body | 0.5553 | 0.9153 |
| Bags | 0.534 | 0.7288 |
| mAP | 0.6003 | 0.6440 |

Figure 25:
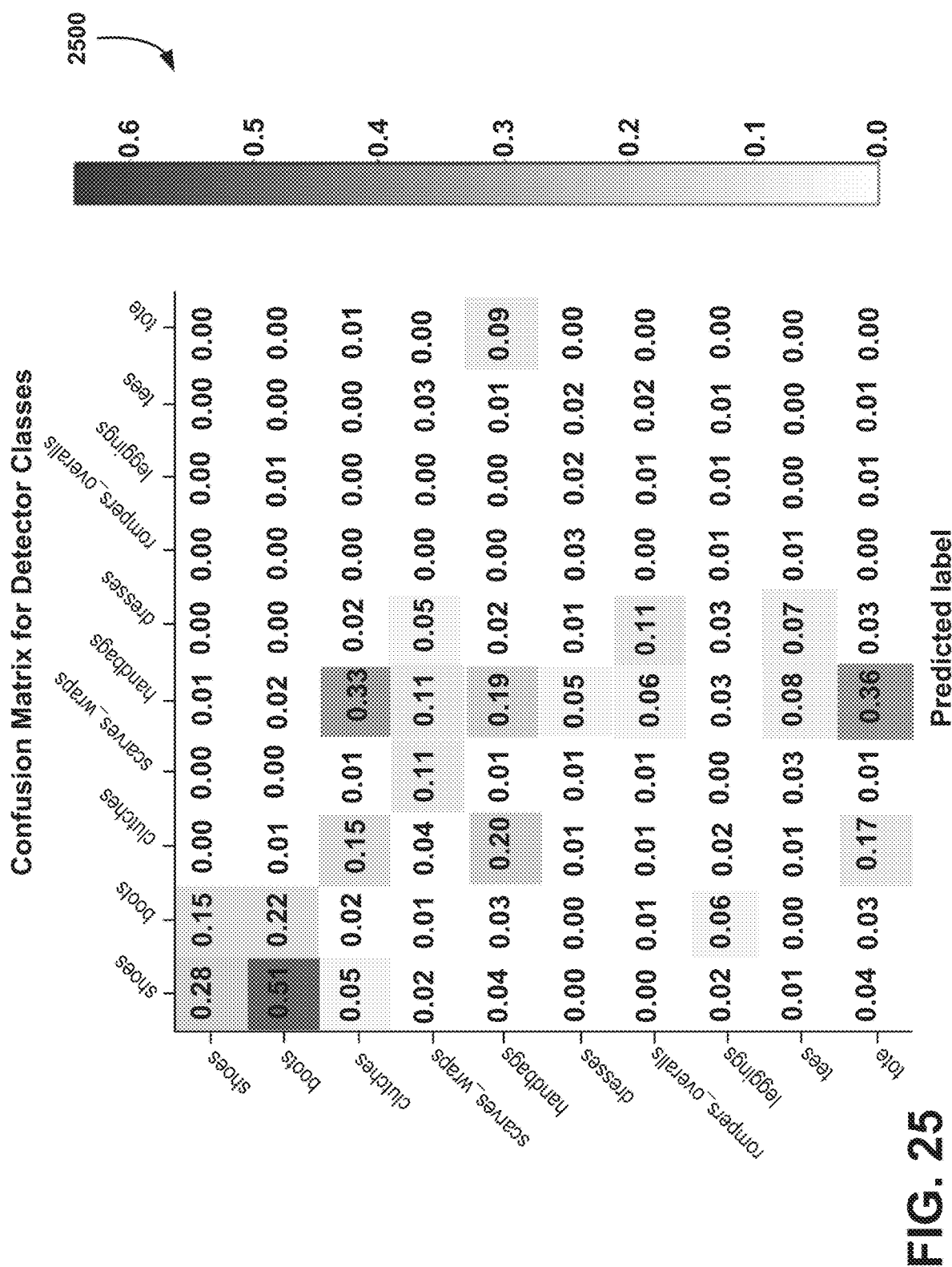
FIG. 25 shows an illustrative example of a hierarchical detector that can correct for missing detections from a generic detector, in an embodiment.

FIG. 25 illustrates an example of a hierarchical detector that can correct for missing detections from a generic detector, in an embodiment. A hierarchical detector can correct for missing detections from the generic detector for ambiguous examples. For example, it is hard to clearly identify the type of 'top inner-wear' occluded by a 'coat' or 'jacket'. But the hierarchical detector can still detect that the clothing item hidden underneath is an instance of 'top innerwear' because of hierarchical information representation. FIG. 25 shows some examples of ambiguous instances that are identified by the hierarchical detector. Furthermore, the hierarchical detector encourages competition between siblings because instead of separation of one category from all the other categories, the hierarchical detector only separates amongst sibling categories.

Figure 26:
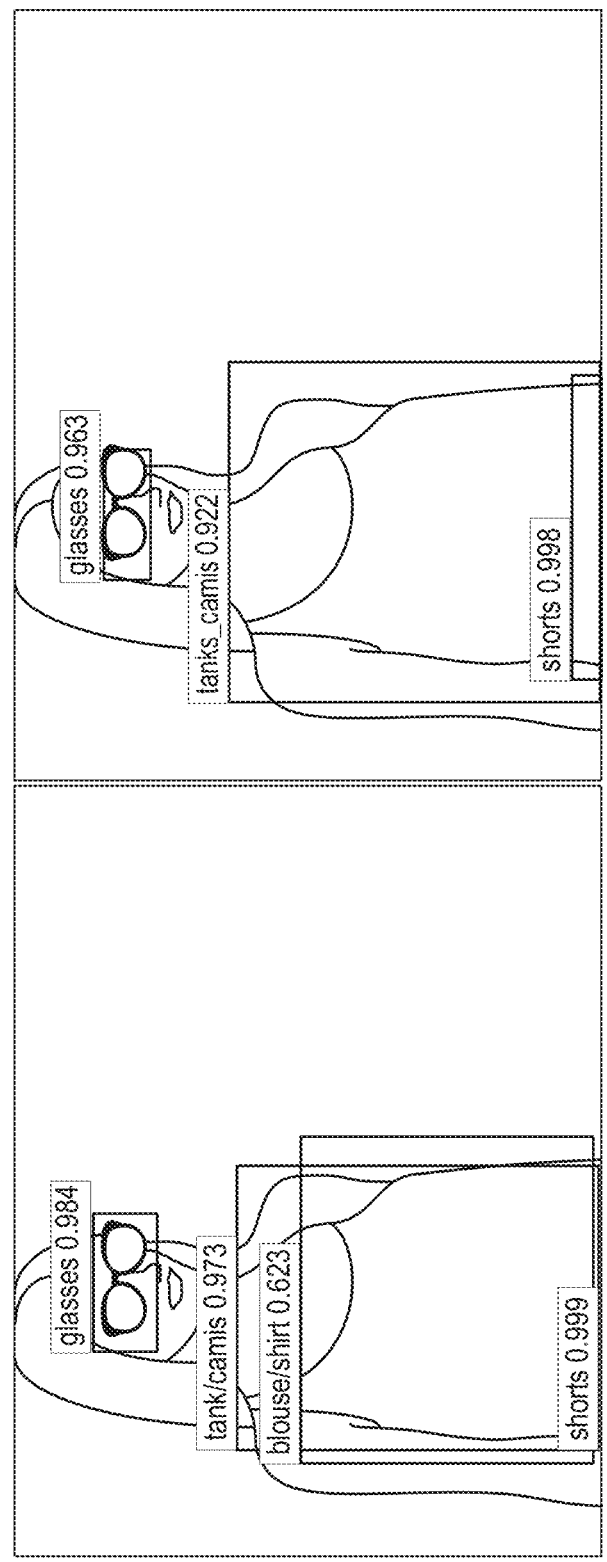
FIG. 26 shows an illustrative example of how a hierarchical detector suppresses sibling output in contrast to a generic detector, in an embodiment.

FIG. 26 shows an illustrative example of how a hierarchical detector suppresses sibling output in contrast to a generic detector, in an embodiment. In an embodiment, a generic detector predicts two different bounding boxes for two sibling categories which are suppressed by the hierarchical detector. The hierarchical nature of our detection output allows us to represent information at various scales. For example, the 'Top Innerwear' category captures the commonalities between all the children categories. We use this aspect of our framework to perform detection on a novel category that our detector has never seen during training. For each novel category, we assign a root-level category and compute the maximum confidence detection for all the children and root-level category. We collect a small test-set where the generic detector fails because these are novel categories. The results of this set are demonstrated in Table 4.

TABLE 4

Detection Performance on Novel Categories

| Category | Root Category | Total Images | True Positive | False Positive |
|---|---|---|---|---|
| Polos | Top Innerwear | 165 | 157 | 8 |
| Hoodies | Top Innerwear | 239 | 215 | 14 |
| Briefcase | Bags | 132 | 132 | 0 |

Techniques described and suggested herein provide a novel framework for predicting hierarchical categories for a detector. The hierarchy between categories, in various embodiments, is only based on visual similarity. An example implementation of the hierarchical detector demonstrates the ability to capture information at various scales and generalizes the detector to novel categories that our detector has not been trained on.

Figure 27:
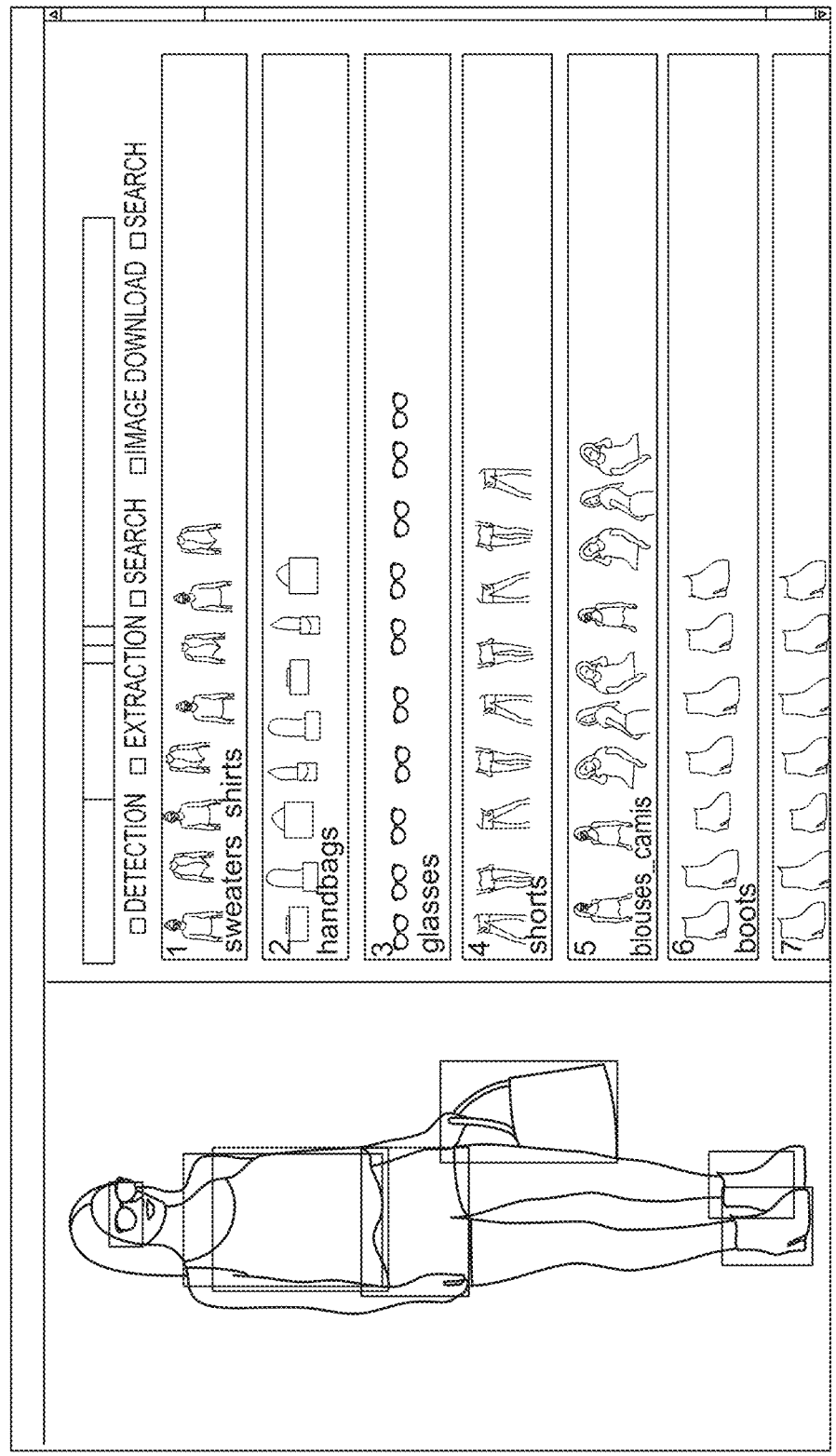
FIG. 27 shows an illustrative example of a graphical user interface that enables utilization of techniques described herein, in an embodiment.

FIG. 27 shows an illustrative example of a graphical user interface that can be used in connection with various embodiments discussed herein. The graphical user interface can be provided in various ways, such as in a web page accessible through a web browser, an application on a mobile or other device, or in other ways. In the left of FIG. 27 is an example of an image that has been uploaded or otherwise made accessible to a server of a computer system (which may be a single device or a distributed computer system comprising multiple devices). The techniques described above may be used to detect clothing objects in the image. In this example, as illustrated by boxes surrounding each detected object, seven objects (a pair of sunglasses, a tank top, a blouse, a handbag, a left shoe, a right shoe, and a pair of shorts). Further, in this example, due to visual similarity between tank tops and blouses, both options are given in the right side of the interface to provide users greater choices and more results, although in some embodiments, one or the other may be selected and respective results may be provided without results associated with the unselected category.

The graphical user interface may be used, for instance, as part of a service that enables users to upload or otherwise specify images (e.g., via URL) to be analyzed to detect which clothing objects appear in an image, to select a clothing object detected in the image, and to perform a search for similar objects. In an illustrative example, a selected clothing object may be used to determine search terms for a search query that may be performed against one or more databases (e.g., via an interface to an Web service platform). As an example, detection of a pair of shorts may result in a search query including the term "shorts." Other information about the image may be used to determine terms and other parameters for a search query. For instance, the image may be analyzed to determine whether the shorts are primarily designed for women or men. This may be performed by analyzing the shorts themselves using techniques described above and/or by detecting the presence of a woman's face being associated with the shorts detected in the image. Color and other attributes of the detected object may also be used to determine parameters for the search query.

FIG. 27 shows an illustrative example of a graphical user interface that enables utilization of techniques described herein, in an embodiment. In some examples, parameters for the search query are automatically generated and provide for modification in the user interface. In the above example, the user interface may indicate that it detected white shorts and the user may be able to deselect a "white" parameter to indicate that color should not be used to limit search results and/or to select a different color to be used to filter search results.

In the example graphical user interface of FIG. 27, each detected object is provided with a row of search results for a query submitted for that object. In this manner, a user can select which object(s) are of interest and view applicable search results. As noted, in some implementations, a user is able to select which objects are of interest to the user and, as a result, which search results appear in the user interface. For instance, in an embodiment, if a user was presented with the user interface shown in FIG. 27, he or she could select the shorts object in the image (e.g., with a mouse click or touchscreen touch) and search results for a query generated based at least in part on the detected shorts would appear in the user interface (perhaps replacing results for other objects appearing in the user interface).

While FIG. 27 is used for the purpose of illustration, numerous variations are considered as being within the scope of the present disclosure. Further, while clothing and categories of clothing were used for the purpose of illustration, one with ordinary skill in the art would recognize the applicability of the techniques described herein to other contexts where items can be categorized hierarchically. Examples of such contexts include any domain where one of the sensing modalities is vision and the output has a hierarchical semantic organization. Some examples are detecting food items from images, detecting specific types of animal breeds from images (breeds of dogs will share information, breeds of cats will also share information), and identifying plant species from images of a leaf.

Figure 28:
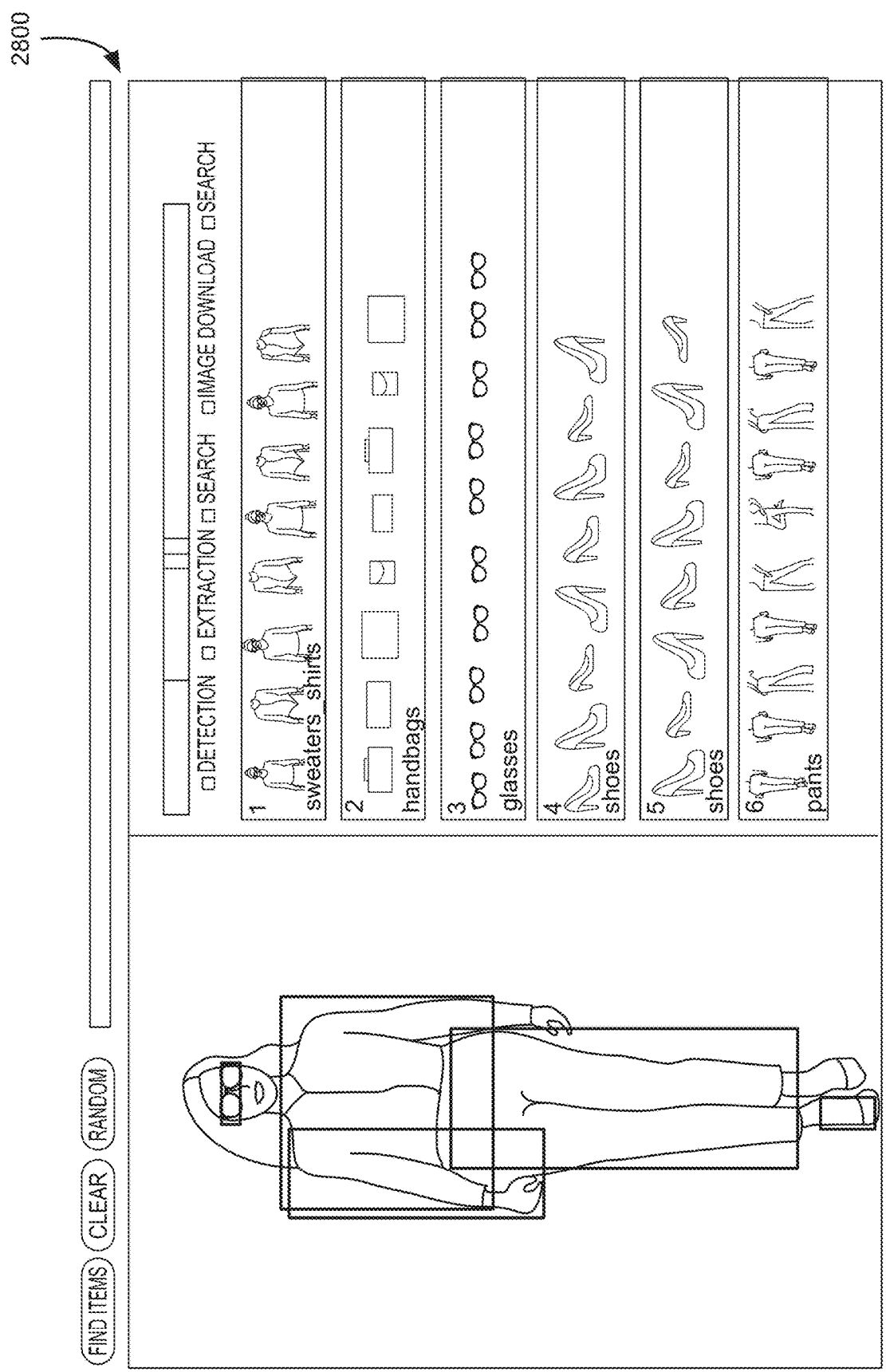
FIG. 28 shows an illustrative example of a graphical user interface that enables utilization of techniques described herein, in an embodiment.

FIG. 28 is another example of the graphical user interface of FIG. 27, where each visible item of clothing is uniquely determined (i.e., without any object of clothing being identified as two categories). The interface of FIG. 28 may operate similarly as with FIG. 27.

Visual search or the process of matching products in various images is challenging because of scale, lighting, camera pose, blur, occlusion and other visual distractors. Some examples use a two-step matching process, first detecting the high level category (example: dresses) in the image and subsequently matching the detector output to the images within the same high level category. The two step matching process avoids the need to classify an image to the large number of possible products (various types of dresses), helps identify region of interest in the image and reduces the search space for the matching process. In an embodiment, a computer system utilizes a novel deep neural network for image-to-image matching/retrieval after the high-level category detection. This network pools features from various early layers of a deep neural network enabling the network to focus and represent the subtle differences between different products of the same high level category. A framework constructed utilizing techniques described herein, in an embodiment, handles the domain differences by proposing a triplet learning framework which adapts the learning process to account for domain variations. The proposed framework doubles the retrieval accuracy on a large open source dataset such as DeepFashion, while using significantly fewer annotations per image.

As an illustrative example of one embodiment, imagine you are walking down on the streets of New York and you notice an interesting outfit that you would like to buy. The method described herein allows one simply to take a picture and then buy the exact/similar clothing from an online service. This problem may be referred to as street-to-shop image matching. Street-to-shop image matching is different from general image retrieval where both the query image and the images from the database have similar image characteristics. In the street-to-shop matching problem, street images (images from a realistic image source) have complicated backgrounds with multiple products, varying lighting conditions, motion blurs and other imaging noises. In contrast, shop images which constitute a typical online retailer's catalogue usually display a single product with clean background and perfect lighting conditions.

FIG. 29 shows an illustrative example of a triplet with overlaid bounding boxes, in an embodiment. In an embodiment, a computer system utilizes a framework that specifically addresses the domain difference between street and shop images for exact product retrieval. The framework, in some implementations, uses triplets of three images in the form (street image, actual shop product, different shop product). Based on these triplets, the weights of a deep neural network are learned through a machine learning process to cause the deep neural network to encourage the street image to be closer to the actual shop product and far away from a different shop product. FIG. 29 shows a typical example of a triplet, which we use to train a single network to bring a similar street product and shop product closer to each other and separate different products from each other.

Such techniques as described herein provide technical advantages over other techniques, such as those that ignore the street-to-shop domain difference or process each domain with a separate network. For example, ignoring the domain difference does not model the problem at hand, and using a separate domain for street and shop can double the number of parameters in the overall framework and hence requires significantly more data to train. In an embodiment, a computer system uses a single network for both domains by forming triplets, choosing a street image as anchor and using shop images as positive and negative images within a triplet learning framework.

The underlying network for a triplets-based learning framework, in an embodiment, involves computation of features that can represent fine-grained differences in various clothing products. In an embodiment, the computer system uses convolutional neural networks ("CNN") as the underlying learning/functional representation f(θ) (omitting the parameters θ for easy representation later) because CNNs have resulted in state-of-the-art performance for a variety of computer vision tasks. CNNs also represent increasingly abstract information from an image along the depth of a network. To address the exact/similar clothing retrieval problem, subtle differences such as the different collars of two almost same dresses are addressed. To address the complexity of exact clothing retrieval, systems in accordance with the present disclosure use a novel network, MarkableNet, which combines information from multiple scales.

The novel network, in an embodiment, summarizes information from multiple convolutional layers of a single model (MarkableNet) for the fashion retrieval problem, and the model achieves state-of-the-art retrieval performance on various public fashion datasets.

The techniques of the present disclosure use a novel way of handling domain differences by designing triplets that avoids learning a different network for each domain. In an embodiment, MarkableNet combines information from different layers of a network. Such training may be performed online. In some embodiments, techniques of the present disclosure avoid the region proposal pooling by pre-extracting only a relevant (clothing) region of interest in an image by using our fashion detector, which may be implemented as a computer system programmed to perform operations such as described herein.

Metric learning aims to learn an embedding space in which similar objects are closer and dissimilar objects are far away from each other. In the context of retrieval problems, this specifically refers to ranking-based metric learning which often uses the triplet form. A triplet refers to (x, $x^+$, $x^-$) in which anchor objects x are more similar to positive objects $x^+$. than negative objects $x^-$. Metric learning aims to learn a mapping f such that $f(x, x^+) > f(x, x^-)$. Different approaches have been proposed to achieve this:

In an embodiment, contrastive loss (pairwise contrastive loss) is defined on pairs of samples. It encourages small distances between intra-class pairs and requires interclass pair distances to be larger than a margin. However, contrastive loss only focuses on absolute distances, whereas for the ranking problem, relative distance is more important than the absolute distance. A way of calculating distance includes, but is not limited to, Euclidean distance (e.g., sum of squared distances between individual components of a vector) where a deep neural network can be used to transform an image to a vector and then the vector is used as a representation of the input image.

Triplet loss: Defined on triplets of samples, triplet loss tries to pull the anchor sample and the positive sample closer, while pushing away the anchor sample and the negative sample such that the difference between anchor-positive distance and anchor-negative distance is larger than a margin.

In practice, to achieve best performance, triplets training requires having enough valid triplets in each batch so the network can keep learning. In some embodiments, instead of pre-computing valid triplets, generating triplets for each batch in an online manner reduces memory consumption, thus enabling more triplets in each batch, leading to better model performance.

Beyond single triplet: Due to the huge sampling space of triplets, the convergence rate of triplets training is usually slow. In various examples, many variations of loss functions may be used to incorporate information beyond a single triplet. Some examples use Lifted Structure Embedding where each anchor-positive pair is compared with all the negative samples in the batch weighted by the margin violation. A cluster loss function is defined that encourages a margin between ground truth clustering assignment and optimized clustering assignment based on computed embeddings of each batch. In some examples, N-Pair Loss enforces Softmax cross-entropy loss among the pairwise distances in the batch. An extension of N-Pair loss to multiple positives is NCA loss. Apart from exploiting information inside each batch, both Magnet Loss and metric learning using Proxies try to utilize global information of the whole embedding space during the training of each batch.

TABLE 5

Fashion dataset comparison.

| Dataset | # of products | | # of images | | Bounding box annotation | | | # of categories |
|---|---|---|---|---|---|---|---|---|
| | cross | all | cross | all | street | shop | human | |
| Where2BuyIt | 10.3k | 204k | 64.5k | 425k | ✓ | x | ✓ | 11 |
| DeepFashion | | 33.9k | | 239k | ✓ | ✓ | x | 23 |

TABLE 5-continued

Fashion dataset comparison.

| Dataset | # of products | | # of images | | Bounding box annotation | | | # of categories |
|---|---|---|---|---|---|---|---|---|
| | cross | all | cross | all | street | shop | human | |
| Markable$^i$ | 19.5k | 22.3k | 72.45 | 76.8k | ✓ | ✓ | ✓ | 35 |
| Markable$^{ii}$ | 25.1k | 25.4k | 307k | 308k | ✓ | ✓ | ✓, x | 35 | cross: (images of) products that have both street images and shop images; all: total products and images; human: if bounding box annotation is human annotated. Markable$^{ii}$ contains human annotated bounding boxes from Markable$^i$ and bounding boxes detected by Markable internal fashion detector.

All these methods, which can be used in combination with the methods described herein in various embodiments, share the spirit of exploiting global information, as it provides a consistent way to shape the embedding space compared to learning through single triplets. Empirically, we found the global information methods to yield better models than training with single triplets.

In some examples, fashion recognition is implemented. Compared to recognition of landmarks and rigid objects, recognition on a fashion domain is a challenging problem because of the deformable nature of most fashion items. Previous work has explored a variety of computer vision problems ranging from attributes prediction and landmarks prediction to clothing retrieval. In this work, we focus on the problem of cross-domain image retrieval from street to shop. Note that the techniques described herein and variations thereof are applicable to other domains, such as other domains where the objects can have a deformable nature. Examples include, but are not limited to domains/contexts where image-to-image matching tasks are used where the image of an object presents enough information about the object being depicted. Examples include images of cars (e.g., by comparing an image of a car to an online car retailer's images), matching images of street signs against stock photos of street signs, matching an image of a house against other images of the same house, matching furniture/indoor decor items against an online retailer's catalogue, and others.

In general, solely using semantic features from last layers does not result in best retrieval performance. Mid-level features as well as low-level features also play an important role in the retrieval process, especially in fashion retrieval, where differences between fashion items are subtle. The system achieves this feature combination by learning a single network that summarizes semantic information from various layers.

As shown in table 5, Where2BuyIt and DeepFashion are open source datasets on fashion recognition. Where2BuyIt contains approximately 204 k products, however, only 10 k products have street images, and all the shop images don't have bounding box annotations. DeepFashion contains 34 k products that have images from both domains However, its image resolution is low compared to Where2BuyIt, and the bounding box annotations are inaccurate.

Markable$^i$ and Markable$^{ii}$ are Markable's internal datasets. Such data sets may be obtained in various ways in accordance with various embodiments. For example, in some embodiments, a web scraper is programmed to scrape websites to obtain images and metadata about such images. As another example, a data set may be obtained by generating images with a digital camera and with human entry of metadata regarding the images using a computing device. Generally, any way of obtaining input data is considered as being within the scope of the present disclosure. With rigorous data cleaning and a human annotation pipeline, a computer system chooses images with high resolution (e.g., resolution above a threshold and/or resolution relatively higher than other images) and ensures accurate bounding boxes and pair information. For Markable, most products have 2 street images and 2 shop images, and all images, in an embodiment, have human annotated bounding boxes, while most products in Markable$^{ii}$ have many more street images and 2-5 shop images, and bounding boxes on these extra images are detected using Markable's fashion detector. Overall, compared to Where2BuyIt and DeepFashion, Markable datasets are well curated and hence suitable for the training and testing of cross domain fashion retrieval.

A computer system employing learning techniques described herein uses a single network for cross-domain retrieval that is trained end to end. To design a network best suited for retrieval, the following are taken into account: i) feature representation across layers, ii) feature weighting from a layer, iii) combining features from multiple layers.

TABLE 6

Top-20 recall on DeepFashion dataset for different feature representations.
L2:l2 normalization of features; PCA$_d$: PCA dimensionality reduction to dimension d;
SP/MP: SUM/MAX pooling for each feature map; || concatenation of features; H$_{color}$: color
histogram; conv4/conv5: conv4_3/conv5_3 feature etc.; ■◆●: training/validation/testing
splits of DeepFashion dataset. In FashionNet, model is trained on ■ and tested on ◆●.

| feature representation | R@20 (%) | training set | testing query | testing gallery |
|---|---|---|---|---|
| L2(PCA$_{300}$(fC7))\|\|H$_{color}$ | 3.4 | — | ■◆● | ■◆● |
| L2(PCA$_{3000}$(pool5\|\|fc7)) | 7.79 | — | ■◆● | ■◆● |
| MP(pool5) | 3.08 | — | ■◆● | ■◆● |
| L2(MP(pool5)) | 5.40 | — | ■◆● | ■◆● |
| L2(SP(pool5)) | 7.56 | — | ■◆● | ■◆● |
| L2(SP(conv5)) | 7.57 | — | ■◆● | ■◆● |
| L2 (SP(conv4)\|\|SP( con v5) ) | 7.70 | — | ■◆● | ■◆● |
| L2(L2(SP(conv4))\|\|L2(SP(conv5))) | 9.25 | — | ■◆● | ■◆● |
| L2(L2(SP(conv4))\|\|L2(SP(conv5))) | 11.44 | — | ■◆● | ■◆● |
| L2(L2(SP(conv3))\|\|L2(SP(conv4))\|\| L2(SP(conv5))) | 9.28 | — | ◆● | ◆● |
| | | | ■◆● | ■◆● |

TABLE 6-continued

Top-20 recall on DeepFashion dataset for different feature representations.
L2:l2 normalization of features; PCA$_d$: PC A dimensionality reduction to dimension d;
SP/MP: SUM/MAX pooling for each feature map; II concatenation of features; H$_{color}$: color
histogram; conv4/conv5: conv4_3/conv5_3 feature etc.; ■♦●: training/validation/testing
splits of DeepFashion dataset. In FashionNet, model is trained on ■ and tested on ♦●.

| feature representation | R@20 (%) | training set | testing query | testing gallery |
|---|---|---|---|---|
| Models | | | | |
| VggEmb-tri | 14.2 | ■ | ♦● | ♦● |
| VggEmb-tri pre-trained@Markable$^i$ | 17.8 | ■ | ♦● | ♦● |
| MarkableNetErx | 26.7 | ■ | ♦● | ♦● |
| MarkableNet-tri | 33.6 | ■ | ♦● | ♦● |
| FashionNet | 18.8 | ? | ♦● | ♦● |

Figure 30:
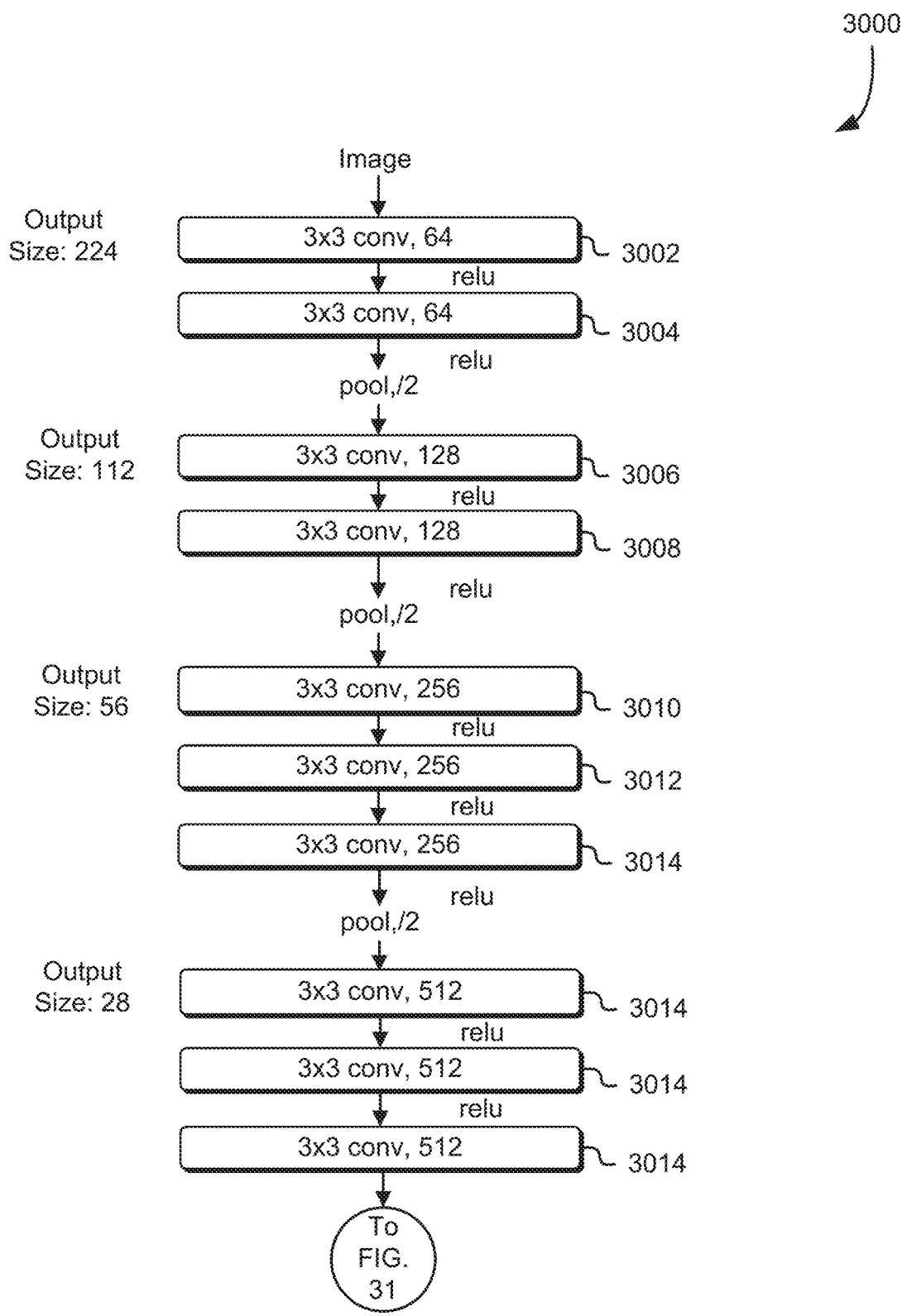
FIG. 30 shows a first portion of an illustrative example of a network design that captures both coarse-grained and fine-grained representations of fashion items in an image, in an embodiment.
Figure 31:
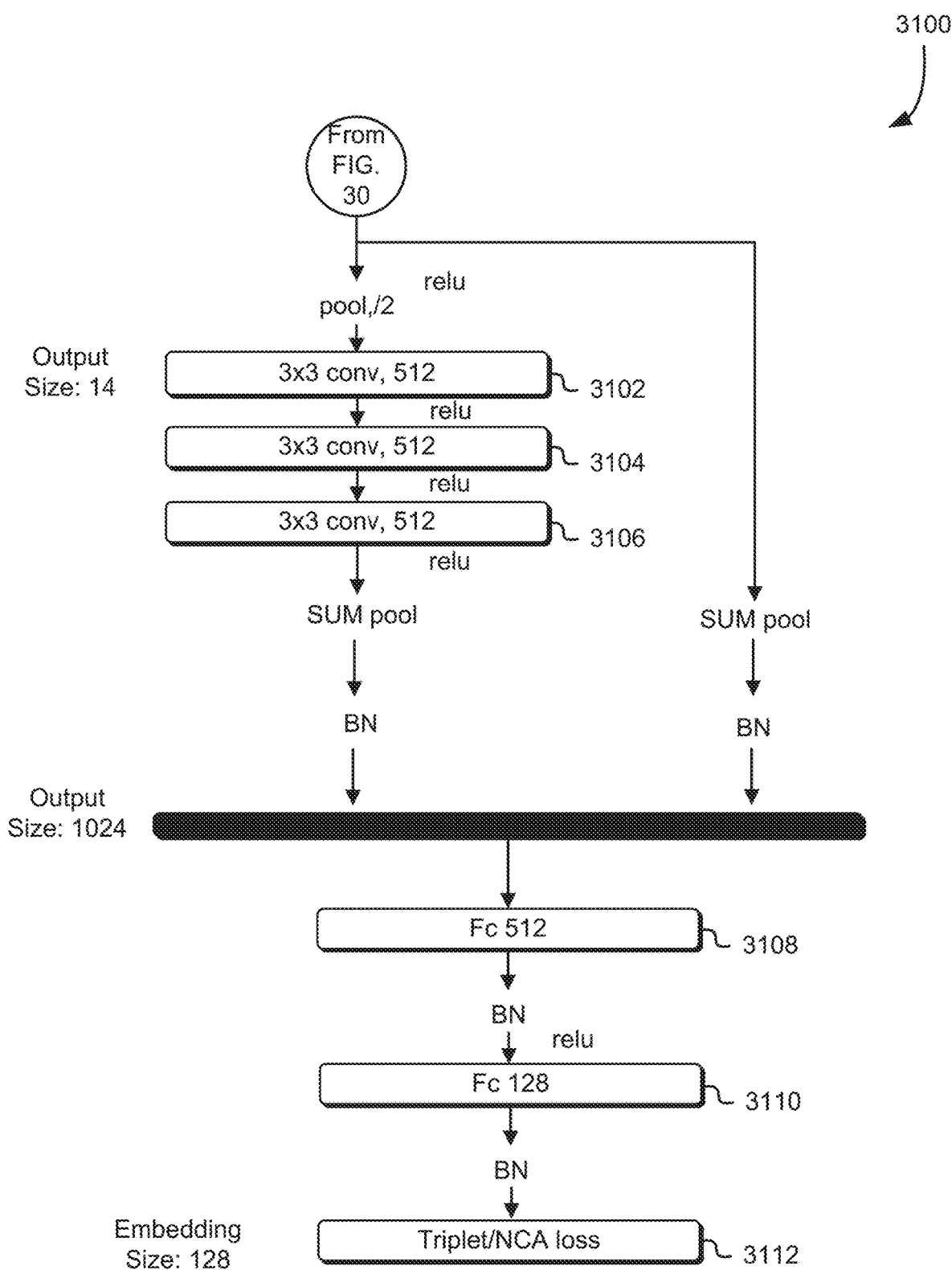
FIG. 31 shows a second portion of an illustrative example of a network design that captures both coarse-grained and fine-grained representations of fashion items in an image, in an embodiment.

FIGS. 30 and 31 show an illustrative example of a network design that captures both coarse-grained and fine-grained representations of fashion items in an image, in an embodiment. In an embodiment, the computer system uses a pre-trained VGG-16 neural network to test the street-to-shop clothing retrieval problem on the DeepFashion dataset. From the measurements (Table. 6), insights on how to form good feature representation for the retrieval problem can be drawn: (i) mid-level features from cony layers are superior to semantic features from f c layers; (ii) L2 normalization of features before concatenation helps; (iii) Sum pooling performs better than Max pooling; (iv) improvement from concatenation of lower level features (before conv4 layer) is trivial with these insights, and MarkableNet as shown in FIGS. 30 and 31 is obtained. This network design, in an embodiment, explicitly captures both coarse-grained and fine-grained representations of fashion items in an image resulting in a significant performance boost on the street-to-shop retrieval problem.

MarkableNet is based on VGG-16 structure, but, in an embodiment, all fully connected layers after conv5_3 layer are removed. SUM Pooling is applied on each feature map of conv4_3 and conv5_3 before the original 2×2 pooling operation, which gives us two 512d features. Empirically, it is seen that, in some implementation, direct concatenation of above features resulted in instability while training the network. In an embodiment, this is addressed by adding L2 normalization before concatenation. However that seems to simply avoid the issue via rescaling without a significant increase in performance. Instead of L2 normalization, an embodiment using a batch normalization layer before concatenation solves the feature scale problem. Following the concatenated 1024d feature, two fully connected layers are added so the network can have enough capacity to handle different feature scales and variations coming from different layers. Batch normalization is also applied after both fully connected layers, and a drop-out layer is not used. The embeddings from MarkableNet are 128d features which have a significantly lower memory footprint that most other retrieval methods.

Figure 32:
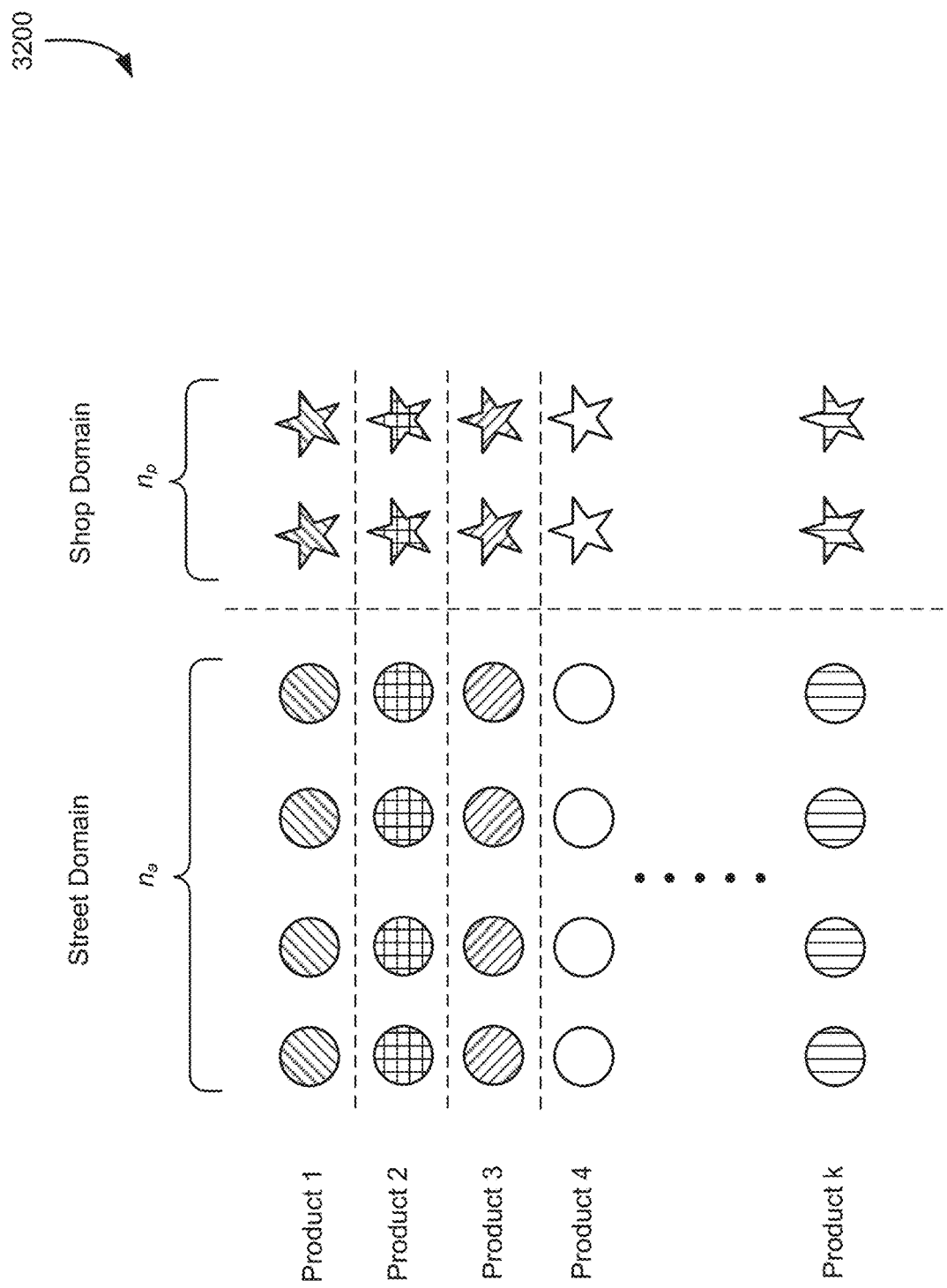
FIG. 32 shows an illustrative example of how batches are formed to generate triplets online, in an embodiment.

FIG. 32 shows an illustrative example of how batches are formed to generate triplets online, in an embodiment. In FIG. 32, $n_a$ and $n_p$ are the number of street images and the number of shop images per product. For each batch, k products are selected, and for each product, $n_a$ street images and $n_p$ shop images are randomly selected by a computer system performing the techniques described herein. To learn a model for retrieval from street domain to shop domain, cross-domain triplets are used, where anchors are from street domain, and positives and negatives are from shop domain. More specifically, for each product, one of its $n_a$ street images is selected as anchor, one of its $n_p$ shop images is selected as positive, and one shop image of other products in the batch is selected as negative. In this way, it is able to generate a large amount of triplets while only forwarding the unique images once through the network. The triplet loss is defined as:

$$\mathcal{L}(X, y) = \frac{1}{|\tau|} \sum_{(x_i, x_i^+, x_i^-) \in \tau} \left[ D^2 x_{i,} x_i^+ + \alpha - D^2 x_{i,} x_i^- \right] + (1)$$

where x is the set of cross domain triplets, $x_i$ is from street domain, $x_i^+$ and $x_i^-$ are from shop domain, $\mathcal{D}$ is distance, and $[\cdot]_+$ is hinge loss. The L2 is used as a metric in experiments, in an embodiment, although other suitable metrics can be used.

Other than triplet loss, loss functions are defined. For example, in an embodiment, n-pair tuples are constructed by selecting one shop image per product and using N-Pair loss. Since N-Pair loss is a special case of NCA loss, in an embodiment, NCA loss is used, where NCA loss is defined as:

$$\mathcal{L}(X, y) = \frac{1}{N} \sum_i \log \frac{\sum_{j \in Ci} e^{-D_{xi,xi}}}{\sum_{j \in C} e^{-D_{xi,xi}}} \quad (2)$$

where i is from street domain, and all shop images of its corresponding product composes while C is the set of shop images from all the products within the batch.

To improve the performance, previous works have proposed using negative mining. For the negative mining method, semi-hard negative mining and random hard negative mining are evaluated. Such mining methods do not work as well as using all valid triplets in terms of training stability. Instead, in the late stage of training, in an embodiment, a hard negative products mining step, which aims at forcing the network to learn fine-grained subtleties, is used. Hard negative products mining can be used for any metric. We illustrate the mining steps in FIG. 33.

For each query street image $x_i$, a set $\mathcal{G}_i$ is formed, which contains approximately $\Delta-1$ similar products as the query product. More specifically, each query yields a response containing distances to all the shop images from the database. To form the set $\mathcal{G}_i$, we rank the distances in an increasing order. Considering the ranked shop images, if the position of first exact product is greater than the mining window size, in an embodiment, then the mining window will fully reside in the left side (e.g. $x_i$ in FIG. 33). In the case of the first exact product position being less than $\Delta$, the mining window will extend to the right side (e.g. $x_{i+1}$ in FIG. 33) in order to find a total of $\Delta-1$ similar shop images. $\mathcal{G}_i$ is then composed of the unique products within the mining window. In the case of duplicate products within the mining window, $\mathcal{G}_i$ will contain less than $\Delta$ products.

Figure 33:
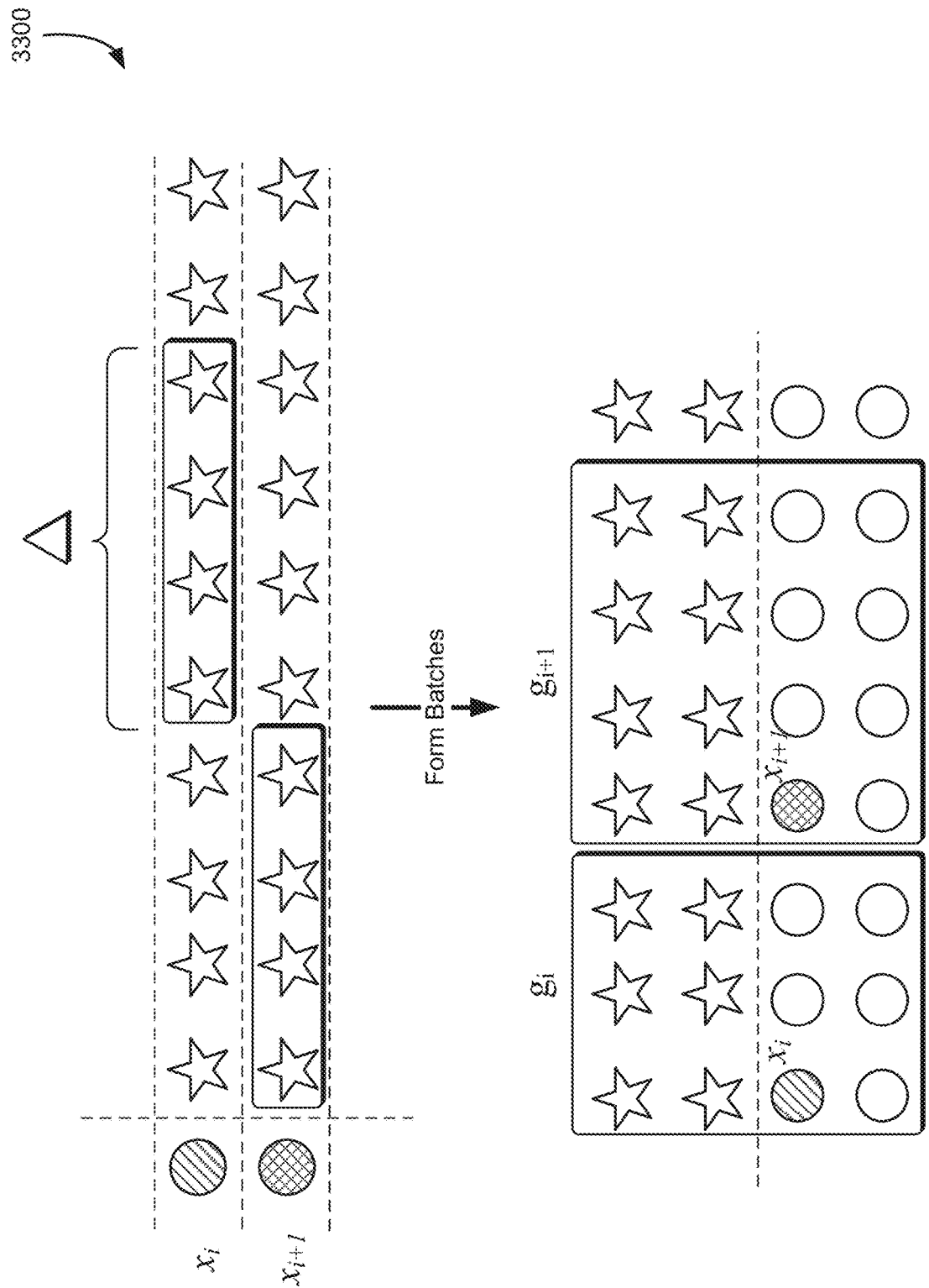
FIG. 33 shows an illustrative example of hard negative products mining steps, in an embodiment.

To form batches, the query image and its mining window's product shop images are used as preset images. Images of products in $\mathcal{G}_i$ are randomly sampled so that each product has $n_a$ street images and $n_p$ shop images in the batch. In some implementations, it will also be necessary to append randomly sampled products due to fixed batch size. FIG. 33 showcases the hard negative products mining steps with setting $n_a=2$, $n_p=2$, $\Delta=4$ and batch size being 32.

In an embodiment, a batch size of 144 is used. The system is tested using different values of $n_a$ and $n_p$ (see FIG. 32). Empirical results demonstrate that the training converges slowly and is less stable when using big values for $n_a$ and $n_p$. In practice, $n_a=2$ and $n_p=2$ is generally a good setting, as it strikes a good balance between forcing the network to learn inter-product variations and at the same time handling intra-product variations. As for hard negative products mining, we used group size $\Delta=6$ (see FIG. 33).

In an embodiment, different network structures and loss functions on various street-to-shop datasets demonstrate the effectiveness of our network and cross-domain batch scheme. The following nomenclature is used:

VggEmb: this model has an 128d embedding layer after fc7 layer of VGG-16 model.

MarkableNet: Markable CNN model (FIGS. 30-31)

tri: trained with triplet loss (Eq. (1)).

nca: trained with NCA loss (Eq. (2)).

hnm: hard negative products mining.

$M_5$: our model with best retrieval performance (Table. 7).

For the training of both VggEmb and MarkableNet, gradients are back propagated through until conv4_1 layer. Margins are set to 0.3 for the triplet loss. The top-k recall metric is used to measuring performance, wherein a true positive is the case when the exact product is within the first k retrieved results.

FIG. 33 shows an illustrative example of hard negative products mining steps, in an embodiment. Circles are street images, while stars are shop images. Colors are used to differentiate different products. $x_i$ is the ith query street image, A is the mining window size, $\mathcal{G}_i$ is the set of mined similar products for $x_i$. In order to form batches, we also: i) sample images (non-filled circles and stars) of corresponding products in $\mathcal{G}_i$; ii) append randomly sampled products in case of duplicate products in the mining window, so that batch images are organized as in FIG. 33.

In an embodiment, the fine-tuning of datasets, is accomplished using 80% products for training, and 20% products for testing. As seen from Table. 7, all embeddings from MarkableNet structure $M_2$-$M_5$ can achieve much higher recall in comparison to embeddings from VggEmb structure $M_1$. Training on larger dataset Markable$^{ii}$ also boosts retrieval performance compared to training on Markable. Furthermore, hard negative products mining always helps in increasing the recall, and the improvement is more significant on a bigger dataset. All these improvements from better feature representation, bigger dataset and negative products mining are more obvious when considering challenging cases such as "Accessories" categories.

To evaluate the performance of the system, in an embodiment, MarkableNet has been tested on DeepFashion and Where2BuyIt and/or other public datasets. On the Deep-Fashion dataset, as shown in Table. 6, MarkableNet attains approximately a 40% relative increase in top-20 recall compared to existing system performance of 18.8%. Thus the techniques described herein comprise technological improvements for extraction of the relevant features for street-to-shop matching. Further evaluation of the contribution of a clean dataset can be made by using $M_2$ (see Table. 7) as the pre-trained model. After fine-tuning, the model achieves approximately 78% relative improvement over other solutions. Top-20 retrieval recall on the Where2BuyIt dataset is given in Table. 8. For both cases of training with or without using Markable's internal datasets, MarkableNet is able to achieve highest recall for most categories.

In an embodiment, the t-SNE algorithm is used for dimensionality reduction and the Jonker-Volgenant algorithm for grid alignment to visualize the embedding vectors on a subset of Markable$^i$. Dress shop images may be grouped based on factors such as color, texture and style. Similar patterns may be observed for products from different categories as well. In some examples, model $M_5$ is able to handle most of the variations from street domain and clusters street and shop images per product. For example, for the dresses category, intra-product distances and inter-product distances are well separated. Thus, the learning process is to pull intra-product embeddings and push inter-product embeddings. Overall, these visualizations demonstrate that feature representations using the embeddings from MarkableNet is suitable for fashion retrieval.

In production, given a query image, in an embodiment, the Markable internal fashion detector is used to detect and classify all the fashion items in the query image, then a within-category retrieval is performed for all the detected items using their bounding boxes and categories from the detector. It can be seen that for both top-10 hit and missing cases, most retrieved products are similar to the query items in either one or multiple aspects. The results also show some failure cases arising because of a large pose deformation, occlusion due to long hair and variable amounts of skin captured in a bounding box.

TABLE 7

Top-k recall on Markable datasets for different experiments.

| Markable$^i$ | R@20 (%) | | | | | R@10 (%) | | | | | R@2 (%) | | | | |
|---|---|---|---|---|---|---|---|---|---|---|---|---|---|---|---|
| | $M_1$ | $M_2$ | $M_3$ | $M_4$ | $M_5$ | $M_1$ | $M_2$ | $M_3$ | $M_4$ | $M_5$ | $M_1$ | $M_2$ | $M_3$ | $M_4$ | $M_5$ |
| All categories | 64.3 | 79.2 | 79.0 | 88.0 | 87.7 | 54.0 | 70.6 | 71.4 | 81.8 | 82.1 | 32.7 | 49.7 | 51.0 | 61.6 | 64.0 |
| Clothing | 77.0 | 89.3 | 88.9 | 94.3 | 94.6 | 66.9 | 83.5 | 83.8 | 90.3 | 91.2 | 44.0 | 65.3 | 66.6 | 74.5 | 77.5 |
| Accessories | 45.9 | 64.3 | 64.3 | 77.7 | 76.7 | 34.2 | 51.3 | 52.7 | 67.8 | 67.2 | 15.8 | 26.1 | 27.6 | 40.0 | 41.6 |

| Markable$^{ii}$ | R@2 (%) | | | R@10 (%) | | | R@2 (%) | | |
|---|---|---|---|---|---|---|---|---|---|
| | $M_2$ | $M_4$ | $M_5$ | $M_2$ | $M_4$ | $M_5$ | $M_2$ | $M_4$ | $M_5$ |
| All categories | 62.8 | 74.3 | 78.0 | 56.8 | 68.0 | 72.9 | 41.0 | 50.7 | 58.1 |

$M_1$: VggEmb-tri; $M_2$: MarkableNet-tri; $M_3$: MarkableNet-hnm-tri; $M_4$: MarkableNet-nca; $M_5$: MarkableNet-hnm-nca. $M_1$, $M_2$, $M_3$ are trained on a Markable$^i$ dataset, $M_4$, $M_5$ are trained on a Markable$^{ii}$ dataset. "All categories" include the total 35 subcategories, "Clothing" includes 17 subcategories, and "Accessories" includes 18 subcategories.

TABLE 8

Top-20 recall on Where2BuyIt dataset. VisNet and $M_5$ are trained with external data.

| w/o external data | bags | belts | dresses | eyewear | footwear | hats | leggings | outerwear | pants | skirts | tops | Overall |
|---|---|---|---|---|---|---|---|---|---|---|---|---|
| F.T. Similarity | 37.4 | 13.5 | 37.1 | 35.5 | 9.6 | 38.4 | 22.1 | 21.0 | 29.2 | 54.6 | 38.1 | 28.97 |
| R. Contrastive & Softmax | 46.6 | 20.2 | 56.9 | 13.8 | 13.1 | 24.4 | 15.9 | 20.3 | 22.3 | 50.8 | 48.0 | 37.24 |
| MarkableNet-nca | 36.7 | 33.3 | 58.5 | 56.9 | 33.1 | 33.8 | 18.5 | 27.5 | 44.0 | 74.1 | 42.9 | 41.8 |
| w/external data | bags | belts | dresses | eyewear | footwear | hats | leggings | outerwear | pants | skirts | tops | overall |
| VisNet | — | — | 61.1 | — | — | — | 32.4 | 43.1 | 31.8 | 71.8 | 62.6 | — |
| $M_5$ | 55.4 | 19.0 | 84.5 | 72.4 | 62.2 | 41.5 | 15.4 | 60.9 | 63.6 | 87.3 | 58.6 | 67.4 |

In this work, the possibilities of constructing a good feature representation for the problem of fashion retrieval are explored. MarkableNet, which uses summarization features pooled from multiple convolutional layers of the VGG-16 model, is a novel solution to this problem. Two datasets are constructed as training material for MarkableNet. Results from extensive experiments show that MarkableNet provides improved performance from both better feature descriptors and, bigger yet higher quality datasets. Substantial differences of model performance brought by the choice of loss function in metric learning are not found; however, the convergence rate is much faster when using NCA loss. Hard negative products mining can be used as a reliable tool to further improve model performance.

Variations considered as being within the scope of the present disclosure include those using better feature representations from better models such as ResNet and feature pyramid networks. Different methods for region of interest pooling and instance level segmentation may be used to play a role on the way to achieving human-level fashion recognition performance.

In an embodiment, deep learning is applicable to many problems such as image classification, object detection and segmentation. These developments are employed to build intelligent and powerful consumer facing products that enhance the user experience. One of the applications of improved visual understanding is visual search. The scope of visual search may be applied to images where both the query and the database consist of image data. For example, a video may be used to query against a database of images. The systems and methods described herein are able to detect products present in images and videos. In some implementations, individual products are identified using a database of product images and videos.

In some examples, the system allows sellers to upload videos or images of clothing products into an electronic catalog. An electronic catalog may be a database, data store, array, or other data structure stored on computer-readable media that is accessible to the system. Sellers may upload videos or images into the catalog over a computer network, on physical media, or by way of a camera or video capture device that is connected to the system. In one implementation, sellers upload images using a client computer system running a web browser, and the system provides a Web server that accepts uploaded images.

Consumers are able to search against that catalogue by providing a free-form image or video with a query request. The query request may be uploaded from a client computer system via a web browser, or using client software running on the client device. In one implementation, the client software is an application running on a mobile device, tablet computer system, cell phone, or other appliance that includes a camera. The consumer captures an image on the client device, and using the client software, uploads the image to the service. In one implementation, the client device is a cell phone, and the client captures the image on the cell phone and uploads it to the service over a cellular network.

FIG. 34 shows an illustrative example of image and video product retrieval, in an embodiment. In some embodiments, fashion recognition techniques and applications are based on recognition from a single image. For example, given an input image, the system recognizes the fashion items in the image and identifies similar fashion items that are available from online retailers, as shown in FIG. 34. As more consumers have access to video capture devices, recognition of a product based at least in part on video samples is becoming more important. In some implementations, the success of image-based fashion recognition relies on the quality of the representations learned by neural networks.

An image-based retrieval system contains a detector to detect fashion items in the query image and an extractor to extract a feature representation in an embedding space for each detected item. Using a specific distance metric for the embedding space, the feature representation of each item is used to retrieve matching and similar products whose features are close to the feature representation in the embedding space. The detectors and feature extractors are tolerant to variations such as pose and lighting variations, and mild occlusions that are present in the images. However, many real-world video samples pose a challenge to the system, due to the presence of larger image variations in the video domain. As a result, application of conventional image based retrieval processes to the processing of video images may fail, and the present system provides a retrieval system that is tolerant to the image-quality variations often present in real-world video samples. In general, image-based retrieval techniques, when applied to videos, tend to generate false positives and low quality bounding box predictions, both of which pollute the inputs to the extractor and generate bad feature representations for final retrieval.

In various embodiments described herein, the video product retrieval system trains a neural network that is able to detect, track, and extract discriminative feature representation information for each item in a user video. There are several challenges to this approach. First, it may be difficult to collect a large amount of training data of user uploaded videos wearing a certain product and the product's online images from a retailer's website. As an alternative, it may be easier to collect user-uploaded images of persons wearing a certain product. Second, it can be difficult to extract product features for the database, and train the model, if there are relatively few (2-4) images from retailers of the product. In some implementations, the video product retrieval system integrates an image-based detection plus a feature-extraction pipeline to enable both image and video product retrieval.

A video may contain multiple image frames showing the same product. The video product retrieval system takes advantage of this by fusing the product's representations from a plurality of frames into a single high-quality representation. The speed of the downstream retrieval process is increased due to a more compact representation of the product, and the retrieval results are improved because the fused representation is more comprehensive than a representation derived from a single image. In some embodiments, there will be fewer features in the database to search against, resulting in a faster retrieval process. Individual images within a video stream may vary in terms of quality. For example, in a particular video stream, some detections may have poor quality and are thus not suitable to pass to the extractor for feature fusion. Therefore, in some examples, the video product retrieval system filters the available image to select only good detections to be used for fusion. In some video frames, multiple items may be present, and an association mechanism is used to form tracklets of each item across video frames before feature fusion. The video product retrieval system: i) detects, tracks and generates a feature fusion that results in improved video product retrieval results; ii) integrates into image based retrieval systems; and iii) is able to integrate further improvements of video-based models such as tracking models. In an embodiment, a tracklet is a descriptor that captures a shape and/or joint motion with in a video segment by identifying spatio-temporal interest areas within a sequence of individual video frames. In some examples, a tracklet describes the (potentially moving) location of an object or object portion within a sequence of video frames. In some examples, a tracklet includes a movement vector for the region that describes the direction and speed of the object within the frame.

In various embodiments, the processing of video-based queries can be approached using a variety of techniques. In one example, video frames are treated as a sequential data or image set. If they are treated as sequential data, then a recurrent neural network may be used to model the temporal dependencies among video frames. However, during the inference time, the output may not be permutation invariant with respect to input frames. If the video frames are treated as an image set, the prediction can be deterministic. Since database products are in the form of an image set, a single image set based model can be applied on both the query and search domain. Metric learning may be used to learn the mapping from one domain to a different domain. Tasks such as face verification, person re-identification, and product retrieval may use metric learning, while classification generally does not. Tracklets of each face/person/product may be used. When tracklets are used, cases where inputs are polluted by false positives are excluded. Either a tracking model or an association mechanism may be used to form tracklets.

TABLE 9

Summary of Techniques

| Task | Set vs Sequential | Tracklets available | Metric learning | Domain mapping | Training data abundant |
|---|---|---|---|---|---|
| Image set classification | set | — | no | — | abundant |
| Video face recognition | sequential | yes | yes for verification | — | abundant |
| | set | yes | yes for verification | — | abundant |
| Person re-identification | sequential | yes | yes | video to video | abundant |
| | set | yes | yes | video to video | abundant |
| Video product retrieval | sequential | yes | yes | video to image set | scarce |
| | set | no | yes | video to image set | scarce |

Although different techniques may differ in the above dimensions, in general, many techniques combine multiple features to produce a single and more comprehensive feature. The fusion can be in the form of straightforward temporal or set pooling. Among the pooling options, average pooling may be superior to maximum or minimum pooling along a temporal dimension, in many instances. Advanced methods of fusion rely on a temporal attention mechanism. A soft attention mechanism gives a fusion weight to each feature of each video frame, the fusion weight may be in the form of a quality score that signifies the image quality of a current frame. Some implementations use a hard attention mechanism to pick out the subset of good frames for fusion, which is modeled as a Markov Decision Process ("MDP") that uses reinforcement learning. IN some examples, fusion is performed at the feature level, but fusion can also happen at the score or metric level. Some examples learn a similarity network using a tree-like structure to measure the distance between a set of queries features and a database feature. However, these metric level fusion methods may have lower performance and may be more computationally intensive when compared to feature level fusion.

The video product retrieval system takes into account of the following prospects: i) the retrieval result is permutation invariant with respect to input video frames, so video frames are treated as an image set; ii) quality awareness feature fusion is performed using a quality awareness module; iii) tracklets are generated using an association algorithm to form tracklets.

Figure 35:
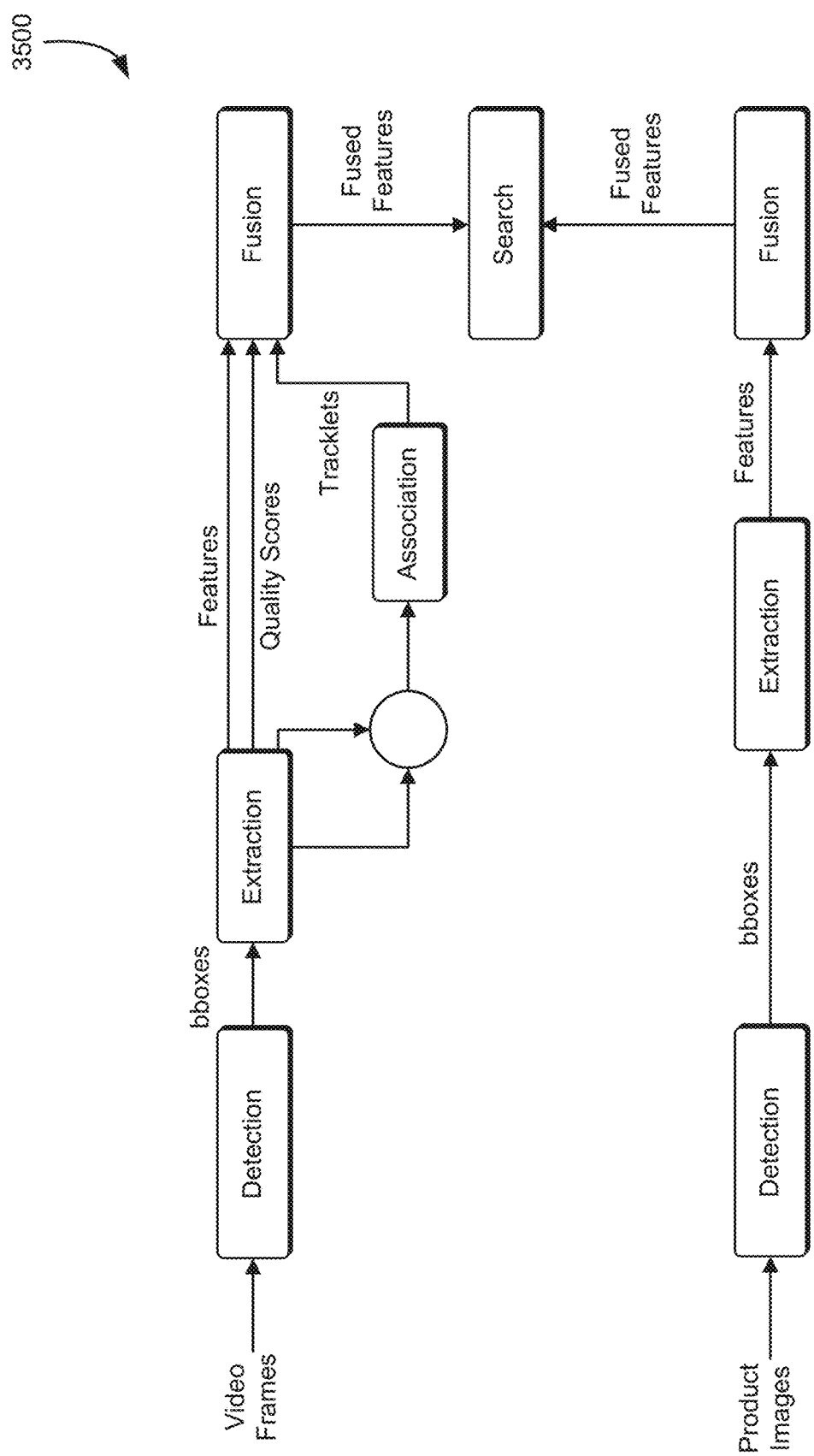
FIG. 35 shows an illustrative example of a video product retrieval system that identifies one or more products from a video or image, in an embodiment.

FIG. 35 shows an illustrative example of a video product retrieval system that identifies one or more products from a video or image, in an embodiment. In an embodiment, the video product retrieval system is implemented as a computer system containing memory and one or more processors. The memory stores executable instructions that, when executed by the one or more processors, cause the computer system to perform operations that implement the system. In various embodiments, the executable instructions may be described by grouping particular portions of the executable instructions into functional components, modules, or interfaces. Such groupings may be made for a variety of purposes including improving the readability, understanding, and maintainability of the executable instructions. In some examples, executable instructions may be grouped and arranged in ways that improve the performance of the computer system as a whole. In the present document, performance of a particular operation may be described as being performed by a particular module or component. Those of ordinary skill in the art are aware of this practice and understand that, in general, the operation is performed by the one or more processors of the system as a result of executing instructions that are associated with the particular module or component. In an embodiment, the executable instructions associated with the system include detection, extraction, association and fusion modules.

In an embodiment, the detection modules and extraction modules are image-based models. The extraction model serves as a feature extractor, and may also serve as an input item image quality checker. The extraction module is able to determine, for the patch inside each bounding box predicted by the detector, how good the feature representation of that patch is for the retrieval task. If the bounding box is not regressed well, then the quality is determined to be low. In some examples, the level of regression may be determined by a threshold value set by an administrator and stored in a memory of the system. If the bounding box is accurate, but the patch content is not suitable for retrieval (for example due to an occlusion or motion blur) then the quality will also be low. A quality score threshold is used to remove obvious bad detections before they are fed into the association module to form tracklets. However, in some examples, quality thresholding may not be able to filter out false positives from detections, as some of the detected false positive items can have high patch quality. Therefore, in such situations, false positives are removed in the association module. In addition, the selected patches of each tracklet and the corresponding quality scores are passed to the fusion module to get a fused feature for the item that corresponds to the tracklet. Quality scores may be used as weights to fuse the tracklet features. The fused features are then used to query the database for retrieval. Since product images are usually high-quality images captured in con-trolled environments with clean backgrounds. The fusion module in the product domain can be an average fusion technique.

Figure 36:
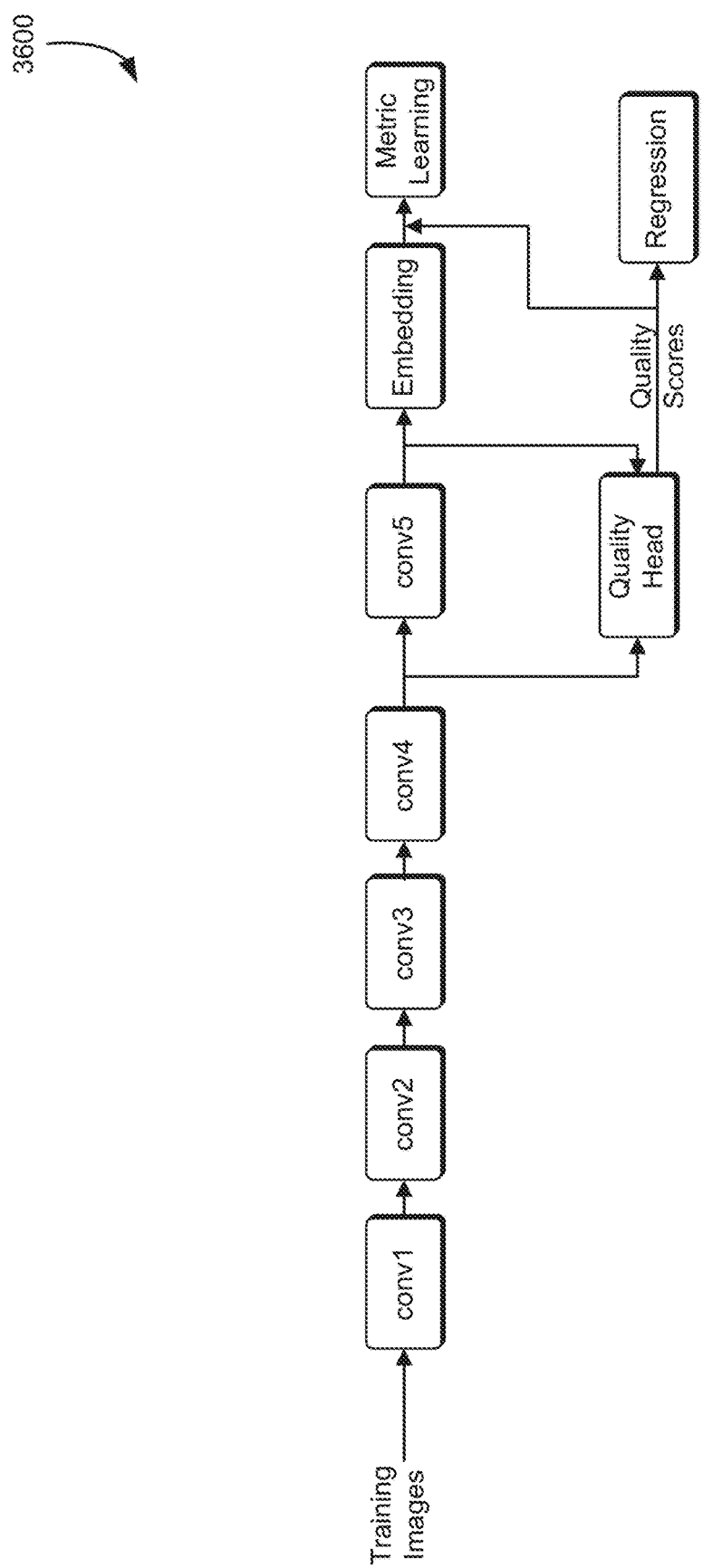
FIG. 36 shows an illustrative example of quality head branch training, in an embodiment.

FIG. 36 shows an illustrative example of quality head branch training, in an embodiment. In an embodiment, the video product retrieval system generates quality scores by training a quality prediction head branch using the mid-level convolutional features from the extraction model. For training data, the video product retrieval system adopts data augmentation approaches and labels each augmented box with a quality score based on certain empirical metrics, such as intersection over union ratio with respect to the ground truth, and variance of Laplacian as an estimate of its blurriness. The video product retrieval system may train the quality head as a regressor from convolutional features to quality scores, or may train the extractor end to end. In this case, the quality scores may be used to fuse the final features, and metric learned from the fused features may be used to learn the quality scores implicitly.

In an embodiment, an association module determines which items belong to the =same product amongst the set of detected items across video frames. Let $I_c^t = I_{c,0}^t, I_{c,1}^t \ldots, I_{c,n}^t$) be the set of n detected items of class c in frame t. Also, let $f_c^t = (f_{c,0}^t, f_{c,1}^t \ldots f_{c,n}^t)$ be the corresponding feature representations of these n detected items. A length $l_k$ tracklet $T_k = (I_{c,0\,k}^{t\,o}, I_{c,i\,k}^{t\,1}, \ldots, I_{c,i\,h}^{t\,1}, \ldots, I_{c,i\,k}^{t\,l})$ is a collection of detected items across different video frames that are recognized as the same product. Each tracklet has a running averaged feature to represent the corresponding tracked product. The video product retrieval system uses a method based on the distances between $f_c^t$ and tracklets' features under certain distance metrics (e.g. euclidean distance) to associate the clothing items at time t to available tracklets at time t−τ. An example is shown in the method below. Using this method, the video product retrieval system is able to track the items across a plurality of video frames.

```
for each Video frame do
    increase tracklet T_k's idle length by 1;
end
for each f'_{c,i} ∈ f'_c do
    compare f'_{c,i} with the fused features of all
    tracklets and get the £2 distance to the
    closest tracklet T_k;
    if the distance ≤ thresh_d then
        attach item I'_{c,i} tracklet T_k;
        update fused features
            f_{Tk}=(f_{Tk} + f'_{c,i}) / 2
        increase tracklet T_k's length by 1;
        set tracklet T_k's idle length to 0;
        if tracklet's length > thresh_{active} then
            tracklet T_k is activated;
            send f_{Tk} for product retrieval;
        end
    end
    else
        create a new tracklet T_z;
        attach item I'_{c,i} the new tracklet T_z;
        set tracklet T_z's fused feature f_{Tz} ≡ f'_{c,i};
        set tracklet T_z's length to 1;
        set tracklet T_z's idle length to 0;
    end
end
for each tracklet T_k do
    if its idle length > thresh_{idle} then
        delete tracklet T_k;
    end
end
end
```

Once a fashion item has been tracked across video frames, the video product retrieval system fuses the features for that particular item. This can be achieved in various ways, one of which is to calculate the weighted average using quality scores. Let $f_{i,c}=(f_{i,c}^0, f_{i,c}^1, \ldots, f_{i,c}^P)$ and $q_{i,c}=(q_{i,c}^0, q_{i,c}^1, \ldots q_{i,c}^P)$ be the set of features and quality scores for clothing item i, of class c. The fused feature for that item may be calculated as:

$$f_{i,c}^p = \frac{1}{p}\sum_{m=1}^{p} q_{i,c}^m * f_{i,c}^m$$

Note that the fusion here is different from the running average in the association process, although in principle both processes could use the same fusion module. In some implementations, combining the Fusion module with the association module may ease the association difficulties by placing additional weight on recent features.

Video based processing modules can be integrated into the video product retrieval system framework. Tracking can be integrated within a detection module to ease the burdens on or even replace the association module. An attention mask can also be generated with quality scores, and the attention mask may, in some embodiments, be used to aid retrieval. If video frames are treated as sequential data, a recurrent unit in the fusion module can accept features within a tracklet sequentially, thereby adjusting the fusion module's knowledge about the tracked product and producing the fused feature, with quality awareness embedded in its intermediate hidden states.

The video product retrieval system can be used to improve existing image-based product retrieval systems for end-to-end video product retrieval. In various examples, the video product retrieval system achieves this by removing image based detection's false positives through quality score filtering and association. In addition, in some examples, a quality aware feature fusion provides a comprehensive representation for product retrieval, and improves the scalability of the system.

In an embodiment, a computer system analyzes the characteristics and attributes of clothing using image and video information. In various examples, the system is able to achieve human-level understanding. The system uses object detection to achieve localization and categorization of an object such as a dress. In some examples, the system performs an analysis that goes beyond mere categorization to generate an enhanced profile of each piece of clothing. For example, for a dress, the system may determine the color, pattern, material, type of sleeve, type of collar, and other attributes. The system goes beyond identifying attributes of a particular image by associating particular attributes with particular subjects within an image. By doing so, the system is able to localize the object present in the image and represent the information specific to a product contained in the image. In various implementations, the system provides an end-to-end detector and attribute network that localizes and categorizes the products present as well as finds specific mid-level attributes corresponding to each product.

Figure 37:
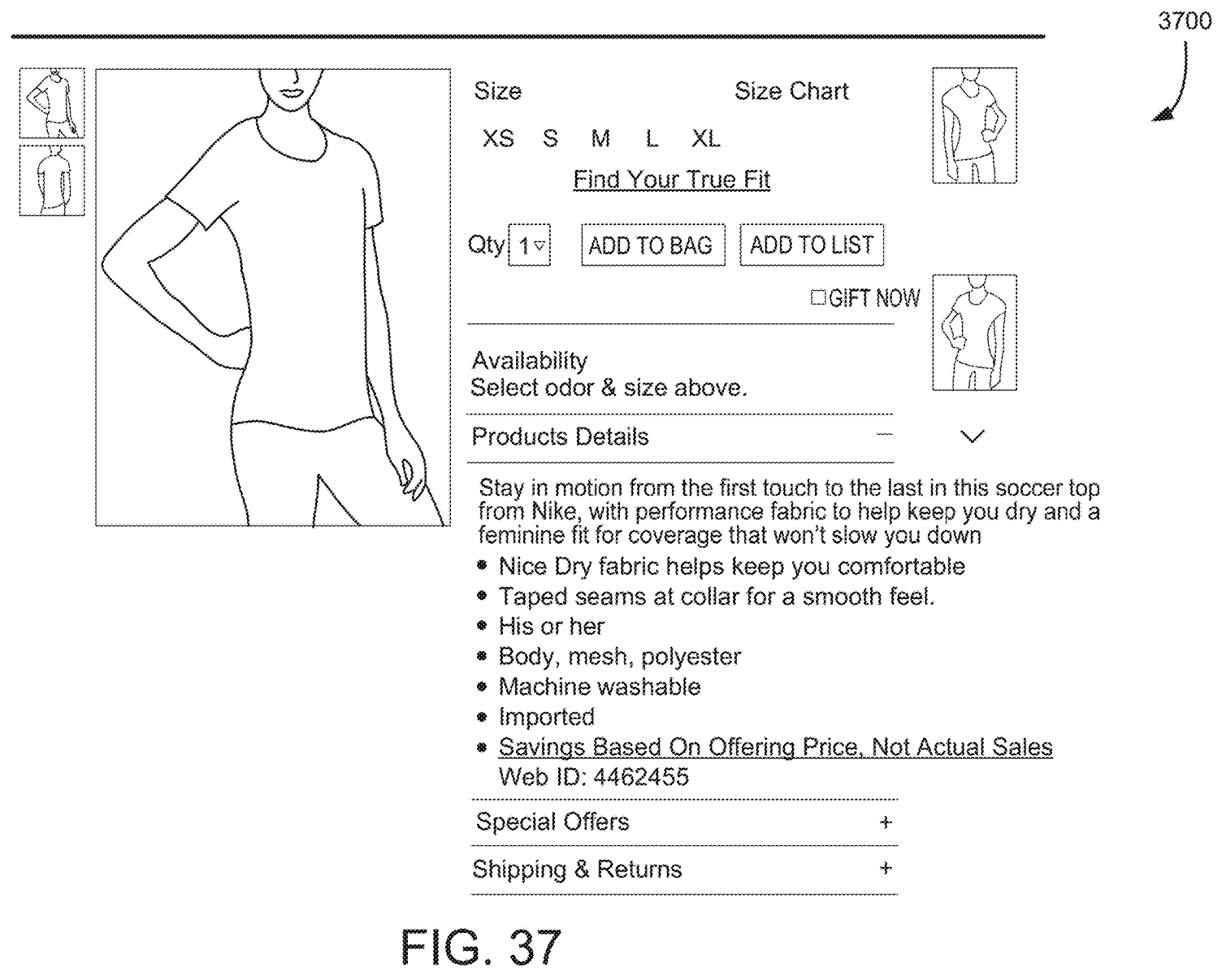

FIG. 37 shows an illustrative example of a product web page that includes product attributes, in an embodiment. In many examples, designers and retailers add attributes describing the items being sold. For example, in FIG. 37, the retailer includes a description of attributes that may be helpful to a potential buyer (e.g. upper hemline, material, color, etc.). This process may be performed manually. In various embodiments described herein, a computer vision system automates the task of determining product attributes using images or video frames of the products in question.

In some embodiments, the computer vision system uses deep-learning-based systems, which provide improved performance of computer vision tasks. In various examples, a subset of deep network architectures perform quite well on object detection tasks. Such architectures are built to identify object instances within images and/or video frames.

Figure 38:
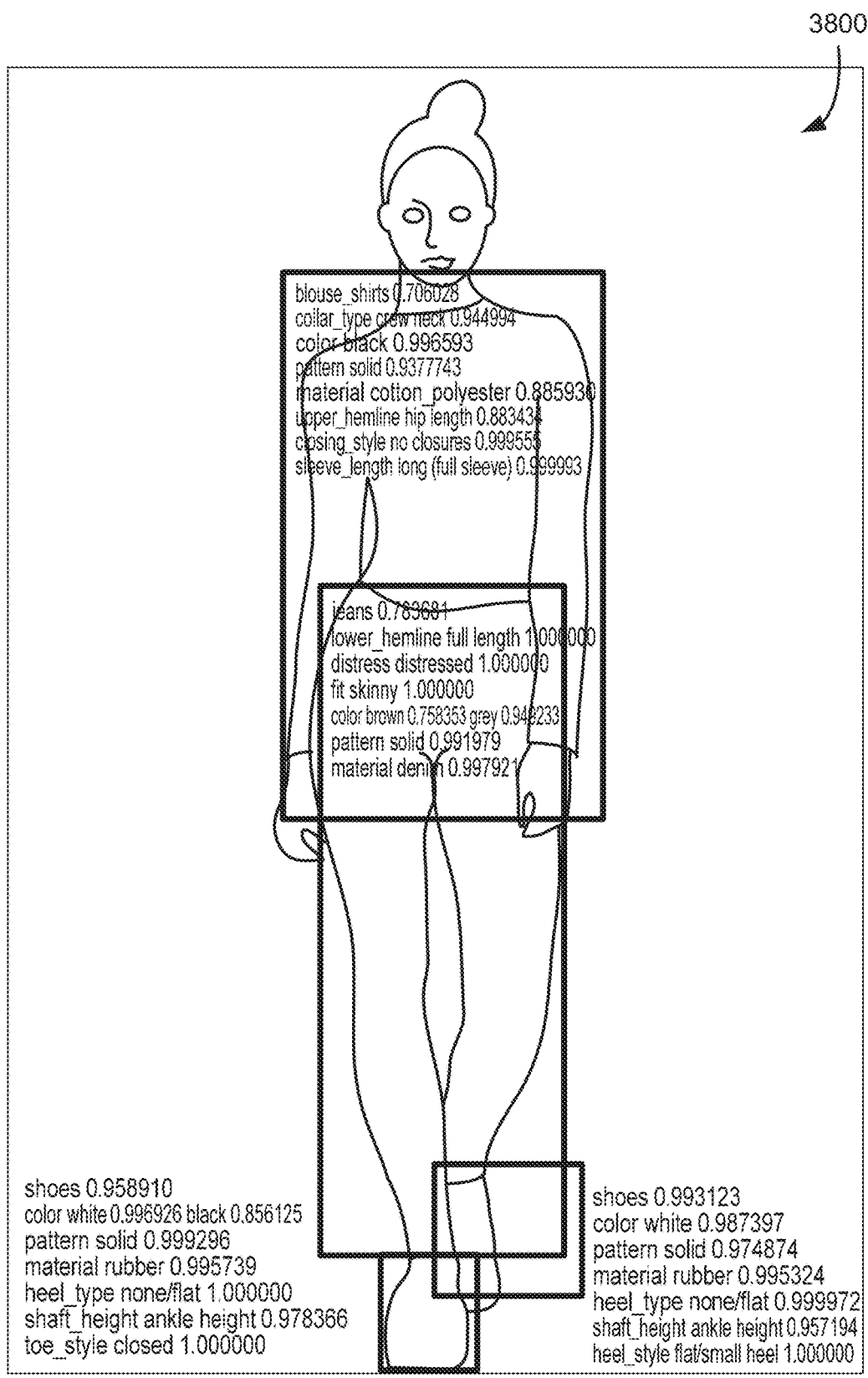
FIG. 38 shows an illustrative example of output from a detection and attribute network, in an embodiment.

FIG. 38 shows an illustrative example of output from a detection and attribute network, in an embodiment. The described computer vision system uses the systems for identifying clothing objects within images and video content, and to use these detections to provide our users with a list of clothing/apparel attributes. This can be accomplished by building a deep learning architecture composed of two primary modules: 1) a module for detecting fashion items, and 2) a module for generating a list of product attributes for each detected item. An example of the output of this system is shown in FIG. 38, in which all clothing items are detected and their respective attributes listed.

Retailers are able to use the computer vision system for various applications including but not limited to:
  Visual SEO—Automatically enriching the information for each clothing item in an online retailer's inventory.
  Better Categorization/Taxonomies—Parsing the entire inventory of an online retailer and categorizing along the lines of color, pattern, material as well as things like dress category.
  Attribute Based Search—Searching an online retailer's inventory using mid-level attributes that are automatically populated.
  Fashion Trend Analysis Utilizing attributes to analyze fashion trends on client's sites and social media platforms. These insights can then be used to improve sales through better consumer understanding.

The present document describes a computer vision system. The computer vision system provides an end-to-end system capable of localizing, detecting and extracting products from image and video content and producing attributes affiliated with those items. In some embodiments, the computer vision system is integrated with an attribute-extraction system with visual search to improve the relevancy of search results with product queries extracted from image or video content.

Deep-learning based object detection methods may be divided into several categories. One approach is a two-step method where the input image is first passed through an object proposal network and then passed through a classification head. Another approach is a one-step method where bounding boxes are directly located and predicted in one step.

In various embodiments, the computer vision system described herein uses a two-stage method. The computer vision system may use a region proposal network to locate candidate bounding boxes and use them for classification. In some implementations, clothing items have unique attributes related to them. For example, T-shirts may have unique attributes like sleeve length, hemline, closure type, and so on, whereas shoes may have attributes such as heel type, heel length, toe type and so on. In an embodiment, the attributes network detects high level clothing categories prior to predicting the attributes. In another embodiment, the computer vision system divides a network into two parts—a high level clothing category detector and an attributes classifier.

In the present document, a computer vision system is described. In an embodiment, the computer vision system is implemented as a computer system containing memory and one or more processors. The memory stores executable instructions that, when executed by the one or more processors, cause the computer system to perform operations that implement the system. In various embodiments, the executable instructions may be described by grouping particular portions of the executable instructions into functional components, modules, or interfaces. Such groupings may be made for a variety of purposes including improving the readability, understanding, and maintainability of the executable instructions. In some examples, executable instructions may be grouped and arranged in ways that improve the performance of the computer system as a whole. In the present document, performance of a particular operation may be described as being performed by a particular module or component. Those of ordinary skill in the art are aware of this practice and understand that, in general, the operation is performed by the system as a result of executing instructions that are associated with the particular module or component. In an embodiment, the executable instructions associated with the system include detector and attribute components.

In some implementations, deep learning neural networks may be computationally expensive, thereby making it impractical to use a sliding window approach to localize objects and predict their categories in some situations. To address this problem, certain embodiments of the computer vision system use a region proposal network to output candidate bounding boxes where the object is likely to be present. Convolutional neural networks are used to extract discriminative features from these candidate bounding boxes. These extracted features are then fed into a classifier for category classification.

In an embodiment, the detector provides the attributes network with prior information regarding 1) high level clothing categories and 2) locations in the input image. The attributes net further extracts convolutional features within the final bounding boxes provided by the detector to predict attributes on top of the high level clothing category. For example, if the detector predicts a dress, the attributes network predicts attributes related to dresses (dress type, sleeve length, upper hemline and so forth).

In an embodiment, the functionality described in sections 2.1 and 2.2 may be implemented as two separate convolutional neural network ("CNN") architectures. These CNNs 1) localize and categorize clothing items and 2) predict attributes. In some implementations, using separate networks for training and inference may be cumbersome. Therefore, in some implementations, the computer vision system combines the detection and attributes networks, producing a single network that can be trained in an end-to-end fashion.

The initial network layers may be task-agnostic and extract low level features like edges, shapes and so on. The attributes network can share the features of the initial layer in the detection network and can utilize these low-level features to compute task-specific high-level features for attribute detection. By sharing computations, this end-to-end architecture alleviates most of the computational burden associated with implementations that utilize two separate convolutional networks.

Figure 39:
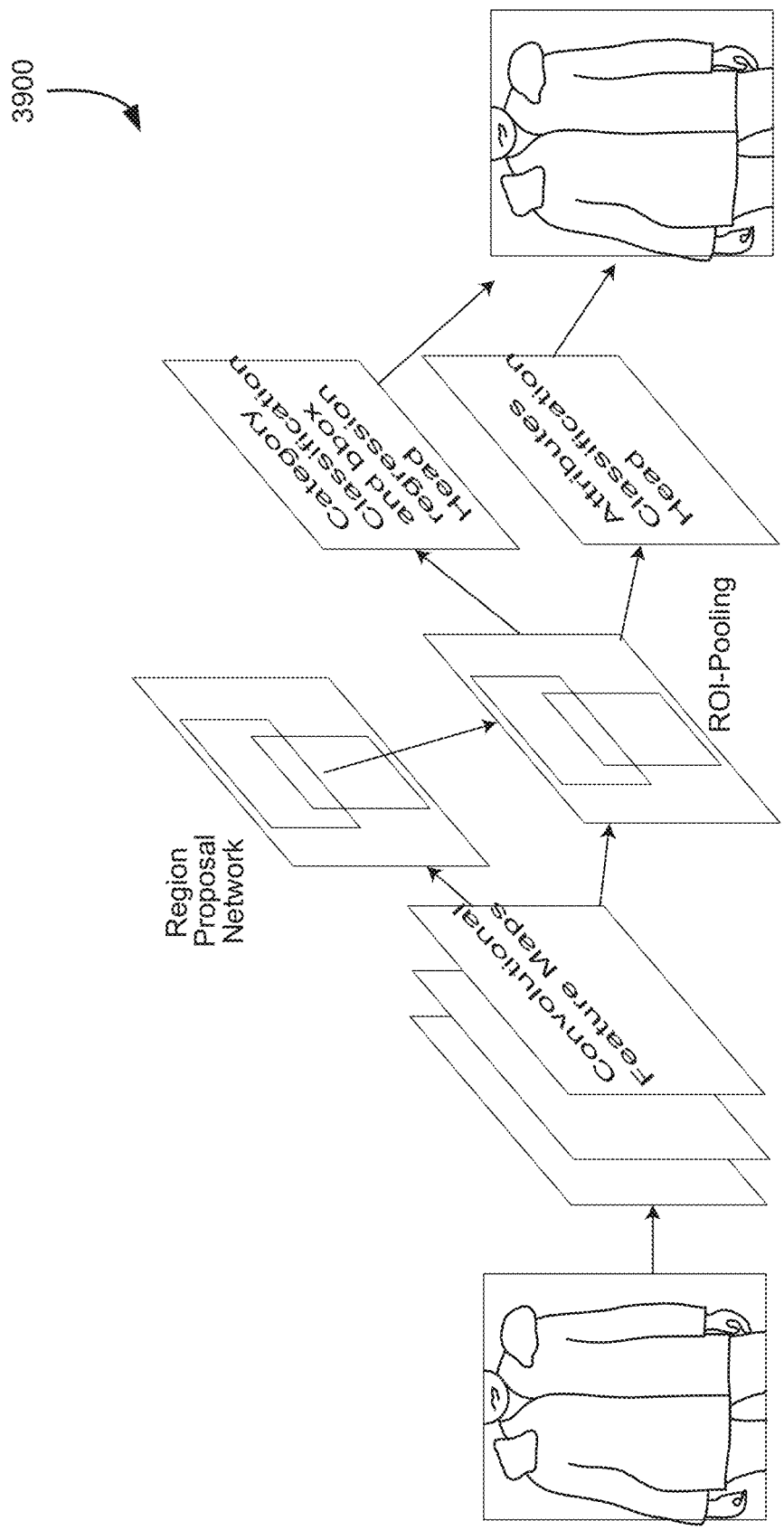
FIG. 39 shows an illustrative example of a schematic of a detection and attribute network, in an embodiment.

FIG. 39 shows an illustrative example of a schematic of a detection and attribute network, in an embodiment. An image is processed through a convolutional neural network to extract a feature volume. The feature volume is then passed through a region proposal network that defines one or more regions of interest. The regions are further passed to a classification head and bounding-box regression head that predicts the category of the clothing item encapsulated by the box, and that predicts the final bounding-box coordinates. An attribute network is also attached on top of the feature maps extracted by the detector. The attribute network takes as input the same regions as the classification and regression heads but yields attributes of the clothing items.

---

End-to-end training method

Input: Image-label pairs $\{X_i, Y_i\} Y_i = (p_j^*, b_i^*, a^{*k}_j)$
for Image i in the batch do
▷ Extract conv features
$X_{conv} = f(X_i)$
▷ Get regions of interest using proposal algorithm
$B_{roi} = P_N(X_{conv})$
▷Object classification & bbox regression on each roi
$p_j, b_j = g(X_{conv}, p_j, b_j)$
▷Predict K attributes on each detected boxes
$a_j^k = h(X_{conv}, B_{roi}^j)$
▷ Compute Losses
▷ Compute Losses $$L_{(cls,reg,attr)} = \sum_{j=1}^{N} L_{entropy}(p_j, p_j^*) + \sum_{j=1}^{N} L_{reg}(b_i, b_i^*) + \sum_{j=1}^{N}\sum_{k=1}^{K} \lambda k \cdot L_{entropy}(a_j^k, a*_j^k)$$

▷Back propogate and update weights

---

Class imbalance is an issue that may arise in machine learning. Class imbalance results from a class distribution that is highly skewed toward a few classes. For example, fraud detection is an example where very few transactions are classified as fraudulent. Training a classifier with such class imbalance can cause the classifier to be biased towards the dominant class (for example, non-fraudulent samples in the case of fraud detection).

Fashion datasets face a similar issue with attribute classes. Commonly worn styles dominate over more exotic ones. For example, upper-wear clothing styles like crew necks and classic collars may be much more abundant in fashion data sets than non-traditional collar types; solid pattern types may be more abundant than polka-dots. Training an attribute detector naively on such datasets may produce a biased classifier. To solve this problem, the computer vision system assigns a weight to the attribute loss by $$\lambda_k = \frac{1}{Nk}$$

where $N_k$ is the frequency of the $k^{th}$ attribute in the training data. Thus, less prevalent attributes will be given more weight than higher-frequency attributes. This weighting procedure modulates the gradients accordingly, resulting in an unbiased classifier.

The method above illustrates an example of an end-to-end training method used by the computer vision system where $p^*_j$ is the ground truth class probability of the $j^{th}$ ROI, $b^*_i$ is the bbox regression target coordinates of $j^{th}$ ROI, $a^{*k}_j$ is the $k^{th}$ attribute of the $j^{th}$ ROI. $\lambda_k$ is the weight assigned to the loss for the $k^{th}$ attribute.

Figure 40:
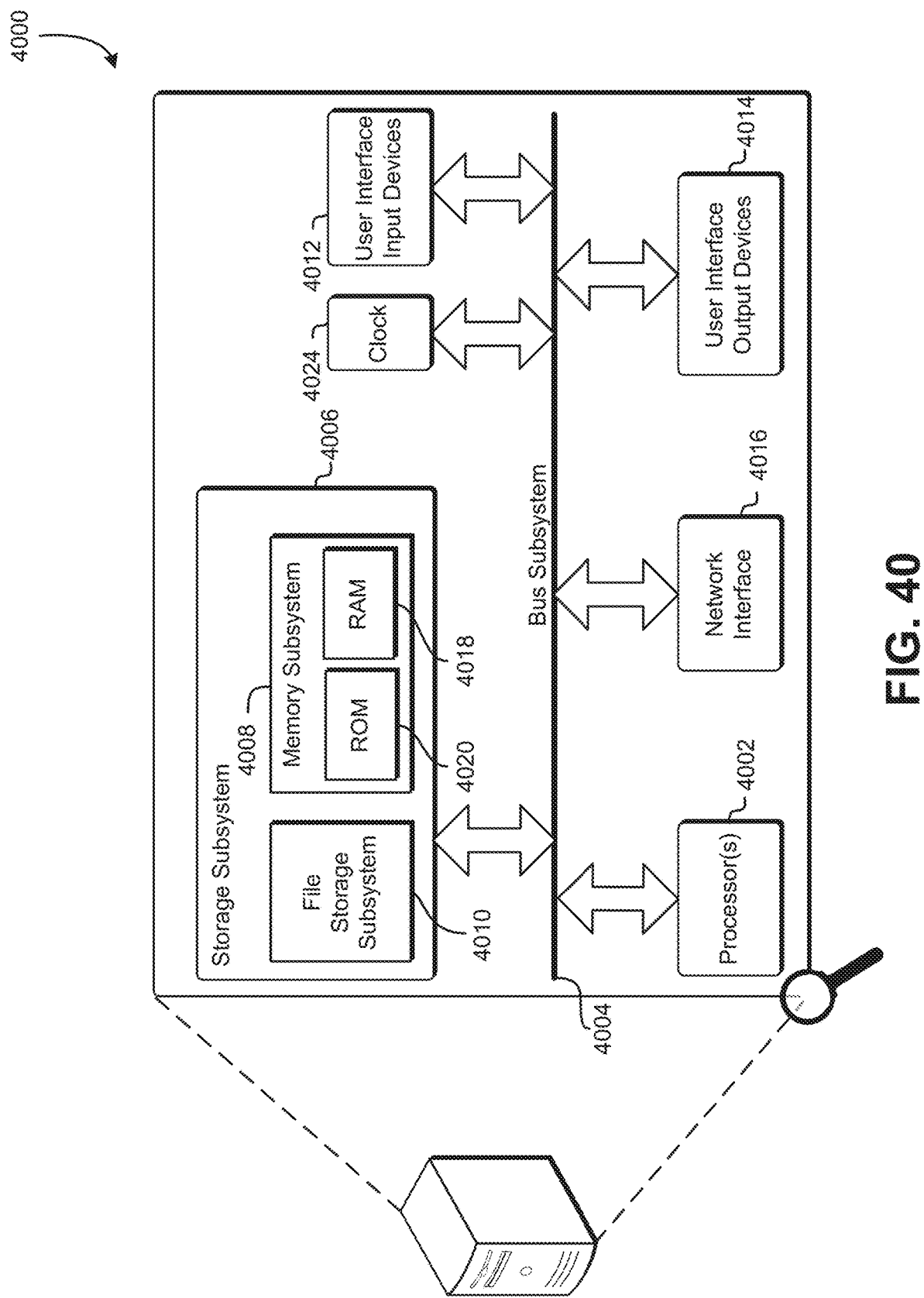
FIG. 40 illustrates an environment in which various embodiments can be implemented.

FIG. 40 illustrates an environment in which various embodiments can be implemented. FIG. 40 is an illustrative, simplified block diagram of an example computing device 4000 that may be used to practice at least one embodiment of the present disclosure. In various embodiments, the computing device 4000 may be used to implement any of the systems illustrated herein and described above. For example, the computing device 4000 may be configured for use as a data server, a web server, a portable computing device, a personal computer, or any electronic computing device. As shown in FIG. 40, the computing device 4000 may include one or more processors 4002 that may be configured to communicate with, and are operatively coupled to, a number of peripheral subsystems via a bus subsystem 4004. The processors 4002 may be utilized for the traversal of decision trees in a random forest of supervised models in embodiments of the present disclosure (e.g., cause the evaluation of inverse document frequencies of various search terms, etc.). These peripheral subsystems may include a storage subsystem 4006, comprising a memory subsystem 4008 and a file storage subsystem 4010, one or more user interface input devices 4012, one or more user interface output devices 4014, and a network interface subsystem 4016. Such storage subsystem 4006 may be used for temporary or long-term storage of information such as details associated with transactions described in the present disclosure, databases of historical records described in the present disclosure, and storage of decision rules of the supervised models in the present disclosure).

The bus subsystem 4004 may provide a mechanism for enabling the various components and subsystems of a computing device 4000 to communicate with each other as intended. Although the bus subsystem 4004 is shown schematically as a single bus, alternative embodiments of the bus subsystem utilize multiple busses. The network interface subsystem 4016 may provide an interface to other computing devices and networks. The network interface subsystem 4016 may serve as an interface for receiving data from, and transmitting data to, other systems from the computing device 4000. For example, the network interface subsystem 4016 may enable a data technician to connect the device to a wireless network such that the data technician may be able to transmit and receive data while in a remote location, such as a user data center. The bus subsystem 4004 may be utilized for communicating data, such as details, search terms, and so on, to the supervised model of the present disclosure, and may be utilized for communicating the output of the supervised model to the one or more processors 4002 and to merchants and/or creditors via the network interface subsystem 4016.

The user interface input devices 4012 may include one or more user input devices, such as a keyboard, pointing devices such as an integrated mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to the computing device 4000. The one or more user interface output devices 4014 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 4000. The one or more output devices 4014 may be used, for example, to present user interfaces to facilitate user interaction with applications performing processes described herein and variations therein, where such interaction may be appropriate.

The storage subsystem 4006 may provide a computer-readable storage medium for storing the basic programming and data constructs that may provide the functionality of at least one embodiment of the present disclosure. The applications (programs, code modules, instructions) that, as a result of being executed by one or more processors, may provide the functionality of one or more embodiments of the present disclosure, may be stored in the storage subsystem 4006. These application modules or instructions may be executed by the one or more processors 4002. The storage subsystem 4006 may additionally provide a repository for storing data used in accordance with the present disclosure. The storage subsystem 4006 may comprise a memory subsystem 4008 and a file/disk storage subsystem 4010.

The memory subsystem 4008 may include a number of memories, including a main random access memory (RAM) 4018 for storage of instructions and data during program execution and a read-only memory (ROM) 4020 in which fixed instructions may be stored. The file storage subsystem 4010 may provide a non-transitory persistent (non-volatile) storage for program and data files, and may include a hard disk drive, a floppy disk drive along with associated removable media, a Compact Disk Read-Only Memory (CD-ROM) drive, an optical drive, removable media cartridges, and other like storage media.

The computing device 4000 may include at least one local clock 4024. The local clock 4024 may be a counter that represents the number of ticks that have transpired from a particular starting date and may be located integrally within the computing device 4000. The local clock 4024 may be used to synchronize data transfers in the processors for the computing device 4000 and all of the subsystems included therein at specific clock pulses and may be used to coordinate synchronous operations between the computing device 4000 and other systems in a data center. In one embodiment, the local clock 4024 is an atomic clock. In another embodiment, the local clock is a programmable interval timer.

The computing device 4000 may be of various types, including a portable computer device, a tablet computer, a workstation, or any other device described below. Additionally, the computing device 4000 may include another device that may be connected to the computing device 4000 through one or more ports (e.g., USB, a headphone jack, Lightning connector, etc.). The device that may be connected to the computing device 4000 may include a plurality of ports configured to accept fiber-optic connectors. Accordingly, this device may be configured to convert optical signals to electrical signals that may be transmitted through the port connecting the device to the computing device 4000 for processing. Due to the ever-changing nature of computers and networks, the description of the computing device 4000 depicted in FIG. 40 is intended only as a specific example for purposes of illustrating the preferred embodiment of the device. Many other configurations having more or fewer components from the system depicted in FIG. 40 are possible.

Figure 41:
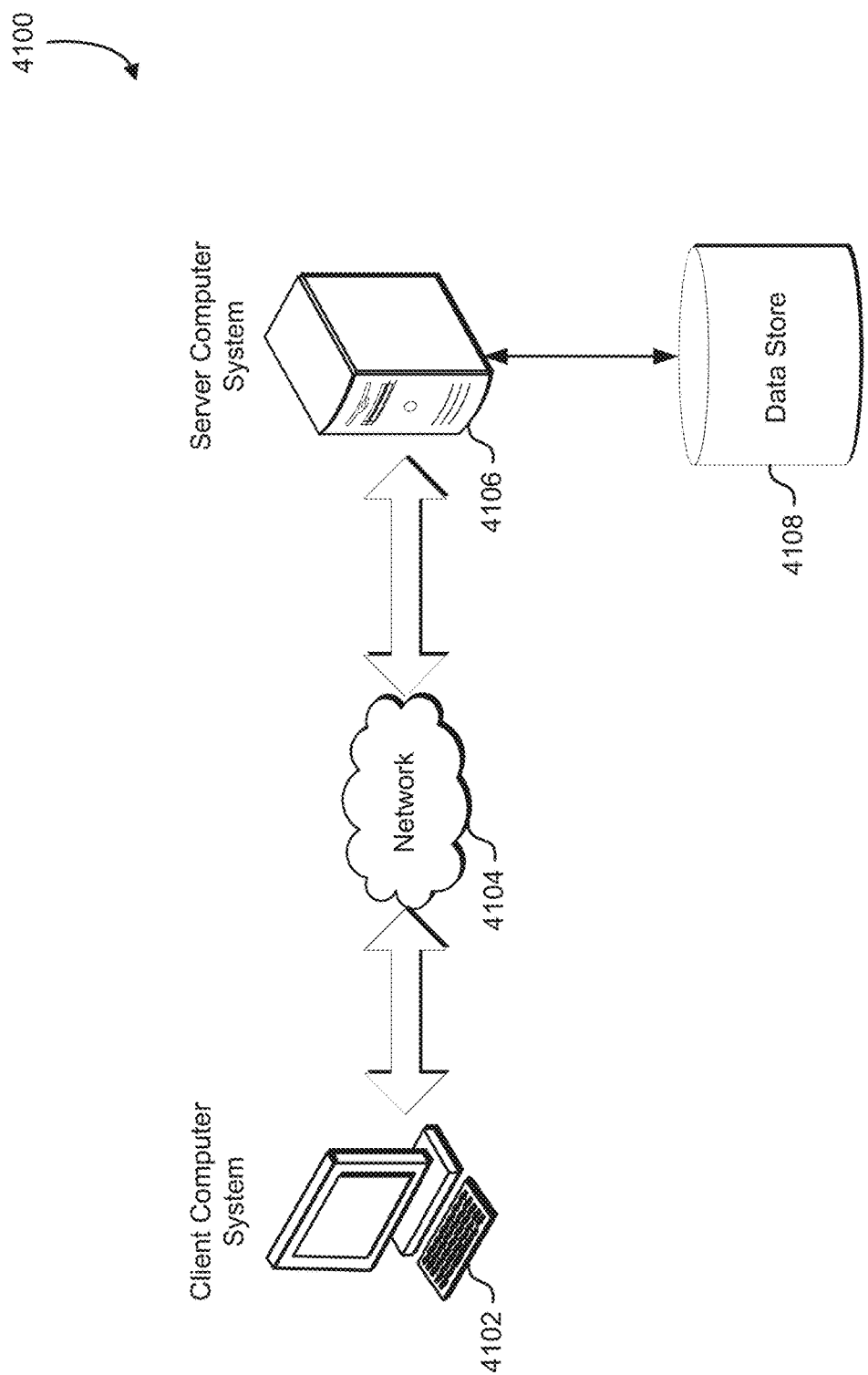
FIG. 41 illustrates aspects of an example environment for implementing aspects in accordance with various embodiments.

FIG. 41 illustrates aspects of an example environment 4100 for implementing aspects in accordance with various embodiments. A client/server environment is shown for the purposes of explanation, but other environments may be used in other implementations. The environment includes a client computer system 4102. The client computer system can be a desktop computer, laptop computer, computing appliance, or mobile device that is able to send or receive information over a computer network 4104. Other examples of client computer systems include cell phones, tablet computers, wearable devices, personal digital assistants ("PDA's"), embedded control systems, and smart appliances. The computer network 4104 can be a wired or wireless network. Wired networks can include wired networks such as Ethernet (10baseT, 100baseT, or Gigabit), AppleTalk, Token Ring, Fiber Channel, USB, RS-232, or Powerline networks, or wireless networks such as 802.11 Wi-Fi, Bluetooth, or infrared-communication-based networks. A variety of communication protocols may be used over the computer network 4104. The communication protocols may include TCP/IP, IPX, or DLC. A variety of intermediate protocols may operate on top of these protocols such as HTTP, HTTP secure ("HTTPS"), simple network management protocol ("SNMP"), and simple mail transfer protocol ("SMTP"). The computer network 4104 may include a combination of subnetworks including the Internet, internal home networks, or business intranets.

The environment includes a server computer system 4106. The server computer system 4106 receives requests from various computer systems connected to the computer network 4104 including the client computer system 4102. The server computer system 4106 can be a server computer system, a number of server computer systems arranged in a server cluster, or virtual computer system capable of receiving requests and sending responses over the computer network 4104. In some environments, a personal computer system, handheld device, or cell phone can perform the functions of the server computer system 4106. If more than one addressable device is used to process requests, a load balancer or other coordinating entity such as a firewall may be placed between the client computer system 4102 and a server computer system 4106. The load balancer may receive requests on behalf of a collection of server devices, and route requests across the collection of server devices.

The server computer system 4106 may implement a plurality of services by exporting more than one service interface. For example, a number of services may be implemented on the server computer system 4106 as a corresponding number of processes. Each process may be bound to different network address and/or network port. A particular network client can access a particular service by submitting a request to the corresponding network address and port.

The server computer system 4106 is connected to a data store 4108. The term data store may refer to a device capable of storing and retrieving computer readable information such as disk drives, semiconductor RAM, ROM, flash memory, optical disk, CD-ROM, EEPROM. In some implementations, write-once/read-many memory such as EEPROM memory may be used to generate a data store. In some implementations, a database may be used to store information. In some examples, a database may be created through the use of a commercial application such as SQL Server, Oracle, Access, or other relational database engine. Tables and keys are defined that allow for rapid and efficient access to information using particular key values. Tables may be linked for quick and efficient access to data. Relational database engines allow operations to be performed on stored data using a standard query language ("SQL"). SQL commands or scripts may be submitted that create, alter, delete, or synthesize information stored within the database. Those skilled in the art will appreciate that, in some systems, some database functions may be integrated into an application. Hash tables, ordered lists, stacks and queues may be implemented and arranged to perform similar functionality in many applications. The term "data store" refers to any device or combination of devices capable of storing, accessing and retrieving data, which may include any combination and number of data servers, databases, data storage devices and data storage media, in any standard, distributed, virtual or clustered environment. As used herein, the term "database" refers to both commercial database engines and custom implementations of database functionality using ordered and indexed data structures, hash tables, arrays, linked lists, key-value pair structures, and the like.

A server computer system 4106 may provide access and authentication controls that limit access to the information maintained in the data store 4108. An authentication system controls access to the server computer system by verifying the identity of the person or entity submitting a request to the server computer system 4106. Authentication is achieved by validating authentication information such as a username and password, a digital signature, or a biometric value. In some implementations, authentication occurs through the submission of a username and password known only by an authorized user. In another implementation, authentication occurs as a result of the submission of a digital signature using a cryptographic key known to be under the control of the client computer system 4102. The cryptographic key may be a private cryptographic key associated with a digital certificate. Requests submitted to the server computer system 4106 may be subject to authorization controls. Authorization controls may be based at least in part on the identity of the requester or the requesting device. In some implementations, authorization controls may subject service requests to a time-based or data-rate throttling limitation.

Content stored on the data store 4108 and served by the server computer system 4106 may include documents, text, graphics, music or audio, video content, executable content, executable scripts, or binary data for use with a computer application. For example, content served by Web server may be in HyperText Markup Language ("HTML"), Extensible Markup Language ("XML"), JavaScript, Cascading Style Sheets ("CSS"), JavaScript Object Notation (JSON), and/or another appropriate format. Content may be served from the server computer system 4106 to the client computer system 4102 in plaintext or encrypted form.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising", "having", "including", and "containing" are to be construed as open-ended terms (i.e., meaning "including, but not limited to") unless otherwise noted. The term "connected", when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated, and each separate value is incorporated into the specification as if it were individually recited. The use of the term "set" (e.g., "a set of items") or "subset", unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C", or "at least one of A, B and C", unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

It should be noted that the above-mentioned embodiments illustrate rather than limit the invention, and that those skilled in the art will be capable of designing many alternative embodiments without departing from the scope of the invention, as defined by the appended claims. In the claims, any reference signs placed in parentheses shall not be construed as limiting the claims. The words "comprising", "comprises", and the like do not exclude the presence of elements or steps other than those listed in any claim or the specification as a whole. In the present specification, "comprises" means "includes or consists of" and "comprising" means "including or consisting of." The singular reference of an element does not exclude the plural reference of such elements and vice-versa. The invention may be implemented by means of hardware comprising several distinct elements and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

Data encryption may be accomplished using various forms of symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Note also that the examples used herein may be performed in compliance with one or more of: Request for Comments (RFC) 4250, RFC 4251, RFC 4252, RFC 4253, RFC 4254, RFC 4255, RFC 4256, RFC 4335, RFC 4344, RFC 4345, RFC 4419, RFC 4432, RFC 4462, RFC 4716, RFC 4819, RFC 5647, RFC 5656, RFC 6187, RFC 6239, RFC 6594, and RFC 6668, which are incorporated by reference.

Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Embodiments of the disclosure can be described in view of the following clauses:

1. A computer-implemented method, comprising:
    acquiring an image;
    determining a set of regions of interest in the image, the set of regions containing a set of objects;
    determining a set of potential categories for each object in the set of objects based on a hierarchical tree of object categories;
    identifying, from the set of potential categories for each object in the set of objects, a category for each object in the set of objects;
    determining that at least one object in the set of objects matches a item identified by a user;
    identifying a set of items that match the set of objects; and
    identifying the set of items to the user.

2. The computer-implemented method of clause 1 wherein determining that an item matches an object is accomplished by at least:
    determining a set of attributes for the object; and
    determining that attributes of the item match the set of attributes.

3. The computer-implemented method of clause 2 wherein:
    the set of attributes is determined using a convolutional neural network; and
    less prevalent attributes in the set of attributes are given more weight than higher-frequency attributes.

4. The computer-implemented method of any of clauses 1-3, wherein the item is an article of clothing, a piece of jewelry, a bag, or a set of eyeglasses.

5. The computer-implemented method of any of clauses 1-4, wherein:
    the item is identified by the user by the user providing an image of the item; and
    the computer-implemented method further comprises identifying the item from the image.

6. The computer-implemented method of any of clauses 1-5, wherein the set of items is identified by identifying items that have attributes that match the attributes of the set of objects.

7. A computer system, comprising:
    a processor; and
    memory storing instructions that, when executed by the processor, cause the computer system to:
    present a set of images on a display, each image in the set of images showing a representation of a set of objects;
    acquire information indicating a selection of a particular image of the set of images;
    determining a set of potential categories for each object in the set of objects in the particular image based on a hierarchical tree of object categories;
    identifying, from the set of potential categories for each object in the set of objects in the particular image, a category;
    identify, based at least in part on the category of each object in the set of objects, a set of attributes for each object in the set of objects in the particular image;
    identify, based on the set of attributes, one or more items that match at least one object in the set of objects in the particular image; and
    present the one or more items on the display.

8. The computer system of clause 7, wherein the instructions further cause the computer system to:
    acquire, from a user, an indication that identifies a particular item; and
    determine the set of images by identifying look images that include a representation of a an article that matches the particular item.

9. The computer system of clause 7 or 8, wherein:
    the computer system is a cell phone that includes a camera; and
    the set of images includes an image acquired by the computer system using the camera.

10. The computer system of any of clauses 7-9, wherein:
    the instructions further cause the computer system to acquire a look record for each image of the set of images; and
    each look record describes an associated set of objects for the look record and a set of attributes for each article in the associated set of objects.

11. The computer system of any of clauses 7-10, wherein the instructions further cause the computer system to:
    present an image of the set of images on a display; and
    in response to a user swiping the display, presenting a different image of the set of images on the display.

12. The computer system of any of clauses 7-11, wherein the set of attributes includes a color, a texture, and a pattern.

13. The computer system of any of clauses 7-12, wherein the instructions further cause the computer system to:
    acquire a video segment that includes image frames;
    identify an article across a plurality of the image frames using a tracklet; and
    identify attributes of the article using the tracklet.

14. The computer system of any of clauses 7-13, wherein the instructions further cause the computer system to identify an item that matches an article by at least:

determining an item category for the article; and searching items in the item category for items with attributes matching attributes of the article.

15. The computer system of any of clauses 7-14, wherein the set of images is determined by at least:

acquiring information that identifies a particular person; and adding, to the set of images, images of the particular person.

16. A non-transitory computer-readable storage medium storing instructions that, as a result of being executed by a processor of a computing system cause the computing system to:

receive a request that identifies an image;

identify an object represented in the image;

determining a set of potential categories for the object in the image based on a hierarchical tree of object categories;

identifying, from the set of potential categories for the object in the image, a category;

identify, based at least in part on the category of the object, a set of characteristics for the object in the image; and identify one or more similar objects from a database of objects based at least in part on the set of characteristics.

17. The non-transitory computer-readable storage medium of clause 16, wherein the instructions include a script that is downloaded into a memory of a browser running on a client computer system.

18. The non-transitory computer-readable storage medium of clauses 16 or 17, wherein the object is identified by at least:

identifying an region of the image containing an article;

determining a category of the article;

determining that the category of the article matches the category of the object; and determining that a threshold number of attributes of the articles match attributes of the object.

19. The non-transitory computer-readable storage medium of any of clauses 16-18, further comprising instructions that, as a result of being executed by the processor of the computing system cause the computing system to present the one or more similar objects to a user via a display on a web browser.

20. The non-transitory computer-readable storage medium of clause 19, further comprising instructions that, as a result of being executed by the processor of the computing system cause the computing system to provide a selectable link that enables the user to purchase at least one of the one or more similar objects.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for retrieving item information from an image, the computer-implemented method executable by a hardware processor, the method comprising:
   receiving a request to query the image;
   selecting an item in the image to generate a selected item;
   predicting, by a detector module, a bounding box around the selected item in the image;
   determining, by an extractor module, whether a quality score associated with the bounding box around the selected item in the image exceeds a quality score threshold;
   extracting a feature representation of the selected item in the image when the quality score associated with the bounding box around the selected item in the image exceeds the quality score threshold; and
   identifying a product from a database of products based at least in part on the feature representation of the selected item in the image.

2. The computer-implemented method of claim 1, wherein the image is one of a plurality of images in a video segment, and wherein the method further comprises:
   detecting a plurality of tracked items associated with the selected item, wherein each tracked item of the plurality of tracked items corresponds to an image of the plurality of images in the video segment;
   extracting a plurality of feature representations of the selected item, wherein each feature representation of the plurality of feature representations is extracted from a tracked item associated with a different image in the plurality of images in the video segment; and
   fusing a subset of the plurality of feature representations of the selected item to generate a fused feature representation of the selected item.

3. The computer-implemented method of claim 2, the method further comprising:
   selecting the subset of the plurality of feature representations of the selected item by determining whether each of the plurality of feature representations of the selected item is suitable.

4. The computer-implemented method of claim 2, wherein the fusing the subset of the plurality of feature representations of the selected item to generate the fused feature representation of the selected item comprises temporal pooling.

5. The computer-implemented method of claim 4, wherein the temporal pooling is average pooling.

6. The computer-implemented method of claim 2, wherein the fusing the subset of the plurality of feature representations of the selected item to generate the fused feature representation of the selected item comprises executing a temporal attention mechanism.

7. The computer-implemented method of claim 6, wherein the temporal attention mechanism is a soft attention mechanism configured to determine a plurality of fusion weights, and wherein each of the plurality of fusion weights corresponds to one of the plurality of feature representations of the selected item.

8. The computer-implemented method of claim 6, wherein the temporal attention mechanism is a hard attention mechanism modeled as a Markov decision process configured to execute reinforcement learning.

9. The computer-implemented method of claim 2, further comprising:
   forming a plurality of tracklets associated with the selected item, wherein the plurality of tracklets is correlated with spatio-temporal information associated with the selected item.

10. The computer-implemented method of claim 9, wherein the spatio-temporal information is a location of the selected item.

11. The computer-implemented method of claim 9, wherein the spatio-temporal information is a direction and a speed of the selected item.

12. The computer-implemented method of claim 2, wherein the plurality of images in the video segment is sequential data, and wherein a recurrent neural network models a plurality of temporal dependencies among the plurality of images in the video segment.

13. The computer-implemented method of claim 2, wherein the plurality of images in the video segment is an image set, and wherein metric learning is applied to a single image set-based model.

14. The computer-implemented method of claim 2, wherein the quality score is generated by training a quality prediction head branch, and wherein the training data for the quality prediction head branch comprises data augmentation.

15. The computer-implemented method of claim 14, wherein the quality prediction head branch is trained as a regressor from a plurality of convolutional features associated with the selected item.

16. The computer-implemented method of claim 1, wherein the detector module comprises a neural network configured to map an input image to a plurality of bounding boxes and to a plurality of categories, and wherein each of the plurality of bounding boxes corresponds to one of the plurality of categories.

17. The computer-implemented method of claim 1, wherein the extractor module comprises a neural network configured to extract from an input bounding box a plurality of discriminative features.

18. The computer-implemented method of claim 17, wherein the extractor module is configured to predict attributes of the selected item.

19. The computer-implemented method of claim 1, wherein the selected item is an article of clothing, and wherein the method further comprises:
  generating an enhanced profile of the selected item,
  wherein the enhanced profile comprises information selected from the group consisting of color, pattern, material, type of sleeve, and type of collar.

20. A non-transitory computer-readable storage medium having program instructions stored therein, for retrieving item information from an image, the program instructions executable by a hardware processor to cause the hardware processor to:
  receive a request to query the image;
  select an item in the image to generate a selected item;
  predict, by a detector module, a bounding box around the selected item in the image;
  determine, by an extractor module, whether a quality score associated with the bounding box around the selected item in the image exceeds a quality score threshold;
  extract a feature representation of the selected item in the image when the quality score associated with the bounding box around the selected item in the image exceeds the quality score threshold; and
  identify a product from a database of products based at least in part on the feature representation of the selected item in the image.

* * * * *